(12) United States Patent
Jung et al.

(10) Patent No.: US 9,626,633 B2
(45) Date of Patent: Apr. 18, 2017

(54) PROVIDING ACCESS TO ONE OR MORE MESSAGES IN RESPONSE TO DETECTING ONE OR MORE PATTERNS OF USAGE OF ONE OR MORE NON-COMMUNICATION PRODUCTIVITY APPLICATIONS

(75) Inventors: Edward K. Y. Jung, Bellevue, WA (US); Eric C. Leuthardt, St. Louis, MO (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Lowell L. Wood, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 232 days.

(21) Appl. No.: 12/800,245

(22) Filed: May 10, 2010

(65) Prior Publication Data

US 2011/0213793 A1     Sep. 1, 2011

Related U.S. Application Data

(63) Continuation-in-part of application No. 12/660,526, filed on Feb. 26, 2010, and a continuation-in-part of application No. 12/661,410, filed on Mar. 15, 2010, now Pat. No. 8,239,409, and a continuation-in-part of application No. 12/798,753, filed on Apr. 9, 2010, and a continuation-in-part of application No.
(Continued)

(51) Int. Cl.
*G06Q 10/06* (2012.01)

(52) U.S. Cl.
CPC .................. *G06Q 10/06* (2013.01)

(58) Field of Classification Search
CPC ......................................... G06Q 10/06
USPC ............................... 707/791, 802–805, 809, 707/999.002–999.006, 1, 101–103; 704/251, 252, 270, 271, 9, 10; 379/88.22
See application file for complete search history.

(56) References Cited

U.S. PATENT DOCUMENTS

| 5,519,808 A | 5/1996 | Benton, Jr. et al. |
| 5,873,107 A | 2/1999 | Borovoy et al. |

(Continued)

OTHER PUBLICATIONS

"Where people go to be productive"; Microsoft Advertising; Bearing a date of 2010: p. 1; located at http://advertising.microsoft.com/uk/microsoft-office-advertising; printed on Feb. 26, 2010.
(Continued)

*Primary Examiner* — Syling Yen

(57) ABSTRACT

A computationally implemented method includes, but is not limited to: detecting one or more occurrences of one or more specific patterns of usage of one or more non-communication (NC) productivity applications by one or more end users; and providing to the one or more end users, in response to said detecting, access to one or more particular messages through one or more channels of one or more NC productivity application interfaces, the one or more NC productivity application interfaces for accessing the one or more NC productivity applications by the one or more end users. In addition to the foregoing, other method aspects are described in the claims, drawings, and text forming a part of the present disclosure.

53 Claims, 31 Drawing Sheets

Related U.S. Application Data

12/798,915, filed on Apr. 12, 2010, and a continuation-in-part of application No. 12/800,141, filed on May 7, 2010.

(56) References Cited

U.S. PATENT DOCUMENTS

| | | | |
|---|---|---|---|
| 5,877,763 A | | 3/1999 | Berry et al. |
| 5,974,413 A | * | 10/1999 | Beauregard et al. |
| 6,041,303 A | | 3/2000 | Mathews |
| 6,044,420 A | | 3/2000 | Matsunaga et al. |
| 6,216,141 B1 | | 4/2001 | Straub et al. |
| 6,360,249 B1 | | 3/2002 | Courts et al. |
| 6,377,949 B1 | | 4/2002 | Gilmour |
| 6,433,795 B1 | | 8/2002 | MacNaughton et al. |
| 6,507,845 B1 | | 1/2003 | Cohen et al. |
| 6,542,163 B2 | | 4/2003 | Gorbet et al. |
| 6,639,608 B1 | | 10/2003 | Itakura |
| 6,697,824 B1 | | 2/2004 | Bowman-Amuah |
| 6,771,290 B1 | | 8/2004 | Hoyle |
| 6,850,260 B1 | | 2/2005 | Taylor |
| 6,928,615 B1 | | 8/2005 | Haitsuka et al. |
| 7,249,315 B2 | | 7/2007 | Moetteli |
| 7,472,351 B1 | * | 12/2008 | Zilka .................... 715/748 |
| 7,665,064 B2 | | 2/2010 | Able et al. |
| 7,693,863 B2 | | 4/2010 | Martin et al. |
| 7,877,409 B2 | | 1/2011 | Lim |
| 7,958,234 B2 | | 6/2011 | Thomas et al. |
| 2002/0026360 A1 | | 2/2002 | McGregor et al. |
| 2002/0047861 A1 | | 4/2002 | LaBrie et al. |
| 2002/0067376 A1 | | 6/2002 | Martin et al. |
| 2002/0116294 A1 | | 8/2002 | Ranck et al. |
| 2002/0133392 A1 | | 9/2002 | Angel et al. |
| 2002/0159575 A1 | | 10/2002 | Skladman et al. |
| 2002/0196275 A1 | | 12/2002 | Willner et al. |
| 2003/0115311 A1 | | 6/2003 | Johnston-Watt et al. |
| 2003/0140309 A1 | | 7/2003 | Saito et al. |
| 2003/0236879 A1 | | 12/2003 | Moritani et al. |
| 2004/0205127 A1 | | 10/2004 | Ben-Yoseph |
| 2004/0210640 A1 | | 10/2004 | Chadwick et al. |
| 2004/0220977 A1 | | 11/2004 | Cho et al. |
| 2005/0005242 A1 | | 1/2005 | Hoyle |
| 2005/0060655 A1 | | 3/2005 | Gray et al. |
| 2005/0076306 A1 | | 4/2005 | Martin et al. |
| 2005/0114789 A1 | | 5/2005 | Chang et al. |
| 2005/0149880 A1 | | 7/2005 | Postrel |
| 2005/0193335 A1 | | 9/2005 | Dorai et al. |
| 2005/0193346 A1 | | 9/2005 | Kenna, III et al. |
| 2005/0216421 A1 | | 9/2005 | Barry et al. |
| 2005/0246651 A1 | | 11/2005 | Krzanowski |
| 2006/0101341 A1 | | 5/2006 | Kelly et al. |
| 2006/0230015 A1 | | 10/2006 | Gupta |
| 2006/0277474 A1 | | 12/2006 | Robarts et al. |
| 2007/0033269 A1 | | 2/2007 | Atkinson et al. |
| 2007/0038696 A1 | | 2/2007 | Kenna, III et al. |
| 2007/0118803 A1 | * | 5/2007 | Walker et al. ............. 715/744 |
| 2007/0136256 A1 | | 6/2007 | Kapur et al. |
| 2007/0136462 A1 | | 6/2007 | Nicholas, III |
| 2007/0157116 A1 | | 7/2007 | Johnson et al. |
| 2007/0260702 A1 | | 11/2007 | Richardson et al. |
| 2007/0294091 A1 | | 12/2007 | Cohen et al. |
| 2008/0021777 A1 | | 1/2008 | Mack et al. |
| 2008/0059631 A1 | | 3/2008 | Bergstrom et al. |
| 2008/0071881 A1 | | 3/2008 | Kronlund et al. |
| 2008/0082929 A1 | | 4/2008 | Stignani et al. |
| 2008/0115056 A1 | * | 5/2008 | Escapa et al. ............. 715/267 |
| 2008/0126949 A1 | * | 5/2008 | Sharma .................... 715/751 |
| 2008/0140684 A1 | | 6/2008 | O'Reilly et al. |
| 2008/0172555 A1 | | 7/2008 | Keenan |
| 2008/0235276 A1 | | 9/2008 | Erol et al. |
| 2008/0320098 A1 | | 12/2008 | Jung et al. |
| 2009/0083638 A1 | | 3/2009 | Gupta |
| 2009/0172565 A1 | | 7/2009 | Jackson et al. |
| 2009/0183186 A1 | | 7/2009 | Murtagh |
| 2009/0222673 A1 | | 9/2009 | Schneck et al. |
| 2009/0240586 A1 | | 9/2009 | Ramer et al. |
| 2009/0307612 A1 | | 12/2009 | Singh et al. |
| 2010/0095198 A1 | * | 4/2010 | Bultrowicz ............ G06Q 10/00 715/234 |
| 2010/0100424 A1 | | 4/2010 | Buchanan et al. |
| 2010/0146396 A1 | | 6/2010 | Able et al. |
| 2010/0153948 A1 | | 6/2010 | Schreiber et al. |
| 2010/0199181 A1 | | 8/2010 | Robertson et al. |
| 2011/0022477 A1 | | 1/2011 | Hatridge et al. |
| 2011/0041077 A1 | | 2/2011 | Reiner |
| 2011/0078615 A1 | * | 3/2011 | Bier .......................... 715/779 |
| 2012/0062395 A1 | | 3/2012 | Sonnabend et al. |

OTHER PUBLICATIONS

U.S. Appl. No. 12/660,526, Jung et al.
U.S. Appl. No. 12/661,410, Jung et al.
U.S. Appl. No. 12/798,753, Jung et al.
U.S. Appl. No. 12/798,915, Jung et al.
U.S. Appl. No. 12/800,141, Jung et al.
Wikipedia; "Symbol"; bearing a date of Feb. 24, 2009; printed on Jul. 11, 2015 and located at: https://web.archive.org/web/20090225182503/http://en.wikipedia.org/wiki/Symbol, https://en.wikipedia.org/wiki/Symbol dated Feb. 25, 2009, printout p. 1.

* cited by examiner

104 Message Access Providing Module

224 NC Productivity Application Interface Providing Module

230 NC Productivity Application Interface Transmitting Module

232 Network Transmitting Module

234 Internet Transmitting Module

236 NC Productivity Application Audio Interface Providing Module

238 NC Productivity Application Display Interface Providing Module

226 Message Presenting Module

240 Audio Message Presenting Module

242 Display Message Presenting Module

244 Link Presenting Module

246 Message Transmitting Module

248 Relevant Message Determining Module

FIG. 2b

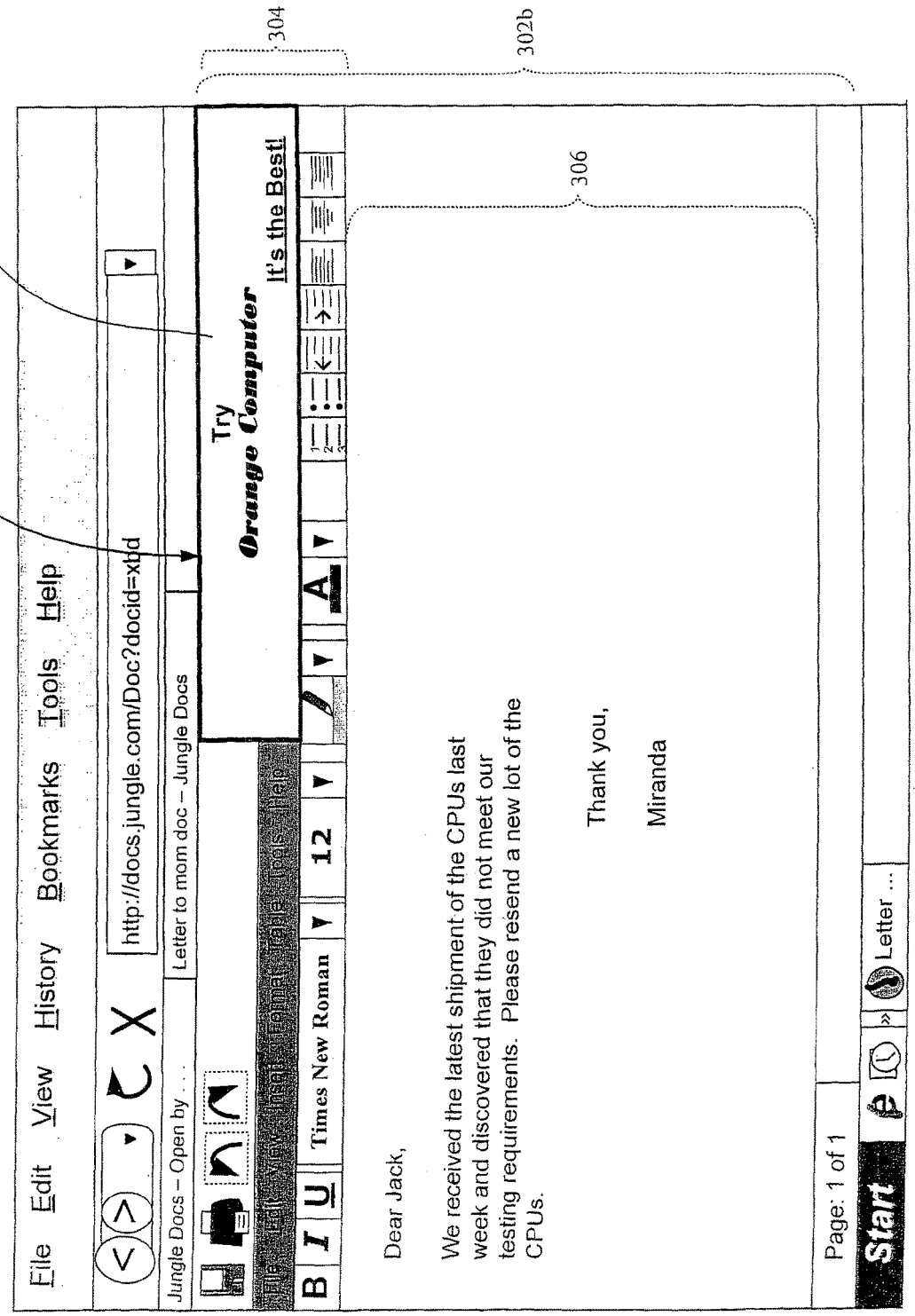

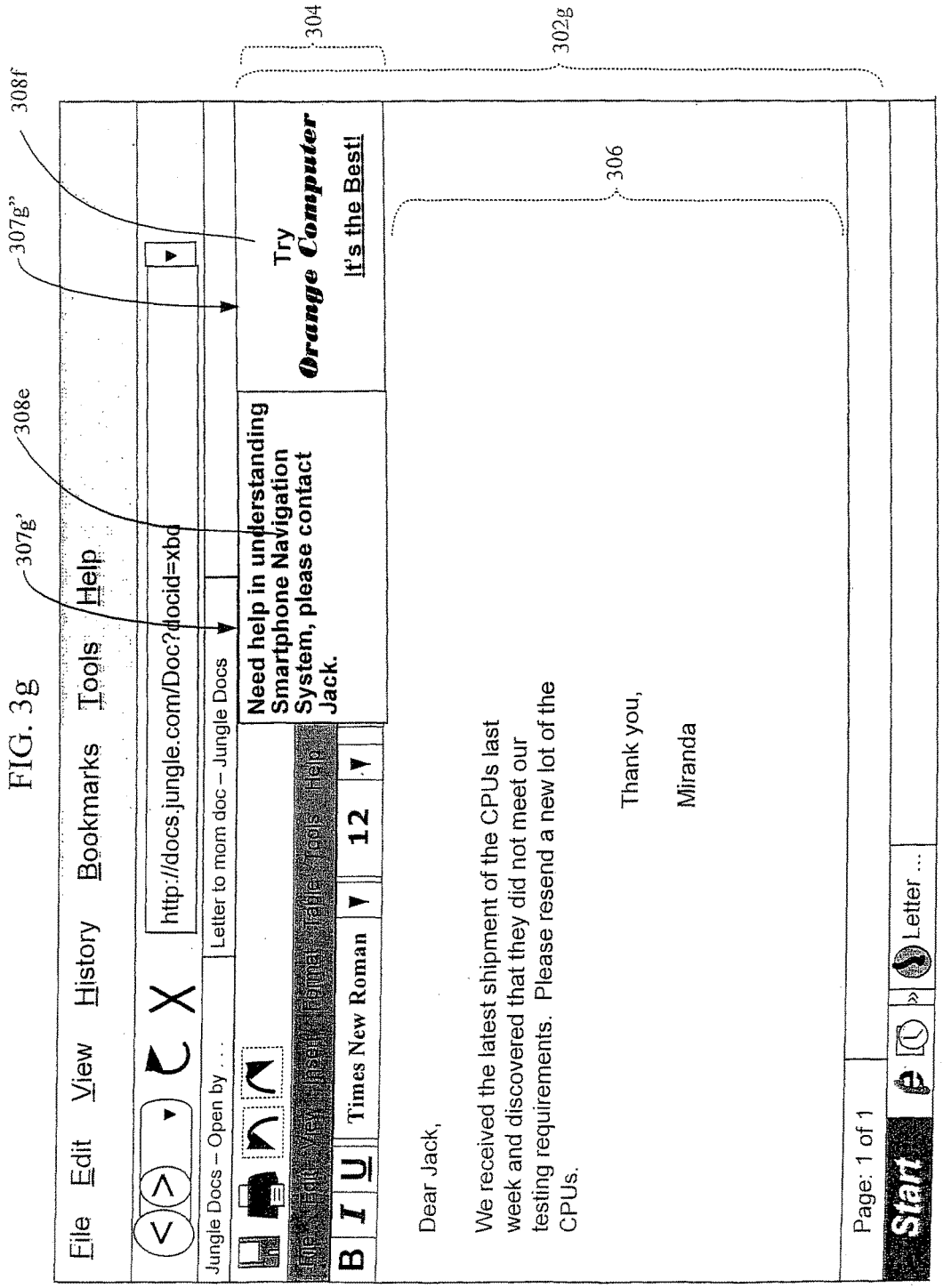

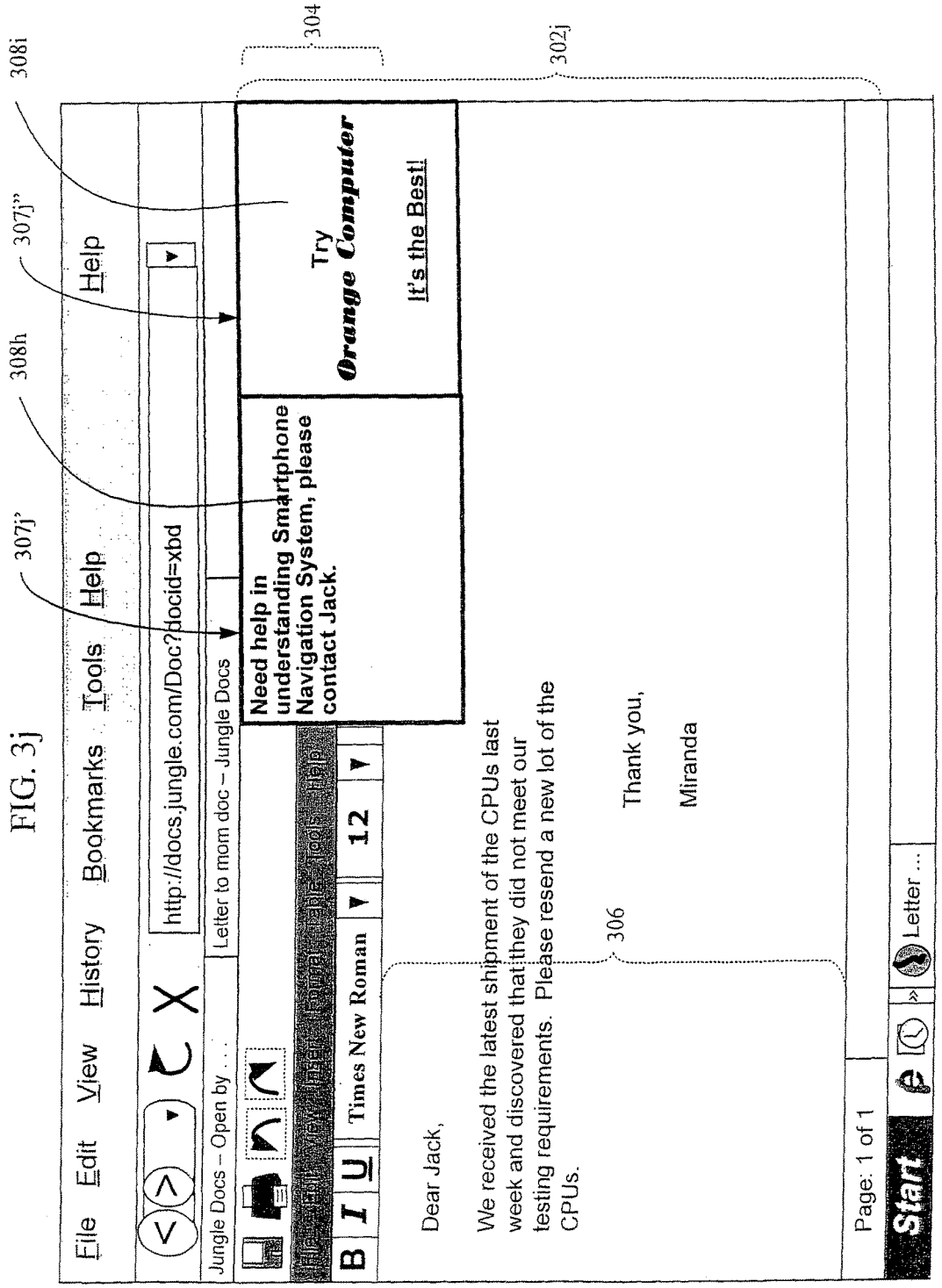

PROVIDING ACCESS TO ONE OR MORE MESSAGES IN RESPONSE TO DETECTING ONE OR MORE PATTERNS OF USAGE OF ONE OR MORE NON-COMMUNICATION PRODUCTIVITY APPLICATIONS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/800,141, entitled PROVIDING ACCESS TO ONE OR MORE MESSAGES INRESPONSE TO DETECTING ONE OR MORE PATTERNS OF USAGE OF ONEOR MORE NON-COMMUNICATION PRODUCTIVITY APPLICATIONS, naming Edward K.Y. Jung; Eric C. Leuthardt; Royce A. Levien; Richard T. Lord; Robert W. Lord; Mark A. Malamud; John D. Rinaldo, Jr.; Lowell L. Wood, Jr. as inventors, filed May 7, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/660,526, entitled PROVIDING A MODIFIED NON-COMMUNICATION APPLICATION INTERFACE FOR PRESENTING A MESSAGE, naming Edward K. Y. Jung; Eric C. Leuthardt; Royce A. Levien; Richard T. Lord; Robert W. Lord; Mark A. Malamud; John D. Rinaldo, Jr.; Lowell L. Wood, Jr. as inventors, filed Feb. 26, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/661,410, entitled PROVIDING A MODIFIED NON-COMMUNICATION APPLICATION INTERFACE FOR PRESENTING A MESSAGE, naming Edward K. Y. Jung; Eric C. Leuthardt; Royce A. Levien; Richard T. Lord; Robert W. Lord; Mark A. Malamud; John D. Rinaldo, Jr.; Lowell L. Wood, Jr. as inventors, filed Mar. 15, 2010, now U.S. Pat. No. 8,239,409.

For purposes of the USPTO extra-statutory requirements, the present application constitutes a continuation-in-part of U.S. patent application Ser. No. 12/798,753, entitled PRESENTING MESSAGES THROUGH A CHANNEL OF A NON-COMMUNICATION PRODUCTIVITY APPLICATION INTERFACE, naming Edward K. Y. Jung; Eric C. Leuthardt; Royce A. Levien; Richard T. Lord; Robert W. Lord; Mark A. Malamud; John D. Rinaldo, Jr.; Lowell L. Wood, Jr. as inventors, filed Apr. 9, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/798,915, entitled PRESENTING MESSAGES THROUGH A CHANNEL OF A NON-COMMUNICATION PRODUCTIVITY APPLICATION INTERFACE, naming Edward K. Y. Jung; Eric C. Leuthardt; Royce A. Levien; Richard T. Lord; Robert W. Lord; Mark A. Malamud; John D. Rinaldo, Jr.; Lowell L. Wood, Jr. as inventors, filed Apr. 12, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior—Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to detecting one or more occurrences of one or more specific patterns of usage of one or more non-communication (NC) productivity applications by one or more end users; and providing to the one or more end users, in response to said detecting, access to one or more particular messages through one or more channels of one or more NC productivity application interfaces, the one or more NC productivity application interfaces for accessing the one or more NC productivity applications by the one or more end users. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for detecting one or more occurrences of one or more specific patterns of usage of one or more non-communication (NC) productivity applications by one or more end users; and means for providing to the one or more end users, in response to said detecting, access to one or more particular messages through one or more channels of one or more NC productivity application interfaces, the one or more NC productivity application interfaces for accessing the one or more NC productivity applications by the one or more end users. In addition to the foregoing, other system aspects are described in the claims, drawings, and text forming a part of the present disclosure.

A computationally implemented system includes, but is not limited to: circuitry for detecting one or more occurrences of one or more specific patterns of usage of one or more non-communication (NC) productivity applications by one or more end users; and circuitry for providing to the one or more end users, in response to said detecting, access to one or more particular messages through one or more channels of one or more NC productivity application interfaces, the one or more NC productivity application interfaces for accessing the one or more NC productivity applications by the one or more end users. In addition to the foregoing, other system aspects are described in the claims, drawings, and text forming a part of the present disclosure.

A computer program product including a signal-bearing medium bearing one or more instructions for detecting one or more occurrences of one or more specific patterns of usage of one or more non-communication (NC) productivity applications by one or more end users; and one or more instructions for providing to the one or more end users, in response to said detecting, access to one or more particular messages through one or more channels of one or more NC productivity application interfaces, the one or more NC productivity application interfaces for accessing the one or more NC productivity applications by the one or more end users. In addition to the foregoing, other computer program product aspects are described in the claims, drawings, and text forming a part of the present disclosure.

A method for providing access to one or more particular messages in response to detecting of one or more particular patterns of usage of one or more non-communication (NC) productivity applications, the method includes detecting, using a processor, one or more occurrences of one or more specific patterns of usage of one or more non-communication (NC) productivity applications by one or more end users; and providing to the one or more end users, in response to said detecting, access to one or more particular messages through one or more channels of one or more NC productivity application interfaces, the one or more NC productivity application interfaces for accessing the one or more NC productivity applications by the one or more end users.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2b shows another perspective of the message access providing module 104 of the Computing System 10 of FIG. 1b.

FIG. 3c shows another implementation of the web-based non-communication productivity application interface of FIG. 3b as displayed on a display screen.

FIG. 3g shows one implementation of another web-based non-communication productivity application interface with a two-window channel for displaying messages as displayed on a display screen.

FIG. 3j shows one implementation of another web-based non-communication productivity application interface with a two-window channel for displaying messages as displayed on a display screen.

FIG. 3l shows another implementation of the web-based non-communication productivity application interface of FIG. 3k as displayed on a display screen.

DETAILED DESCRIPTION

Figure 1A:
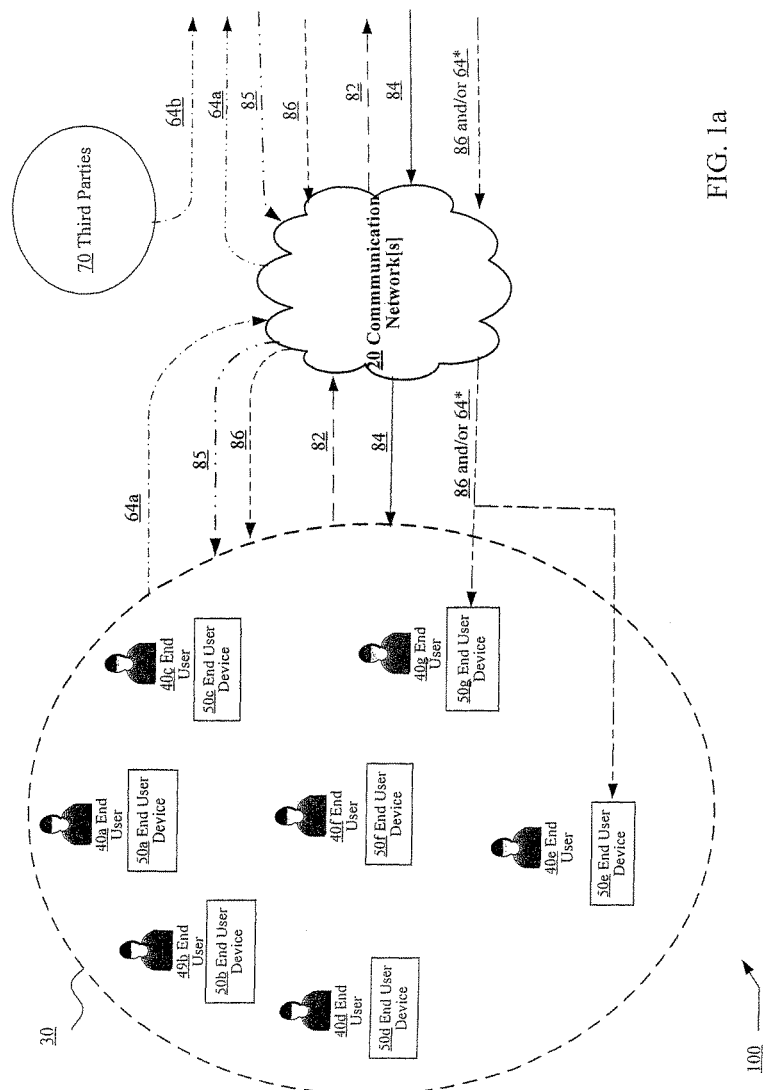
FIGS. 1a and 1b show a high-level block diagram of a Computing System 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Since the introduction and the subsequent integration of personal computers into the workplace, certain software programs that run on such devices have proven to be essential for having a productive and efficient workplace. For example, certain software programs commonly referred to as "productivity software" or "productivity applications" have become indispensable tools for many of today's businesses. There are currently a number of productivity applications available on the market including, for example, word processors, spreadsheets, presentations programs, database management programs, graphics or diagramming programs, communication programs and/or email clients, and so forth. These productivity applications may be categorized into at least two groups, one group of productivity applications that can perform communication functionalities, and a second group of productivity applications that do not generally perform communication functionalities but instead are designed to perform other functionalities. For purposes of the following description, the second group of productivity applications will be referred to as non-communication (NC) productivity applications.

Examples of productivity applications that belong to the first group (e.g., "communication" productivity applications) include, for example, personal information manager applications (e.g., Microsoft Outlook) and email clients (e.g., Hotmail, Gmail, etc.). Examples of productivity applications that belong to the second group (e.g., NC productivity applications) include word processors (e.g., Microsoft Word, Apple's Pages, and WordPerfect), spreadsheets (e.g., Apple's Numbers and Microsoft Excel), presentation programs (e.g., Microsoft PowerPoint and Apple's Keynote), diagramming programs (e.g., Microsoft Visio), and so forth.

Currently, the most well-known suite of productivity applications is Microsoft's Office, which includes, among other things, Microsoft Word (a word processing application), Microsoft Excel (a spreadsheet), Microsoft PowerPoint (e.g. a presentation application), and so forth. For a number of years, such productivity applications were generally provided to end users via CD disks or via downloads from the Internet. Once downloaded from a CD disk or from the Internet, a productivity application would reside in and be entirely executed at a client device.

In recent years, a number of companies have begun offering a variety of software programs including productivity applications through "cloud computing." In cloud computing, software programs may not be stored and executed at an end user's client device but instead, may reside on the Internet. That is, in cloud computing a number of network devices including a number of network computers, servers, and/or data storage systems that may be located at multiple network sites may be employed in order to store, maintain, and execute software programs. About the only thing that client devices of end users may need to have in order to utilize a software application (e.g., a web-based productivity application) is an application interface for accessing the software application. Such application interfaces are typically provided by the service provider providing the "web-based" software application.

In some cases, these web-based applications that are available through the Internet may be provided to end users for free (e.g., without any fee being charged for usage). For example, search giant Google provides a suite of productivity applications called "Docs" for free. Since Google currently does not charge a fee to end users for using their web-based productivity applications, Google generates their revenue by other means such as through advertising. Although web-based productivity applications, such as those included in Google Docs, are fully functional productivity applications, these applications tend to have less features and less functionalities than their "pay-for" counterparts (e.g., those productivity applications that are only available through purchase such as the productivity applications included in Microsoft Office).

As a result, the current perception of these free web-based productivity applications are that although these applications are functional, they are "not as good" as their pay-for counterparts. For this reason as well as for security concerns (e.g., these web-based productivity applications require the processing and/or storage of data at third party servers), the adoption of these free web-based productivity applications for use by enterprises (e.g., companies, businesses, organizations, clubs, and so forth) has been slow and somewhat limited.

In accordance with various embodiments, methods, systems, circuitry, and computer program products are provided that may add end user value to, for example, web-based productivity applications. In particular, the methods, systems, circuitry, and computer program may provide ways to access and/or present to specific end users specific messages through the interfaces of web-based non-communication (NC) productivity applications that are traditionally not used for communicating messages. Examples of web-based NC productivity applications include, for example, a word processing application, a spreadsheet application, a presentation application, a publishing application, a diagramming application, a database management application, a document management application, an accounting management application, an engineering (or design) application, and a project management application. For purposes of the following description, examples of applications that are not considered as NC productivity applications include, for example, personal information manager applications (e.g., Microsoft Outlook), email clients (e.g., Hotmail, Gmail, etc.), and search applications (e.g., Internet Explorer).

The methods, systems, circuitry, and computer program products may be particularly designed to, among other things, detect one or more occurrences of one or more specific patterns of usage of one or more non-communication (NC) productivity applications by one or more end users. The methods, systems, circuitry, and computer program products may then be designed to provide to the one or more end users, in response to said detecting, access to one or more particular messages through one or more channels of one or more NC productivity application interfaces, the one or more NC productivity application interfaces for accessing the one or more NC productivity applications by the one or more end users.

Note that in the following description, the words "particular" or "specific" may be used in connection with "messages" or with "end users" or with "patterns of usage of one or more NC productivity applications." This is because from at least one perspective, the methods, systems, circuitry, and computer program products may allow, for example, for the matching of one or more messages from a group of messages with one or more end users from a group of end users based on detection of occurrences of certain patterns of usage of one or more NC productivity applications by the one or more end users. In some embodiments, and as will be further described herein, the detecting of the one or more occurrences of the one or more specific patterns of usage of the one or more NC productivity applications and the providing to the one or more end users of the access to the one or more particular messages may be in real-time. In general, the methods, systems, circuitry, and computer program products may allow an enterprise (e.g., a business or social organization), for example, to direct messages to "particular" end users (e.g., enterprise members) based on end user behavior or characteristics as displayed through usage of one or more NC productivity applications rather than based on the specific identities of the end users.

In various embodiments, the one or more NC productivity applications that may be used by the one or more end users may be one or more web-based NC productivity applications. In some embodiments, the one or more particular messages to be accessed by the one or more end users may include one or more messages that originate from an organizational unit of an enterprise associated with the one or more end users, from a member of the enterprise, and/or from one or more third parties who may be one or more independent parties of the enterprise associated with the one or more end users. In some cases, the one or more particular messages to be accessed may include one or more advertisements from one or more third parties.

Figure 1B:
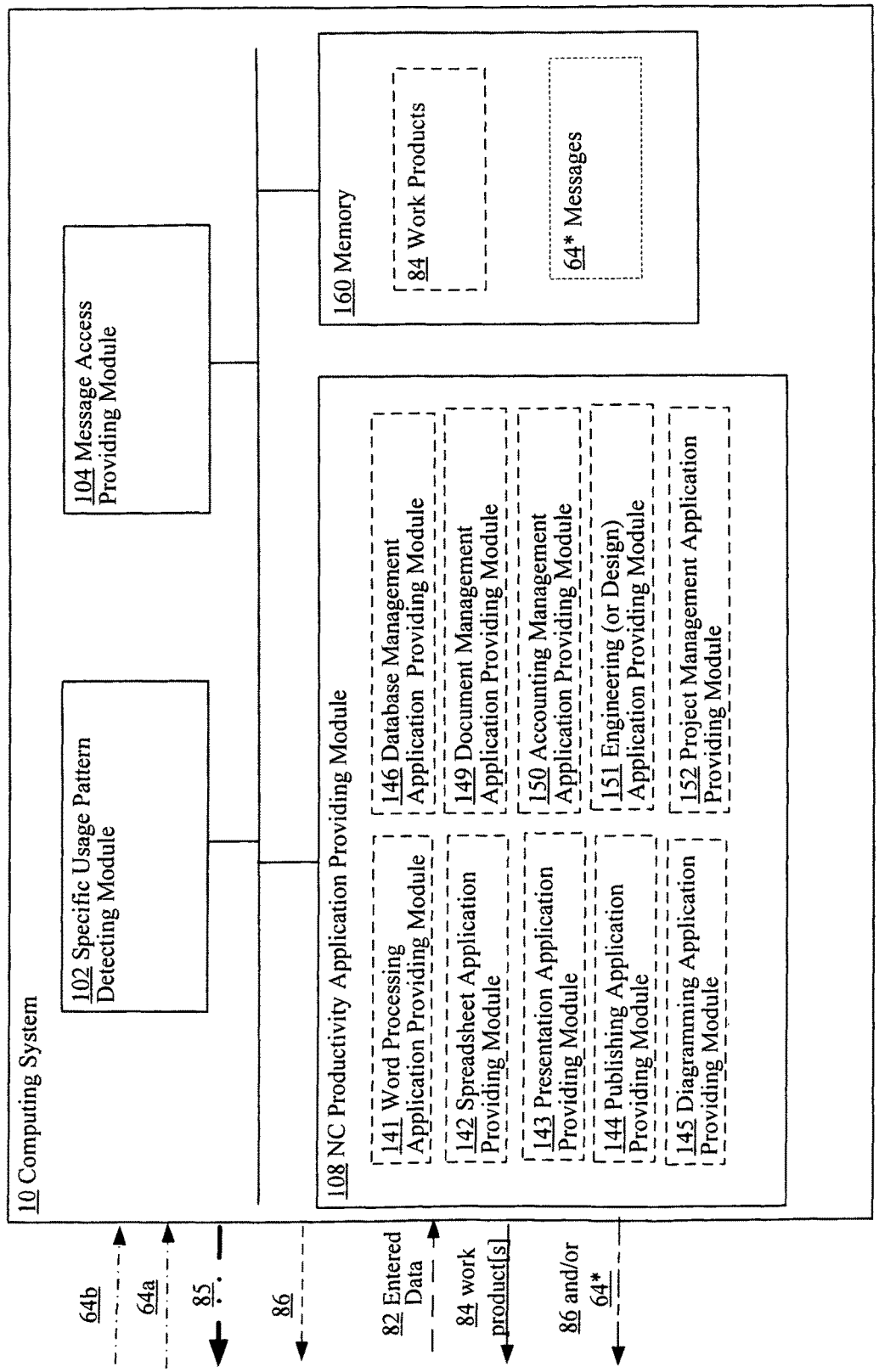

Turning now to FIGS. 1a, and 1b illustrating an example environment 100 in which the methods, systems, circuitry, and computer program products in accordance with various embodiments may be implemented by a computing system 10. In some embodiments, the computing system 10 may be a network device such as a server. Alternatively, the computing system 10 may be a plurality of network devices such as a plurality of network computers, servers, and storage devices.

In various embodiments, the computing system 10 may be designed to provide access to one or more web-based NC productivity applications to a group of end users 40*via one or more communication networks 20. Note that in the following description, "*" represents a wildcard. Thus, references to, for example, "end users 40*" of FIG. 1a may be in reference to end user 40a, end user 40b, end user 40c, end user 40d, end user 40e, end user 40f, and/or end user 40g. In some embodiments, the group of end users 40* may be associated with each other as a result of being, for example, members of an organization such as an enterprise 30 (e.g., a business enterprise such as a company or corporation, or other types of groups such as a non-profit group, a social or athletic club, and so forth).

In order to provide access to one or more web-based NC productivity applications, the computing system 10 may be designed to provide to one or more end users 40* one or more NC productivity application interfaces for accessing the one or more web-based NC productivity applications. Note that for ease of illustration and explanation, discussions in the following relating to an "NC productivity application" will be in reference to a "web-based" NC productivity application. The one or more NC productivity application interfaces to be provided by the computing system 10 may be provided to one or more end users 40* via the one or more communication networks 20. The one or more NC productivity application interfaces that may be provided to end users 40* may be one or more display interfaces (e.g., interfaces displayed or implemented through display monitors) and/or one or more audio interfaces (e.g., interfaces indicated or implemented through audio systems).

There are at least two types of NC productivity application interfaces that may be provided by the computing system 10. The first type of NC productivity application interfaces that may be provided to end users 40* for accessing one or more NC productivity applications are conventional NC productivity application interfaces 85 that do not include channels for accessing messages. The second type of NC productivity application interfaces that may be provided to end users 40* for accessing one or more NC productivity applications are NC productivity application interfaces 86 that do have one or more channels for accessing messages. Note that in either case, the one or more interfaces to be provided may be one or more display interfaces and/or one or more audio interfaces.

Figure 3A:
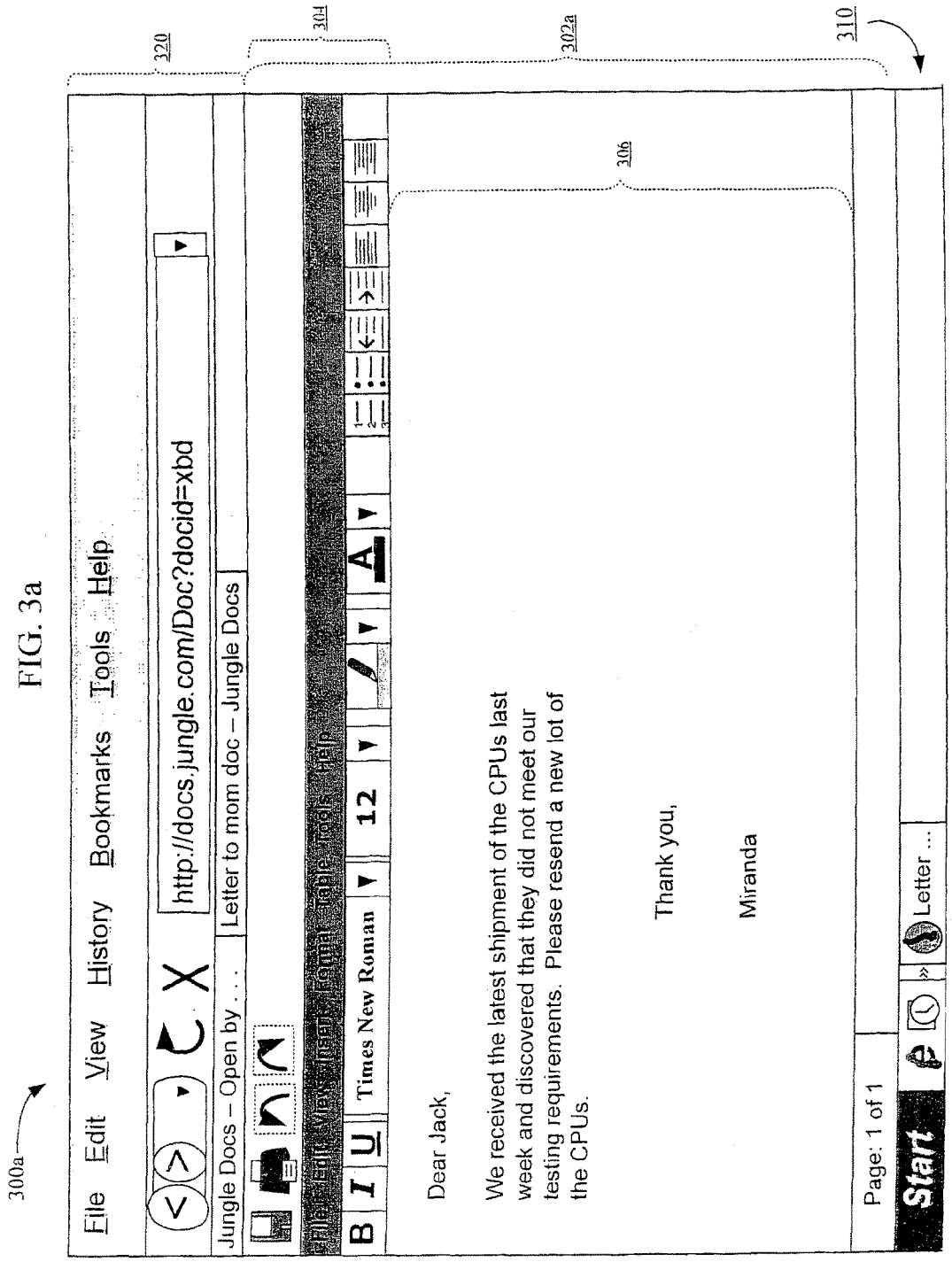
FIG. 3a shows a conventional web-based non-communication productivity application interface as displayed on a display screen.

In some embodiments, the computing system 10 may at least initially provide to a group of end users 40* one or more conventional NC productivity application interfaces 85 (e.g., display interfaces and/or audio interfaces) that do not have any channels for accessing messages but do allow end users 40* to at least access one or more NC productivity applications. As will be further described herein, an example of such an NC productivity application interface 85 is illustrated in FIG. 3a. In particular, FIG. 3a shows a display interface 302a for accessing an NC productivity application (e.g., a web-based word processing application) that does not include a channel for accessing messages 64*. A will be further described herein, for these embodiments the computing system 10 may subsequently provide to one or more selective end users 40*(e.g., end users 40e and 40f in the illustrated example of FIGS. 1a and 1b), one or more NC productivity application interfaces 86 that includes one or more channels for accessing messages 64*.

In alternative embodiments, however, the computing system 10 may be designed to directly provide to the group of end users 40*, without initially providing to the end users 40* the one or more conventional NC productivity application interfaces 85, one or more NC productivity application interfaces 86 (either display or audio interfaces) that includes the one or more channels for accessing messages 64*. As will be further described herein, examples of such NC productivity application interfaces 86 are depicted in FIGS. 3b to 3m. In particular, FIGS. 3b to 3m show display interfaces 302* for accessing a web-based NC productivity application (a word processing application) that have channels (e.g., display windows 307* in FIGS. 3b to 3m) for accessing messages 64*(e.g., display messages 308* in FIGS. 3b to 3m).

Referring back to the example environment 100 of FIGS. 1a and 1b, the computing system 10 may be designed to acquire one or more messages 64* for selective accessing by one or more particular end users 40* through one or more interfaces of one or more NC productivity applications. The one or more messages 64* may be acquired from a variety of sources. For example, in various embodiments, the computing system 10 may acquire one or more messages 64a from an enterprise 30 (e.g., a business, a political, a social, or a charitable organization) associated with the group of end users 40*, from one or more organizational units of the enterprise 30, and/or from one or more members (e.g., end users 40*) of the enterprise 30. In some embodiments, the computing system 10 may alternatively or additionally acquire one or more messages 64b from one or more third parties 70. The one or more third parties 70 may be completely independent (e.g., unaffiliated or not associated) from the end users 40* or from the enterprise 30. In some embodiments, the one or more third parties 70 may be one or more enterprises that may be independent from the group of end users 40* or from an enterprise 30 associated with the end users 40*. For these embodiments, the one or more messages 64b to be acquired from the one or more third parties 70 may be advertisements. In various embodiments, the messages 64* to be acquired by the computing system 10 may be acquired via the one or more communication networks 20.

As described above, the computing system 10 may be designed to communicate with end users 40* via one or more communication networks 20. In various embodiments, the one or more communication networks 20 may include one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. For these embodiments, the computing system 10 may communicate with end users 40* and/or third parties 70 via the Internet.

In order to provide access to one or more NC productivity applications to end users 40*, the computing system 10 may communicate with the client devices, herein end user devices 50*, of the end users 40*. Examples of end user devices 50* include, for example, laptops, desktops, Netbook, workstations, Smartphones, and so forth. After accessing one or more NC productivity applications through one or more interfaces (e.g., one or more NC productivity interfaces 85 and/or one or more NC productivity interfaces 86), an end user 40*, such as the end user 40a in FIG. 1a, may use the accessed one or more NC productivity applications by entering or inputting data 82 through the one or more corresponding interfaces (e.g., one or more NC productivity interfaces 85 and/or one or more NC productivity interfaces 86). For example, if the NC productivity application to be used is a word processing application, then end user 40a may enter text data, among other types of data, through the corresponding NC productivity interface 85 or 86 in order to use the word processing application.

Note that in the following, data 82 may be referred to as "entered" data 82 or may be referred to as "collected" data 82 depending on which perspective is the data 82 being viewed from. That is, data 82 may be considered by an end user 40* as being "entered" data 82, while the same data 82 may be considered "collected" data 82 from the perspective of the computing system 10. Thus, for purposes of the following description, "collected" data 82 and "entered" data 82 will be synonymous and will be in reference to the same data 82.

After collecting the data 82 from, for example, end user 40a, the computing system 10 may process the collected data 82 using the appropriate NC productivity application. As a result of processing the collected data 82, one or more work products 84 may be generated. The generated work products 84 may then be stored in memory 160 and/or may be transmitted back to end user 40a or other parties (e.g. other end users 40*). Note that the above description of the relationships between the computing system 10 and the group of end users 40*(who may be associated with enterprise 30) was provided in order to facilitate an understanding of some of the other features of the computing system 10 as will be described herein.

In particular, the computing system 10 may be designed to initially detect one or more occurrences of one or more specific patterns of usage of one or more NC productivity applications by one or more end users 40*. In some embodiments, this initial "detection" operation may be executed in order to identify those end users 40* who, in a subsequent operation, may be provided access to one or more particular messages 64*. In the same or different embodiments, the initial detection operation may also be executed in order to initiate the subsequent operation to provide to the one or more end users 40* access to the one or more particular messages 64*. In the same or different embodiments, the initial detection operation may be executed in order to make a determination that the one or more particular messages 64* that may be presented to the one or more end user 40* are relevant to the one or more users 40* at least based on the one or more end users 40* pattern of usage of the one or more NC productivity applications.

In any event, after executing the detection operation, the computing system 10 may then be designed to provide to the one or more end users 40*(e.g., end users 40e and 40g in FIGS. 1a and 1b), in response to the detecting of the one or more occurrences of the one or more specific patterns of usage, access to the one or more particular messages 64* through one or more channels of one or more NC productivity application interfaces 86. Both the detection operation and the operation to provide access to the one or more particular messages 64* may be executed in a number of different ways by the computing system 10. Note that, for illustrative purposes only, only end users 40e and 40g from the group of end users 40* in FIGS. 1a and 1b are depicted as having access to (e.g., being presented with) the one or more messages 64*. Of course, and although not depicted, in other implementations only a single end user 40*(e.g., end user 40a), or more than three of the end users 40*(e.g., end users 40a, 40b, 40c, and so forth) may have access to the one or more messages 64*.

In any event, the computing system 10 may detect the one or more occurrences of the one or more specific patterns of usage of the one or more NC productivity applications by the one or more end users 40* in a number of alternative ways in various alternative embodiments. For instance in some embodiments, the computing system 10 may be designed to monitor the data 82 entered by end users 40* and collected by the computing system 10 in order to detect whether one or more specific patterns of usage of one or more NC productivity applications have occurred. For example, if an end user 40*, such as end user 40e of FIG. 1a, is using a particular NC productivity application (e.g., a word processing application or a spreadsheet application) by entering data 82 through the particular NC productivity application (e.g., entering through the interface of the particular NC productivity application), then the computing system 10 may collect and monitoring the data 82 entered by the end user 40e in order to determine whether one or more specific patterns of usage has occurred.

Specifically, in order to determine whether the one or more specific patterns of usage has occurred, the computing system 10, in some embodiments, may parse (e.g., scan or analyze) the collected data 82 in order to determine whether the collected data 82 include data that represent one or more specific words or terms that may be of interest. For example, in some embodiments, determining whether the collected data 82 include data that represents specific words or terms that may be relevant to the content of the one or more particular messages 64\* to be accessed. In some cases, rather than merely determining whether the collected data 82 include data that indicate specific words or terms, the computing system 10 may determine or identify whether the collected data 82 include data that represent specific combinations (e.g. sequential or spatial combinations) of words or terms. For example, the computing system 10 may determine whether the collected data 82 include data that indicate a particular sequence of words (e.g., a specific sentence or phrase).

In other embodiments, the computing system 10 may parse the collected data 82 in order to determine whether the collected data 82 include data that represent one or more specific symbols or icons (e.g., figures, emoticons, signs, marks, and so forth). For example, in some embodiments, determining whether the collected data 82 include data that represents specific symbols or icons that may be relevant to the content of the one or more particular messages 64\* to be accessed. For instance, if the one or more particular messages 64\* include a message containing content that relate to Christmas, than determining whether the collected data 82 include data that represent a Christmas tree figure.

In still other embodiments, the computing system 10 may parse the collected data 82 in order to determine whether the collected data 82 include data that represent one or more specific numerical values (e.g., dates, monetary values, physical measurements or units, financial numbers, model numbers, and so forth). For example, in some embodiments, determining whether the collected data 82 include data that represents specific numerical values that may be relevant to the content of the one or more particular messages 64\* to be accessed. For instance, if the one or more particular messages 64\* include a message containing content that relate to Christmas, than determining whether the collected data 82 include data that represent the numerical date of Christmas (e.g., 12/25).

In yet other embodiments, the computing system 10 may parse the collected data 82 in order to determine whether the collected data 82 include data that represent one or more specific words, one or more specific symbols, and/or one or more specific numerical values. For example, in some embodiments, determining whether the collected data 82 include data that represents one or more specific words, one or more specific symbols, and/or one or more specific numerical values that may be relevant to the content of the one or more particular messages 64\* to be accessed. In some cases, rather than merely determining whether the collected data 82 include data that indicate one or more specific words, one or more specific symbols, and/or one or more specific numerical values, the computing system 10 may determine or identify whether the collected data 82 include data that represent specific combinations (e.g. sequential or spatial combinations) of specific words, specific symbols, and/or specific numerical values.

In some embodiments, the computing system 10 may detect the one or more occurrences of the one or more specific patterns of usage of the one or more NC productivity applications by at least determining whether, for example, one or more end users 40\* used one or more NC productivity applications with respect to one or more specific parties (e.g., one or more third parties 70 such as one or more clients or vendors). In other words, determining whether one or more NC productivity applications, as provided by the computing system 10, were used by one or more end users 40\* for a specific party or parties. This may mean that the computing system 10 determines whether the one or more NC productivity applications were used by the one or more end users 40\* to generate work products for the one or more specific parties (e.g., to generate work products on behalf of the one or more specific parties). In some cases, the computing system 10 may look to the content of work products or metadata associated with the work products that are generated using the one or more NC productivity applications in order to determine whether the one or more NC productivity applications were used by the one or more end users 40\* for the one or more specific parties.

In some embodiments, the computing system 10 may detect the one or more occurrences of the one or more specific patterns of usage of the one or more NC productivity applications by at least determining whether, for example, one or more end users 40\* used one or more NC productivity applications with respect to one or more specific subjects (e.g., one or more topics or issues). In other words, determining whether one or more NC productivity applications, as provided by the computing system 10, were used by one or more end users 40\* for addressing a specific subject or subjects. This may mean that the computing system 10 determines whether the one or more NC productivity applications were used by the one or more end users 40\* to generate work products related to the one or more specific subjects. In some cases, the computing system 10 may look to the content of work products or metadata associated with the work products that are generated using the one or more NC productivity applications in order to determine whether the one or more NC productivity applications were used by the one or more end users 40\* for the one or more specific subjects.

In some embodiments, the detection or determination by the computing system 10 of the one or more occurrences of the one or more specific patterns of usage of the one or more NC productivity applications by the one or more end users 40\* may be in real-time. The phrase "in real-time" as used here may be in reference to the determination or detection of the occurrence of the one or more specific patterns of usage of the one or more NC productivity applications by the one or more end users 40\* being made within five seconds, within two seconds, or within a fraction of one second of the one or more specific patterns occurring.

Once the computing system 10 has detected the one or more occurrences of the one or more specific patterns of usage of the one or more NC productivity applications, the identities of the one or more end users 40\* (e.g., end users 40e and 40g in the illustrated example of FIGS. 1a and 1b) who should be or who are to be provided access to the one or more particular messages 64\* will be known. Note that the word "identities" as used above should be broadly interpreted since there are many ways to "identify" those end users 40* who are to be provided access to the one or more particular messages 64*.

As with the detection operation described above for detecting the one or more occurrences of the one or more specific patterns of usage of the one or more NC productivity applications, the operation for providing the access to one or more particular messages 64* to the one or more end users 40* may be performed by the computing system 10 in a number of different ways in various alternative embodiments. For example, the operation for providing the access to one or more particular messages 64* to the one or more end users 40*by the computing system 10 may be executed in at least two different ways depending upon whether or not the one or more end users 40*, who through the detection operation described above are designated to have access to the one or more particular messages 64*, already have the appropriate NC productivity application interfaces 86 (with the channels) for accessing the one or more particular messages 64*.

If the one or more end users 40*(e.g., end users 40e and 40g in the example illustrated in FIGS. 1a and 1b) or at least their associated end user devices 50*(e.g., end user devices 50e and 50g in the example illustrated in FIGS. 1a and 1b) do not already have the appropriate one or more NC productivity application interfaces 86 with the one or more channels for accessing the one or more particular messages 64*, then the computing system 10 may be designed to provide to the one or more end users 40*(e.g., end users 40e and 40g in FIGS. 1a and 1b) one or more NC productivity application interfaces 86 with the one or more channels for accessing the one or more particular messages 64*. In some embodiments, this may mean that the computing system 10 may at least initially transmit, via the one or more communication networks 20, one or more electronic copies of the one or more NC productivity application interfaces 86 to the one or more end users 40*(e.g., via the one or more end user devices 50*). In some embodiments, the providing of the appropriate one or more NC productivity application interfaces 86 to the one or more end users 40*(e.g., end users 40e and 40g in FIGS. 1a and 1b) may be in real-time (e.g., within five seconds of detecting of the specific patterns of usage, within two seconds of detecting of the specific patterns of usage, or within a fraction of one second of detecting of the specific patterns of usage).

In embodiments where one or more NC productivity application interfaces 86 are provided to the one or more end users 40*, the one or more NC productivity application interfaces 86 may be for accessing one or more of a word processing application, a spreadsheet application, a presentation application, a publishing application, a diagramming application, a database management application, a document management application, an accounting application, an engineering or design application, and a project management application. In various embodiments the one or more NC productivity application interfaces 86 to be provided by the computing system 10 may include one or more display interfaces and/or one or more audio interfaces. If one or more NC productivity application display interfaces (e.g., display interfaces 302* of FIGS. 3b to 3m) are indeed provided by the computing system 10 to the one or more end users 40* then the display interfaces 302* to be provided may include at least one channel in the form of a display window 307* as illustrated in FIGS. 3b to 3m. A more detailed discussion related to NC productivity application display interfaces that may be provided by the computing system 10 will be presented below with respect to the display interfaces 302* of FIGS. 3b to 3m.

After providing the one or more NC productivity application interfaces 86 (e.g., display interfaces 302* of FIGS. 3b to 3m) to the one or more end users 40*(e.g. end users 40e and 40g of FIGS. 1a and 1b), the one or more particular messages 64* may be presented to the one or more end users 40* via the one or more channels of the one or more NC productivity application interfaces 86. In some cases, the one or more particular messages 64* may be presented by displaying or indicating the one or more particular messages 64* through the one or more channels of the NC productivity application interfaces 86. Alternatively, the one or more particular messages 64* may be presented by merely displaying or indicating through the one or more channels of the one or more NC productivity application interfaces 86 one or more links, such as one or more hyperlinks, to the one or more particular messages 64*.

In embodiments where the one or more end users 40* (e.g., end users 40e and 40f of FIGS. 1a and 1b) already have the appropriate one or more NC productivity application interfaces 86 (with one or more channels), the one or more end users 40* or their associated end user devices 50* may be directly or immediately presented with the one or more particular messages 64*. For these embodiments, the one or more particular messages 64* may be presented through the one or more channels of the one or more NC productivity application interfaces 86. As described previously, the one or more messages 64* may include, in some cases, one or more audio messages and/or one or more display messages 308* (see FIGS. 3b to 3m). In some embodiments, the one or more particular messages 64* may be presented by providing through the one or more channels of the one or more NC productivity application interfaces 86 one or more links (e.g., hyperlinks) to the one or more particular messages 64*.

In order to present the one or more particular messages 64* through the one or more channels of the one or more NC productivity application interfaces 86, the computing system 10 may be designed to transmit, via the one or more communication networks 20, the one or more particular messages 64* to the one or more end users 40* (e.g., end users 40e and 40g of FIGS. 1a and 1b) via the one or more end user devices 50*(e.g. end user devices 50e and 50g). In some cases, the one or more particular messages 64* may be transmitted via the Internet.

As described earlier, the one or more particular messages 64* to be presented may originate from a variety of sources including, for example, from an enterprise 30 that may be associated with the group of end users 40*, from one or more organizational units of the enterprise 30, or from one or more members of the enterprise 30. The one or more particular messages 64* may also include, in some embodiments, messages from one or more third parties 70 who may be independent from (e.g. unassociated with) an enterprise 30 that is associated with the end users 40*. In cases where the one or more messages 64* include messages from third parties 70, such messages may be advertisements from third party advertisers.

As indicated earlier, one possible outcome as a result of executing the detection operation is the determination that the one or more particular messages 64* that may be presented to the one or more end user 40* are relevant to the one or more end users 40* based on the one or more end users 40* pattern of usage of the one or more NC productivity applications. As a result, an operation for presenting through the one or more channels of the one or more NC productivity application interfaces 86 may include the computing system 10 presenting through the one or more channels of the one or more NC productivity application interfaces 86 one or more particular messages 64* that have been determined to be relevant with respect to the one or more end users 40* pattern of usage of the one or more NC productivity applications (e.g. relevant with respect to the data 82 entered by the one or more end users 40* using the one or more NC productivity applications or relevant with respect to work-products generated by the one or more end users 40* using the one or more NC productivity applications).

Turning specifically now to the computing system 10 of FIG. 1b. The computing system 10, as depicted, may include a variety of modules, sub-modules, and various other components. The computing system 10, in some embodiments, may be a single network device such as a single network computer, a single server, a single workstation, and so forth. Alternatively, the computing system 10 may be a collection of network devices including a collection of one or more servers, one or more network computers, one or more storage devices and/or one or more other network devices. Thus, the computing system 10 may be implemented at a single network site or at multiple network sites.

Figure 2A:
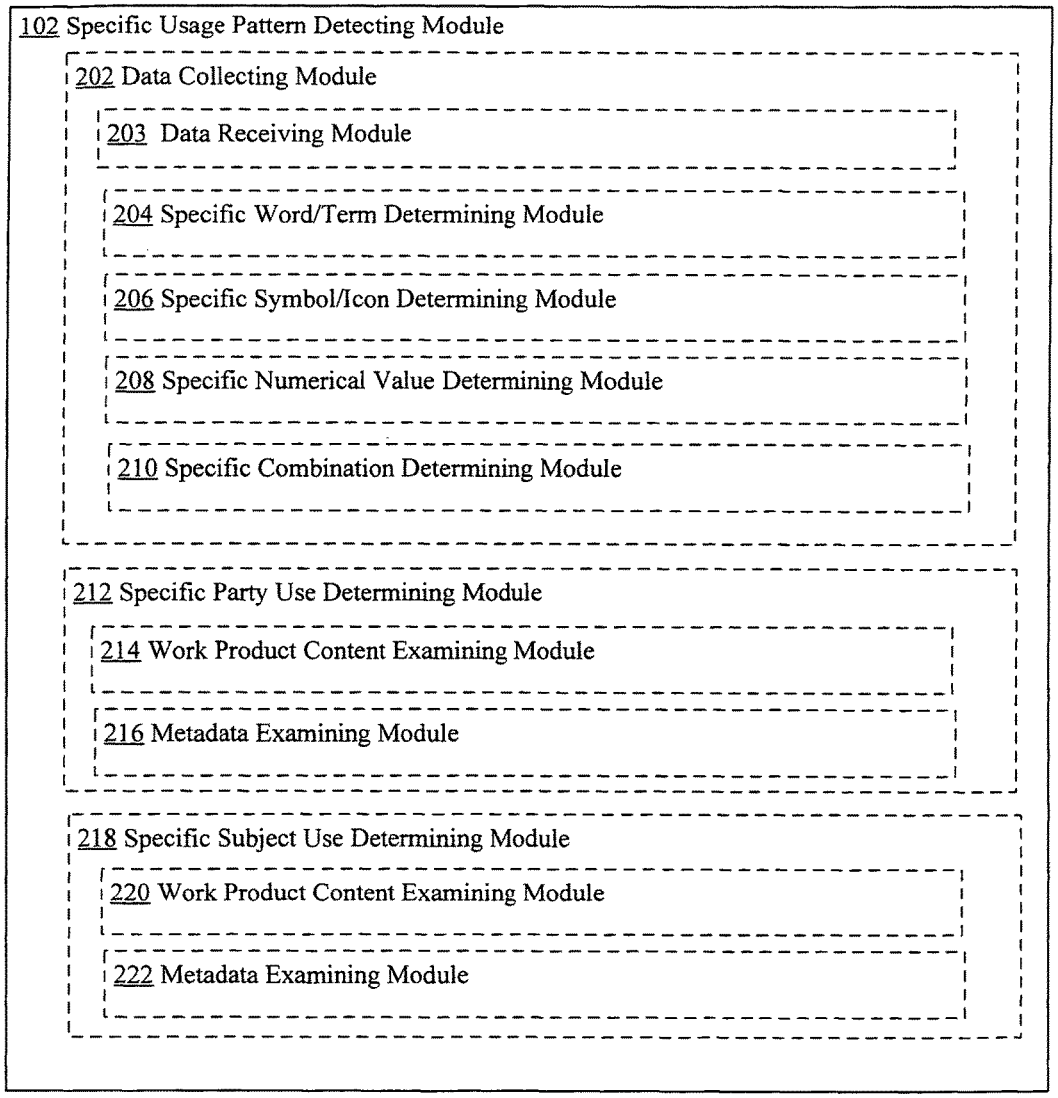
FIG. 2a shows another perspective of the specific usage pattern detecting module 102 of the Computing System 10 of FIG. 1b.

As shown, the computing system 10 may include at least a specific usage pattern detecting module 102 (which may further include one or more sub-modules as illustrated in FIG. 2a) and a message access providing module 104 (which may further include one or more sub-modules as illustrated in FIG. 2b). In various embodiments, the computing system 10 may also include a non-communication (NC) productivity application providing module 108 and/or a memory 160. Although not depicted, the computing system 10 may also include other additional components such as a message receiving module, a work-product transmitting module, and so forth. In various embodiments, the various modules included in the computing system 10 including the specific usage pattern detecting module 102

In various embodiments, the specific usage pattern detecting module 102 may be configured to, for example, detect one or more occurrences of one or more specific patterns of usage of one or more non-communication (NC) productivity applications by one or more end users 40*(e.g., end user 40e and end user 40g in the example illustrated in FIGS. 1a and 1b). In contrast, the message access providing module 104 may be configured to, among other things, provide to the one or more end users 40*(e.g., end users 40e and 40g of FIGS. 1a and 1b), in response to said detecting, access to one or more particular messages 64* through one or more channels of one or more NC productivity application interfaces 86, the one or more NC productivity application interfaces 86 for accessing the one or more NC productivity applications (e.g., a word processing application, a spreadsheet application, a presentation application, and so forth) by the one or more end users 40*.

As indicated earlier, the computing system 10 may include an NC productivity application providing module 108 that may be designed to provide access to one or more web-based NC productivity applications. In some cases, the one or more web-based NC productivity applications may be further accessed via one or more NC productivity application interfaces 85 (e.g., interfaces without one or more channels for accessing messages 64*) and/or via one or more NC productivity application interfaces 86 (e.g., interfaces with one or more channels for accessing messages 64*). In some embodiments, the NC productivity application providing module 108 may further include one or more sub-modules for providing access to specific productivity applications including, for example, a word processing application providing module 141, a spreadsheet application providing module 142, a presentation application providing module 143, a publishing application providing module 144, a diagramming application providing module 145, a database management application providing module 146, a document management application providing module 149, an accounting management application providing module 150, an engineering or design application providing module 151, and/or a project management application providing module 152. In some embodiments, the NC productivity application providing module 108 and its sub-modules may be implemented using multiple servers.

In some embodiments, the computing system 10 may include a memory 160 for storing various types of data. For these embodiments, memory 160 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 160 may be located at a single network site. Alternatively, memory 160 may be located at multiple network sites.

In various embodiments, memory 160 may store work products generated by one or more end users 40* using, for example, one or more NC productivity applications. Additionally, memory 160 may also store messages 64* from a variety of sources including one or more messages 64a from an enterprise 30 (e.g., an organization) associated with a group of users 40* or a member of the enterprise, and/or one or more messages 64b from one or more third parties 70, who may be independent from the enterprise 30 and who in some cases may be third party advertisers.

Referring now to FIG. 2a illustrating a particular implementation of the specific usage pattern detecting module 102 of FIG. 1b. As illustrated, the specific usage pattern detecting module 102 may include one or more sub-modules in various alternative implementations. For example, in some implementations, the specific usage pattern detecting module 102 may include a data collecting module 202, a specific party use determining module 212, and/or a specific subject use determining module 218. In embodiments in which the specific usage pattern detecting module 102 includes a data collecting module 202, the data collecting module 202 may further include a data receiving module 203, a specific word/term determining module 204, a specific symbol/icon determining module 206, a specific numerical value determining module 208, and/or a specific combination determining module 210.

In embodiments in which the specific usage pattern detecting module 102 includes a specific party use determining module 212, the specific party use determining module 212 may further include a work product content examining module 214 and/or a metadata examining module 216. In embodiments in which the specific usage pattern detecting module 102 includes a specific subject use determining module 218, the specific subject use determining module 218 may further include a work product content examining module 220 and/or a metadata examining module 222. Specific details related to the above-described sub-modules of the specific usage pattern detecting module 102 will be provided below with respect to the operations and processes to be described herein.

Referring now to FIG. 2b illustrating a particular implementation of the message access providing module 104 of FIG. 1b. As illustrated, the message access providing module 104 may also include one or more sub-modules in various alternative implementations. For example, in some implementations, the message access providing module 104 may include an NC productivity application interface providing module 224 and/or a message presenting module 226. In embodiments in which the message access providing module 104 includes an NC productivity application interface providing module 224, the NC productivity application interface providing module 224 may further include an NC productivity application interface transmitting module 230 (which may further include a network transmitting module 232 and/or an Internet transmitting module 234), an NC productivity application audio interface providing module 236, and/or an NC productivity application display interface providing module 238.

In embodiments in which the message access providing module 104 includes a message presenting module 226, the message presenting module 226 may include an audio message presenting module 240, a display message presenting module 242, a link presenting module 244, a message transmitting module 246, and/or a relevant message determining module 248. Specific details related to the above-described sub-modules of the message access providing module 104 will be provided below with respect to the operations and processes to be described herein.

FIG. 3a illustrates a conventional non-communication (NC) productivity application interface for accessing a web-based word processing application in the form of a display interface 302a that is presented on a display screen 300a. In this illustrated example of the conventional NC productivity application interface in the form of the display interface 302a, the conventional NC productivity application interface (e.g., display interface 302a) does not include a channel for accessing messages. For example, in the illustrated example, the display screen 300a merely includes a display interface 302a but does not include a channel such as a window or a port for accessing or displaying messages. In this example, the display interface 302a is the NC productivity application interface for accessing a web-based non-communication productivity application which, in this example, is a web-based word processing application. At the bottom of the display monitor screen 300a is the operating system's status bar 310, while at the top of the computer monitor display 300a is a web-browser tool/status bar 320.

The conventional display interface 302a includes two portions, a tool-bar portion 304 and a workspace portion 306. The tool-bar portion 304 includes various functional/command icons for executing various commands and functionalities. In some cases, the tool-bar portion 304 may also be a tool/status bar. The workspace portion 306 is the portion of the display interface 302a through which, for example, an end user 40* may enter data, view the entered data, and/or to receive and/or view the resulting processed data. In the example illustrated in FIG. 3a, the display interface 302a is being employed in order to draft a letter.

Note that for ease of illustration and explanation, only the display interfaces (e.g., display interfaces 302* of FIGS. 3b to 3m) associated with a web-based word processing application will be discussed and illustrated herein. That is, although the display interfaces of other web-based non-communication productivity applications (e.g., spreadsheet applications, presentation applications, data management applications, diagramming applications, and so forth) are not discussed or illustrated in the following, the following discussions directed to the display interfaces 302* of FIGS. 3b to 3m that are associated with a web-based word processing application will be equally applicable to display interfaces of other types of web-based non-communication productivity applications in accordance with various embodiments. That is, since the display interfaces of other types of non-communication productivity applications will generally include similar components such as at least a tool-bar portion 304 and a workspace portion 306, the following discussions related to the display interfaces 302* of a word processing application will be applicable to the display interfaces of other types of NC productivity applications.

As briefly described above and in accordance with various embodiments, the computing system 10 may be designed to provide one or more NC productivity application interfaces 86 that include one or more channels for accessing messages in a variety of forms including, for example, in audio form or in display form. For example, FIGS. 3b, 3c, 3d, 3e, 3f, 3g, 3h, 3i, 3j, 3k, 3l, and 3m illustrate eight alternative implementations of the NC productivity application interface 86 (with at least one channel for accessing messages) in display forms (e.g., display interfaces 302b, 302d, 302e, 302g, 302h, 302j, 302k, and 302m of FIGS. 3b to 3m).

Figure 3B:
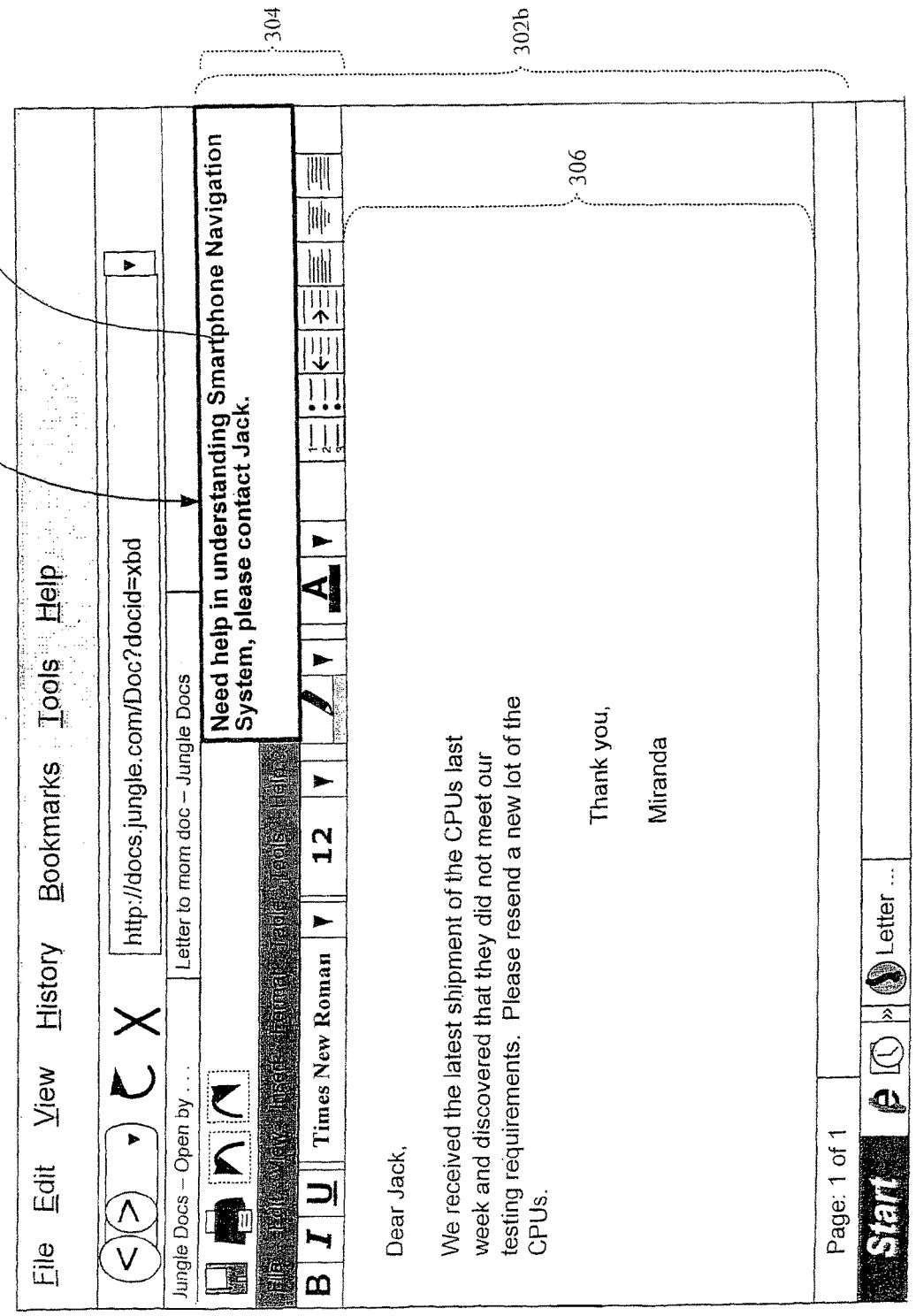
FIG. 3b shows one implementation of a web-based non-communication productivity application interface with a channel for displaying messages as displayed on a display screen.

Turning now to FIGS. 3b and 3c illustrating one implementation of one of the NC productivity application interfaces 86 of FIGS. 1a and 1b in display form (e.g., display interface 302b) that includes a channel for accessing messages 64*(e.g., in the form of a display message 308*). In particular, FIGS. 3b and 3c shows a channel in the form of a display interface 302b at two different points or intervals in time. For example, FIG. 3b shows the display interface 302b for accessing a web-based productivity application (e.g., a word processing application) that includes a channel (e.g., in the form of a display window 307b) for accessing a display message 308b (e.g., one of the messages 64* of FIGS. 1a and 1b) during a first point or interval in time. In this example, the channel for accessing the display message 308b is a display window 307b that is disposed on the tool-bar portion 304 of the display interface 302b. Note that in this example, the display window 307b is not disposed on any of the icons included in the conventional display interface 302a of FIG. 3a. Instead, the display window 307b is disposed on the unused portion of the tool-bar portion 304. Within the display window 307b is the display message 308b.

Turning now to FIG. 3c, which shows the display interface 302b of FIG. 3b during a second point or interval in time. In the display interface 302b, the display window 307b displays a different display message 308c from the display message 308b displayed through the display window 307b during the first point or interval in time as illustrated in FIG. 3b. In this case, the display message 308c that is displayed through the display window 307b is an advertisement from a third party 70. Thus, in this implementation (e.g., as illustrated by FIGS. 3b and 3c), multiple display messages 308b and 308c (e.g., messages 64a and 64b in FIGS. 1a and 1b) may be presented or displayed sequentially (e.g., one at a time) through a channel that includes only a single window 307b. Note that although the messages 64*(e.g., display messages 308b and 308c) in the implementation depicted by FIGS. 3b and 3c are directly displayed through the display window 307b, in other alternative embodiments, the messages 64* may alternatively be accessed by including into the window 307* one or more links, such as one or more hyperlinks, to the messages 64*(e.g., display messages 308b and 308c).

Figure 3D:
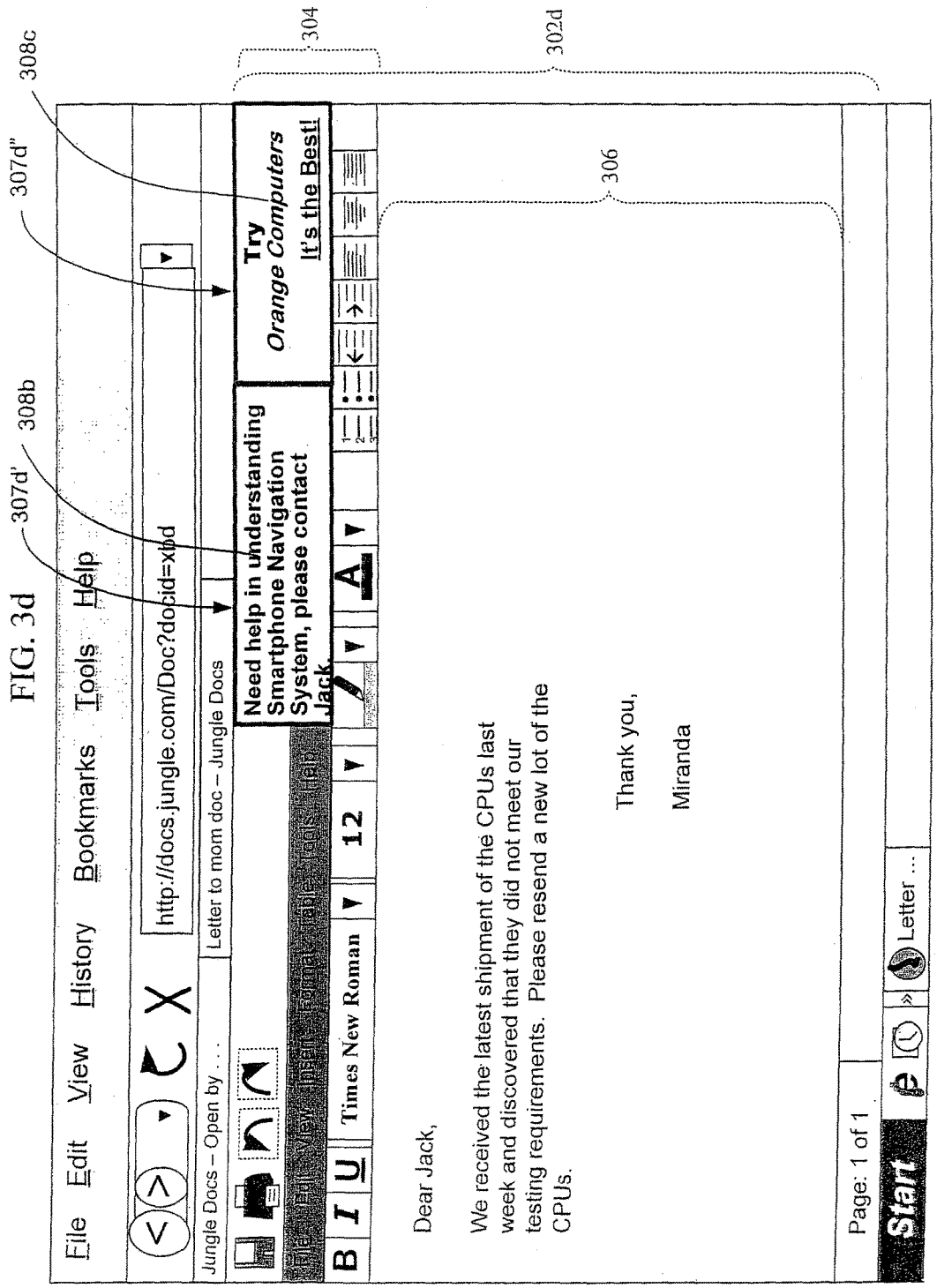
FIG. 3d shows one implementation of another web-based non-communication productivity application interface with a two-window channel for displaying messages as displayed on a display screen.

Turning now to FIG. 3d depicting another implementation of the NC productivity application interface 86 of FIGS. 1a and 1*b* in display form (e.g. display interface 302*d*) that includes a channel for accessing multiple messages 64*(e.g., display message 308*b* and display message 308*e*). In particular, FIG. 3*d* shows a display interface 302*d* with a channel in the form of two display windows 307*d'* and 307*d"* for concurrently displaying multiple display messages 308*b* and 308*c*. Thus, in the implementation depicted in FIG. 3*d*, display message 308*b* and display message 308*c* (e.g., messages 64*a* and 64*b* in the illustrated example of FIGS. 1*a* and 1*b*) may be concurrently displayed through multiple display windows 307*d'* and 307*d"*. Note that the combination of display window 307*d'* and display window 307*d"* of FIG. 3*d* occupies the same real estate on the tool-bar portion 304 as occupied by the display window 307*b* of FIGS. 3*b* and 3*c*. Although only two display windows 307*d'* and 307*d"* were described and illustrated in the embodiment described above, in other embodiments, a channel for accessing multiple messages may include more than two display windows 307*d'* and 307*d"*.

Figure 3E:
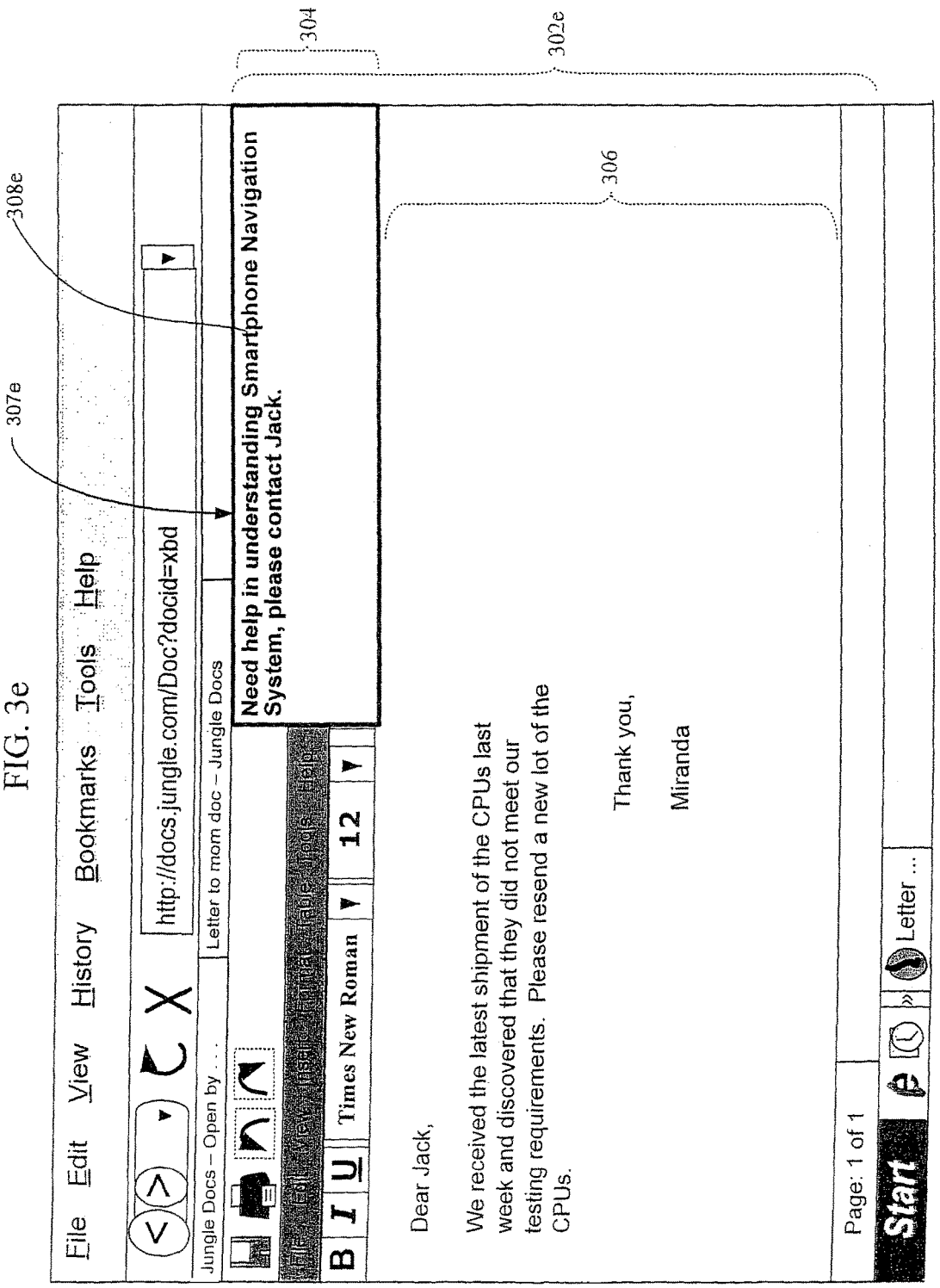
FIG. 3e shows one implementation of another web-based non-communication productivity application interface with a channel for displaying messages as displayed on a display screen.
Figure 3F:
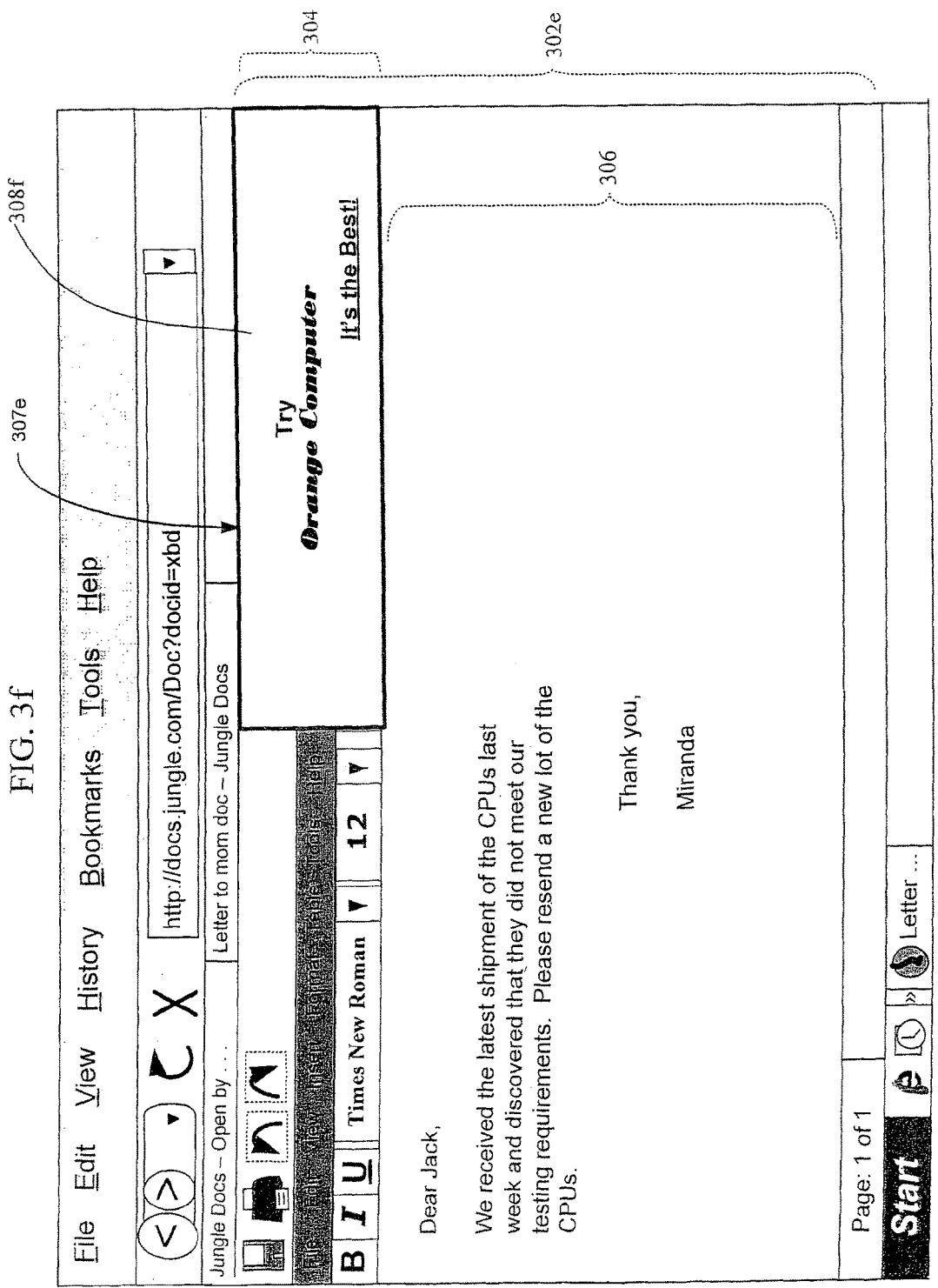
FIG. 3f shows another implementation of the web-based non-communication productivity application interface of FIG. 3e as displayed on a display screen.

Referring now to FIGS. 3*e* and 3*f* illustrating another implementation of the NC productivity application interface 86 of FIGS. 1*a* and 1*b* in display form (e.g., display interface 302*e*) that includes a channel for accessing messages 64*. In particular, FIGS. 3*e* and 3*f* show a display interface 302*e* at two different points or intervals in time. For example, FIG. 3*e* shows the display interface 302*e* for accessing a web-based productivity application (e.g., word processing application) that includes a channel (e.g., in the form of a display window 307*e*) for accessing a display message 308*e* during a first point or interval in time.

In this example, the channel for accessing the display message 308*e* is a display window 307*e* that is disposed entirely on a tool-bar portion 304 of the display interface 302*e* and that displays the message 308*e* (note that alternatively, the display window 307*e* may instead include a hyperlink to the display message 308*e*). More particularly, and unlike the display window 307*b* of FIG. 3*b* (which was disposed on an unused portion of the tool-bar portion 304), the display window 307*e* in this implementation is disposed on a portion of the tool-bar portion 304 that previously included functional/command icons (see the conventional display interface 302*a* of FIG. 3*a*). As a result, certain functional/command icons may not be available for use when, for example, the display window 307*e* is present.

Turning now to FIG. 3*f*, which shows the display interface 302*e* of FIG. 3*e* during a second point or interval in time. In the display interface 302*e*, the display window 307*e* displays a different message 308*f* from the message 308*e* displayed through display window 307*e* during the first point or interval in time as depicted in FIG. 3*e*. In this case, the message 308*f* that is displayed through the display window 307*e* is an advertisement from a third party 70. Thus, in this implementation (e.g., as illustrated by FIGS. 3*e* and 3*o*, multiple display messages 308*e* and 308*f* (e.g., messages 64*a* and 64*b* of FIGS. 1*a* and 1*b*) may be presented sequentially (e.g., one at a time) through a channel that includes only a single display window 307*e*.

Turning now to FIG. 3*g* depicting another implementation of the NC productivity application interface 86 of FIGS. 1*a* and 1*b* in display form (e.g. display interface 302*g*) that includes a channel for accessing messages 64*. In particular, FIG. 3*g* shows a display interface 302*g* with a channel in the form of two display windows 307*g'* and 307*g"* for concurrently displaying multiple display messages 308*e* and 308*f* (alternatively the two display windows 307*g'* and 307*g"* may merely include links, such as hyperlinks, to the display messages 308*e* and 308*f*). Thus, in the implementation depicted in FIG. 3*g*, multiple display messages 308*e* and 308*f* may be concurrently displayed through multiple display windows 307*g'* and 307*g"*. Note that in this embodiment, the combination of display window 307*g'* and display window 307*g"* occupies the same real estate on the tool-bar portion 304 as occupied by the window 307*e* of FIGS. 3*e* and 3*f*.

Figure 3H:
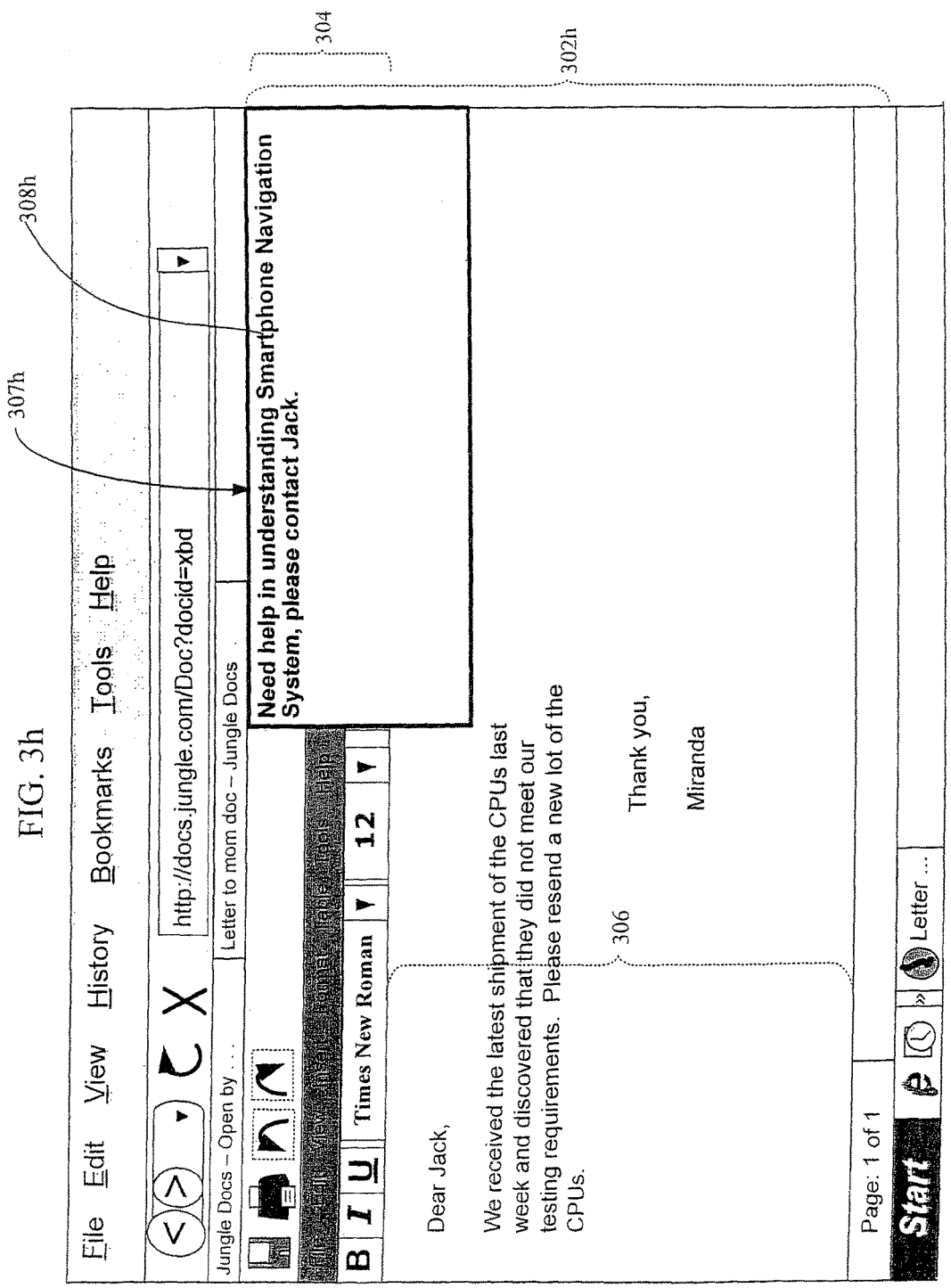
FIG. 3h shows one implementation of another web-based non-communication productivity application interface with a channel for displaying messages as displayed on a display screen.
Figure 3I:
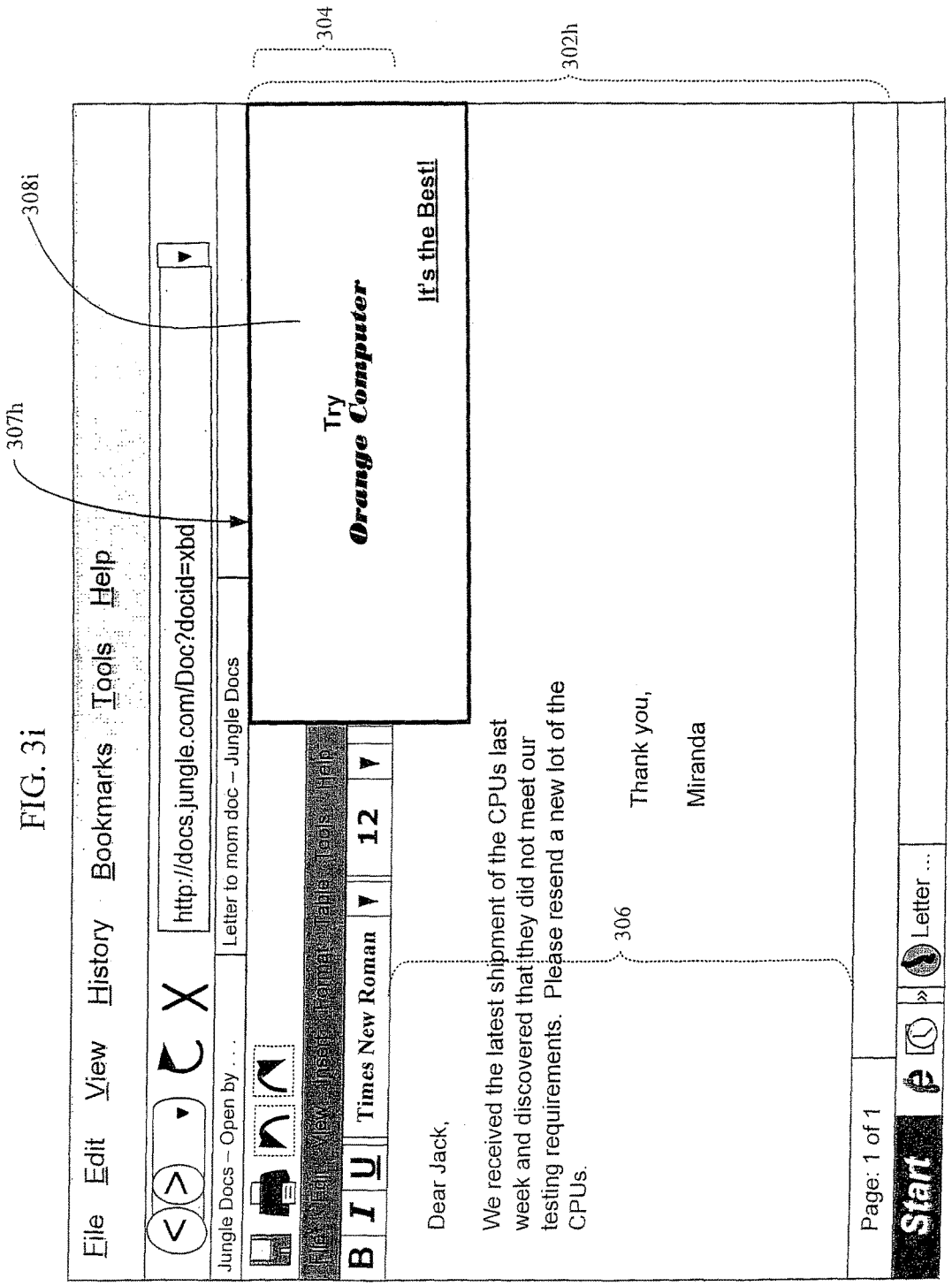
FIG. 3i shows another implementation of the web-based non-communication productivity application interface of FIG. 3h as displayed on a display screen.

Turning now to FIGS. 3*h* and 3*i* illustrating yet another implementation of the NC productivity application interface 86 of FIGS. 1*a* and 1*b* in display form (e.g., display interface 302*h*) that includes a channel for accessing messages 64*. In particular, FIGS. 3*h* and 3*i* show a display interface 302*h* at two different points or intervals in time. For example, FIG. 3*h* shows the display interface 302*h* for accessing a web-based productivity application (e.g., word processing application) that includes a channel (e.g., in the form of a display window 307*h*) for accessing a display message 308*h* (e.g., message 64*a* in FIG. 1*a*) during a first point or interval in time. In this example, the channel for accessing the display message 308*h* is a display window 307*h* that is disposed at least partly on a tool-bar portion 304 and at least partly on a workspace portion 306 of the display interface 302*h*. Within the display window 307*h* is the display message 308*h*. Alternatively, the display window 307*h* may merely include a link, such as a hyperlink, to the display message 308*h*.

Turning now to FIG. 3*i*, which shows the display interface 302*h* of FIG. 3*h* during a second point or interval in time. In the display interface 302*h*, the display window 307*h* displays a different display message 308*i* from the display message 308*h* displayed through display window 307*h* during the first point or interval in time as depicted in FIG. 3*h*. In this case, the display message 308*i* (e.g., message 64*b* in FIG. 1*a*) that is displayed through display window 307*h* is an advertisement from a third party 70. Thus, in this implementation (e.g. as illustrated by FIGS. 3*h* and 3*i*), multiple display messages 308*h* and 308*i* (e.g., messages 64*a* and 64*b* of FIG. 1*a*) may be presented sequentially (e.g., one at a time) through a channel that includes only a single display window 307*h*.

Turning now to FIG. 3*j* depicting another implementation of the NC productivity application interface 86 of FIGS. 1*a* and 1*b* in display form (e.g. display interface 302*j*) that includes a channel for accessing or presenting messages. In particular, FIG. 3*j* shows a display interface 302*j* with a channel for accessing messages, the channel comprising two display windows 307*j'* and 307*j"* for concurrently displaying multiple display messages (e.g., display messages 308*h* and 308*i*). Thus, in the implementation depicted in FIG. 3*j*, multiple display messages 308*h* and 308*i* may be concurrently displayed through multiple display windows 307*j'* and 307*j"*. Note that in this implementation, the combination of display window 307*j'* and display window 307*j"* of FIG. 3*j* occupies the same real estate on the tool-bar portion 304 and the workspace portion 306 as occupied by the display window 307*h* of FIGS. 3*h* and 3*i*.

Figure 3K:
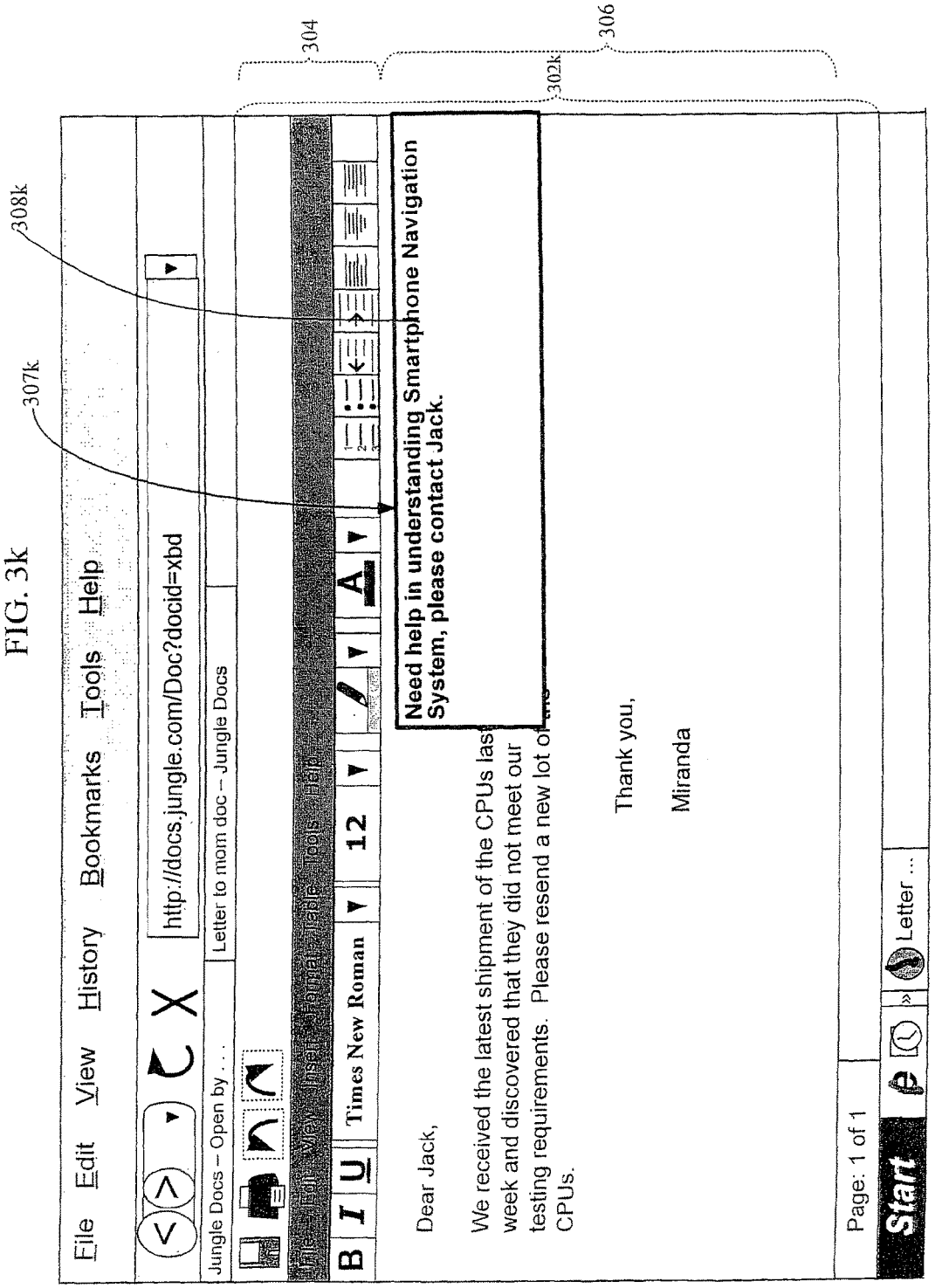
FIG. 3k shows one implementation of another web-based non-communication productivity application interface with a channel for displaying messages as displayed on a display screen.
Figure 31:
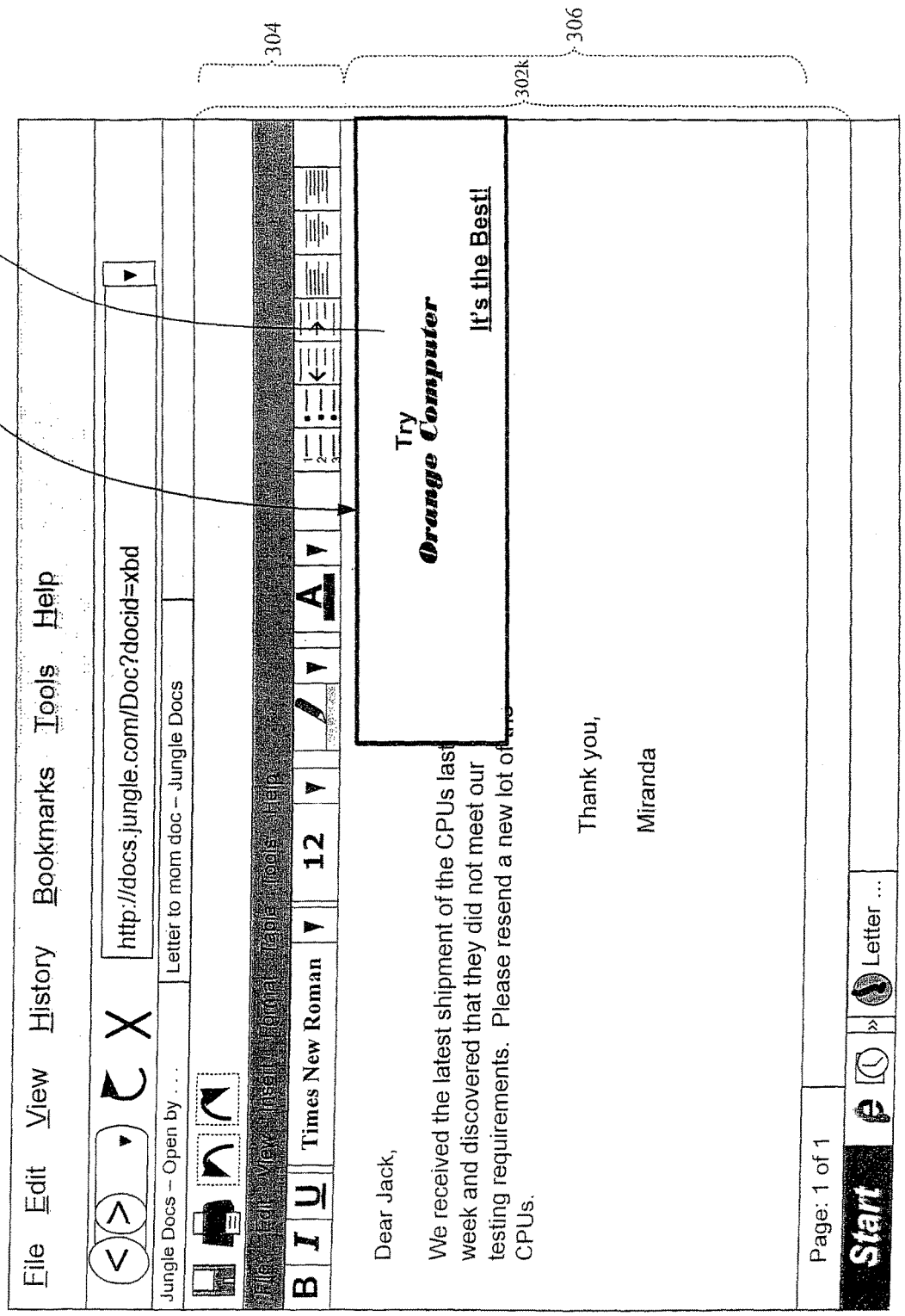

Turning now to FIGS. 3*k* and 3*l* illustrating yet another implementation of the NC productivity application interface 86 of FIGS. 1*a* and 1*b* in display form (e.g., display interface 302*k*) that includes a channel for accessing messages 64*. In particular, FIGS. 3*k* and 3*l* show a display interface 302*k* at two different points or intervals in time. For example, FIG. 3*k* shows the display interface 302*k* for accessing a web-based productivity application (e.g., word processing application) that includes a channel (e.g., in the form of a display window 307*k*) for accessing a display message 308*k* during a first point or interval in time. In this example, the channel for accessing the display message 308*k* is a display window 307*k* that is disposed on at least a portion of a workspace portion 306 of the display interface 302*k*. Within the display window 307*k* is the display message 308*k*, which is message 64*a* in FIG. 1*a*. Alternatively, rather than displaying the actual display message 307*k*, the display window 307*k* may instead merely include a link, such as a hyperlink, to the display message 307*k*.

Turning now to FIG. 3*l*, which shows the display interface 302*k* of FIG. 3*k* during a second point or interval in time. In the display interface 302*k*, the display window 307*k* displays a different display message 308*l* from the display message 308*k* displayed through display window 307*k* during the first point or interval in time as depicted in FIG. 3*k*. In this case, the message 308*l* that is displayed through display window 307*k* is an advertisement from a third party 70. Thus, in this implementation (e.g. as illustrated by FIGS. 3*k* and 3*l*), multiple display messages 308*k* and 308*l* may be presented sequentially (e.g., presented one at a time) through a channel that includes only a single display window 307*k*.

Figure 3M:
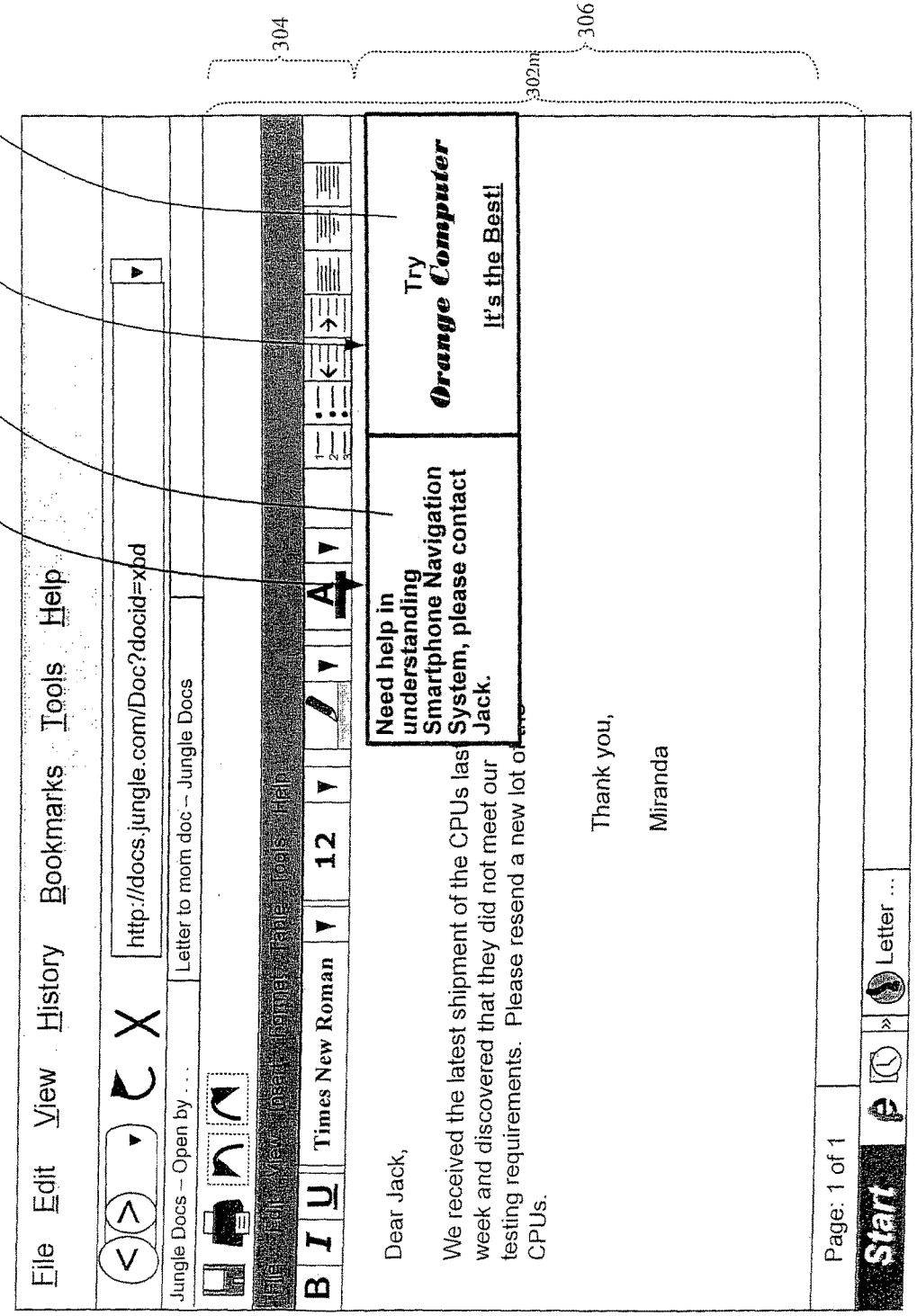
FIG. 3m shows one implementation of another web-based non-communication productivity application interface with a two-window channel for displaying messages as displayed on a display screen.

Turning now to FIG. 3*m* depicting another implementation of the NC productivity application interface 86 of FIGS. 1*a* and 1*b* in display form (e.g. display interface 302*m*) that includes a channel for accessing or presenting messages 64*. In particular, FIG. 3*m* shows a display interface 302*m* that comprises a channel in the form of two display windows 307*m*' and 307*m*" for concurrently displaying multiple messages 64*(e.g., display messages 308*k* and 308*l*). Thus, in the implementation depicted in FIG. 3*m* multiple display messages 308*k* and 308*l* may be concurrently displayed through multiple display windows 307*m*' and 307*m*". Further, note that the combination of display window 307*m*' and display window 307*m*" of FIG. 3*m* occupies the same real estate on the workspace portion 306 as occupied by the display window 307*k* of FIGS. 3*k* and 3*l*.

Note again that although it was described and shown in the above descriptions of FIGS. 3*b* to 3*m* that the display windows 307* may directly display the display messages 308*, in alternative implementations, the display windows 307* may merely provide accesses to the display messages 308*. For example, in some implementations, a display window 307* may allow access to a display message 308* by including a link such as a URL address or a hyperlink in the display window 307* to direct an end user to the display message 308*.

Referring back to the computing system 10 of FIG. 1*b*, the various modules (e.g., the specific usage pattern detecting module 102, the message access providing module 104, and so forth) along with their sub-modules included in the computing system 10 may be implemented using hardware, software, firmware, or any combination thereof. For example, in some implementations, the specific usage pattern detecting module 102 and/or the message access providing module 104 may be implemented with one or more processors 702 (e.g., microprocessors, controllers, and so forth) executing computer readable instructions 704 (e.g., computer program product) stored in a storage medium 706 (e.g., volatile or non-volatile memory) such as a signal-bearing medium as depicted in the computing system 10 of FIG. 7. Alternatively, hardware such as circuitry including application specific integrated circuit (ASIC) may be employed in order to implement such modules in some alternative implementations. In still other alternative implementations, programmable circuitry such as field programmable gate arrays (FPGA) may be employed in order to implement such modules.

Figure 4:
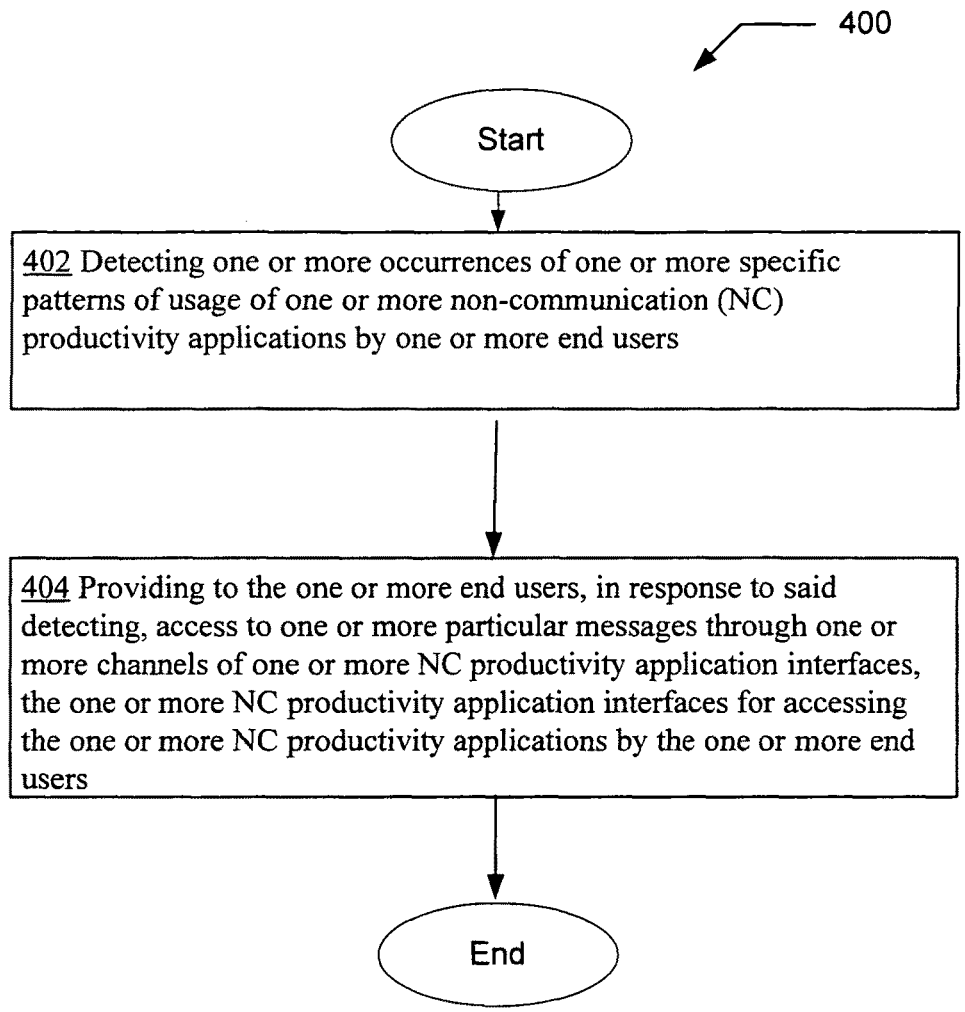
FIG. 4 is a high-level logic flowchart of a process.

A more detailed discussion related to the computing system 10 of FIG. 1*b* will now be provided with respect to the processes and operations to be described herein. FIG. 4 illustrates an operational flow 400 representing example operations related to, among other things, providing to one or more end users access to one or more particular messages, the access being provided in response to detection of one or more occurrences of one or more patterns of usage of one or more non-communication (NC) productivity applications by the one or more end users.

In FIG. 4 and in the following figures that include various examples of operational flows, discussions and explanations may be provided with respect to the exemplary environment 100 described above and as illustrated in FIGS. 1*a* and 1*b*, and/or with respect to other examples (e.g., as provided in FIGS. 2*a*, 2*b*, 3*a*, 3*b*, 3*c*, 3*d*, 3*e*, 3*f*, 3*g*, 3*h*, 3*i*, 3*j*, 3*k*, 3*l*, and 3*m*) and contexts. However, it should be understood that the operational flows may be executed in a number of other environments and contexts, and/or in modified versions of FIGS. 1*a*, 1*b*, 2*a*, 2*b*, 3*a*, 3*b*, 3*c*, 3*d*, 3*e*, 3*f*, 3*g*, 3*h*, 3*i*, 3*j*, 3*k*, 3*l*, and 3*m*. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein may be performed by at least one of a machine, article of manufacture, or composition of matter.

In any event, after a start operation, the operational flow 400 may move to a specific usage pattern detecting operation 402 for detecting one or more occurrences of one or more specific patterns of usage of one or more non-communication (NC) productivity applications by one or more end users. For instance, and as an illustration, the specific usage pattern detecting module 102 of the computing system 10 of the example environment 100 of FIGS. 1*a* and 1*b* detecting (e.g., determining or sensing) one or more occurrences of one or more specific patterns of usage of one or more non-communication (NC) productivity applications by one or more end users 40*(e.g., end users 40*e* and 40*g* in the example illustrated in FIGS. 1*a* and 1*b*). The types of activities or usages of the one or more NC productivity applications that may be examined in order to determine whether the one or more specific patterns of usage has occurred may include, for example, the type of data being entered or inputted through the one or more NC productivity applications (or the interfaces of such applications) by the one or more end users 40*. Alternatively or additionally, how such NC productivity applications are being used by the one or more end users 40* may be considered in order to detect whether the one or more specific patterns of usage has occurred.

In addition to the specific usage pattern detecting operation 402, operational flow 400 may also include a message access providing operation 404 for providing to the one or more end users, in response to said detecting, access to one or more particular messages through one or more channels of one or more NC productivity application interfaces, the one or more NC productivity application interfaces for accessing the one or more NC productivity applications by the one or more end users as further illustrated in FIG. 4. For instance, the message access providing module 104 of the computing system 10 of FIG. 1b providing to the one or more end users 40*(e.g., end users 40e and 40g in the example illustrated in FIGS. 1a and 1b), in response to said detecting, access to one or more particular messages 64* through one or more channels of one or more NC productivity application interfaces 86, the one or more NC productivity application interfaces 86 for accessing the one or more NC productivity applications by the one or more end users 40*.

As will be further described herein, there are multiple ways to provide access to the one or more particular messages 64* in various alternative implementations. For example, in some implementations, where the one or more end users 40*(e.g., end users 40e and 40g in the example illustrated in FIGS. 1a and 1b) does not already have the one or more NC productivity application interfaces 86 for accessing the one or more particular messages 64*, the one or more end users 40* may be initially provided with such NC productivity application interfaces 86 prior to being provided access to the one or more particular messages 64* through the channels of the one or more NC productivity application interfaces 86. In other cases where the one or more end users 40* already have the NC productivity application interfaces 86 (with the one or more channels) for accessing the one or more particular messages 64*, the one or more end users 40* may be directly or immediately provided with the access (e.g., displayed or provided with a link) to the one or more particular messages 64* through the channels of the existing NC productivity application interfaces 86.

As briefly described above, in various implementations, the specific usage pattern detecting operation 402 and the messages access providing operation 404 of FIG. 4 may be executed by the computing system 10 of the example environment 100 of FIGS. 1a and 1b. In some implementations, such a computing system 10 may be a network device, such as a server, or may be a plurality of servers and/or other network devices (e.g., such as the case in cloud computing). Thus, such operations may be executed at a single network site or at multiple network sites. As will be further described herein, the specific usage pattern detecting operation 402 and the messages access providing operation 404 of FIG. 4 may be executed in a variety of different ways in various alternative implementations.

Figure 5A:
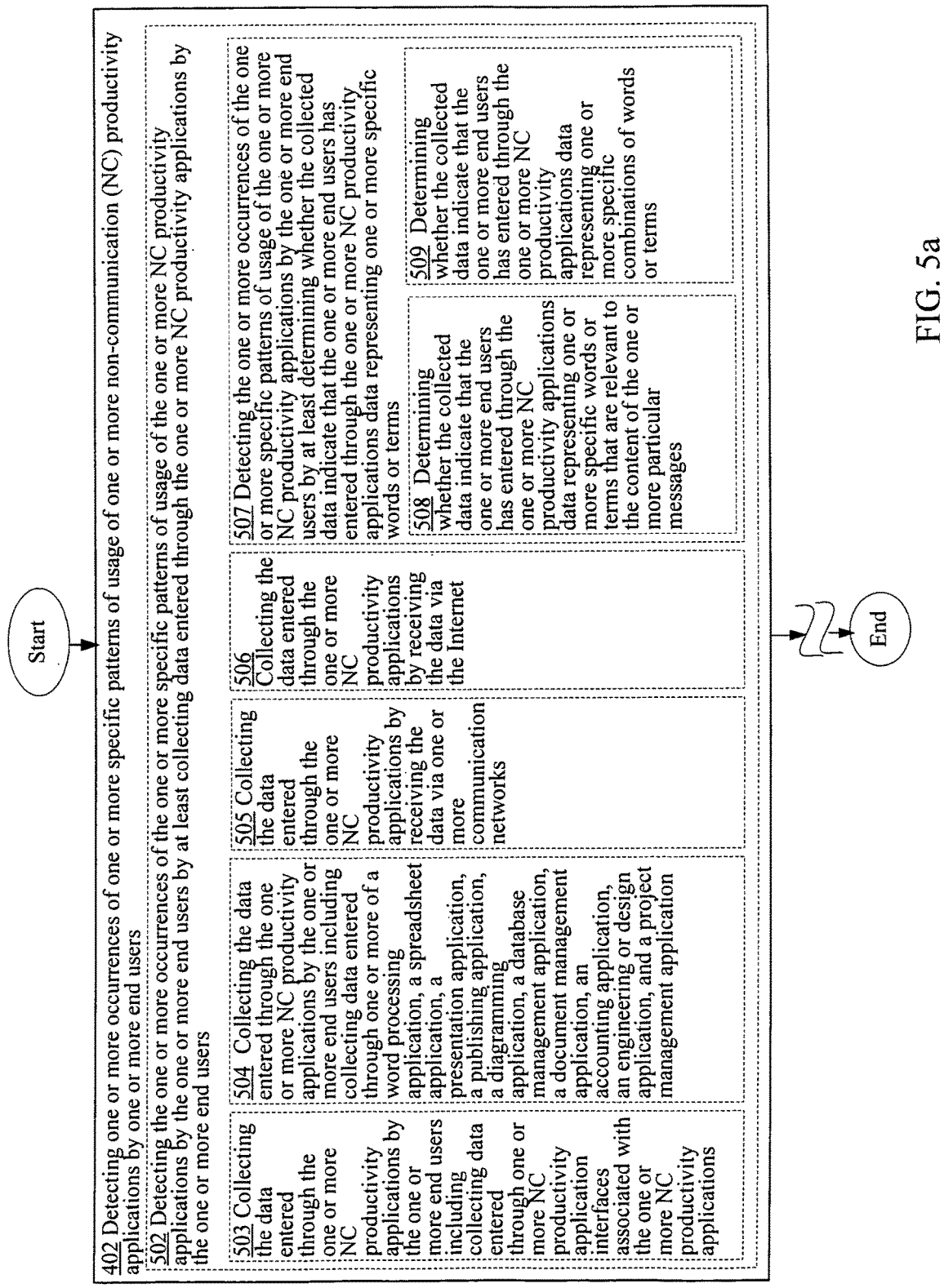
FIG. 5a is a high-level logic flowchart of a process depicting alternate implementations of the specific usage pattern detecting operation 402 of FIG. 4.

For example, FIGS. 5a, 5b, 5c, and 5d illustrate the various ways that the specific usage pattern detecting operation 402 of FIG. 4 may be executed in various alternative implementations. In some implementations, for instance, the specific usage pattern detecting operation 402 of FIG. 4 may include an operation 502 for detecting the one or more occurrences of the one or more specific patterns of usage of the one or more NC productivity applications by the one or more end users by at least collecting data entered through the one or more NC productivity applications by the one or more end users as depicted in FIG. 5a. For instance, the specific usage pattern detecting module 102 including the data collecting module 202 of the computing system 10 detecting the one or more occurrences of the one or more specific patterns of usage of the one or more NC productivity applications by the one or more end users 40*(e.g., end users 40e and 40g in the example illustrated in FIGS. 1a and 1b) by having the data collecting module 202 at least collect data 82 entered through the one or more NC productivity applications (e.g., data inputted through one or more interfaces of the one or more NC productivity applications) by the one or more end users 40*.

Figure 5B:
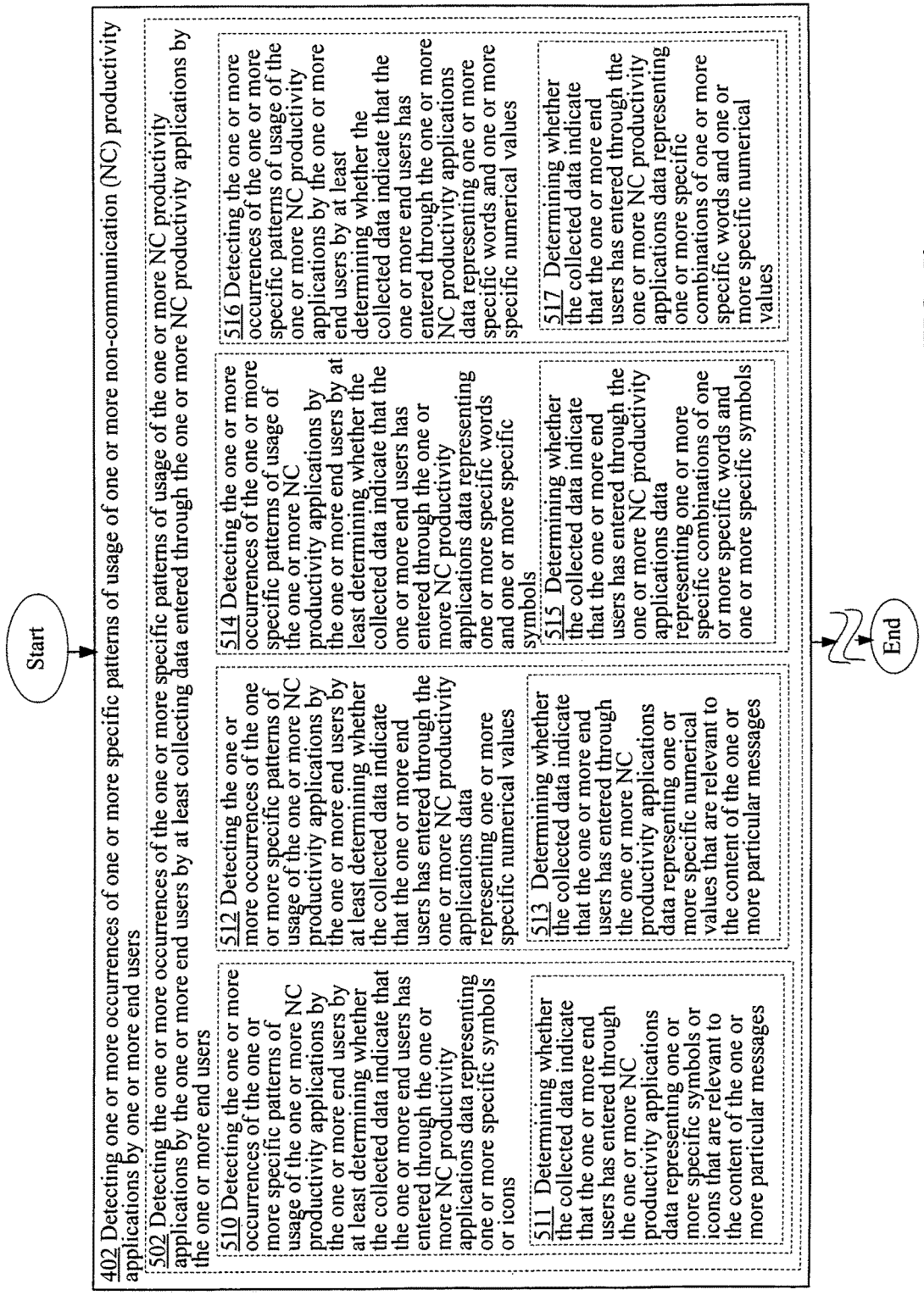
FIG. 5b is a high-level logic flowchart of a process depicting alternate implementations of the specific usage pattern detecting operation 402 of FIG. 4.

In various implementations, operation 502 may further include one or more operations as further illustrated in FIGS. 5a and 5b. For example, in some implementations, operation 502 may include an operation 503 for collecting the data entered through the one or more NC productivity applications by the one or more end users including collecting data entered through one or more NC productivity application interfaces associated with the one or more NC productivity applications as further depicted in FIG. 5a. For instance, the data collecting module 202 of the computing system 10 of FIG. 1b collecting (e.g., receiving) the data 82 entered through the one or more NC productivity applications by the one or more end users 40*(e.g., end users 40e and 40g in the example illustrated in FIGS. 1a and 1b) including collecting data entered through one or more NC productivity application interfaces associated with the one or more NC productivity applications (e.g., word processing application, spreadsheet application, and so forth).

In the same or different implementations, operation 502 may include an operation 504 for collecting the data entered through the one or more NC productivity applications by the one or more end users including collecting data entered through one or more of a word processing application, a spreadsheet application, a presentation application, a publishing application, a diagramming application, a database management application, a document management application, an accounting application, an engineering or design application, and a project management application as further depicted in FIG. 5a. For instance, the data collecting module 202 of the computing system 10 collecting the data 82 entered through the one or more NC productivity applications by the one or more end users 40* including collecting data entered through one or more of a word processing application, a spreadsheet application, a presentation application, a publishing application, a diagramming application, a database management application, a document management application, an accounting application, an engineering or design application, and a project management application.

In the same or different implementations, operation 502 may include an operation 505 for collecting the data entered through the one or more NC productivity applications by receiving the data via one or more communication networks as further depicted in FIG. 5a. For instance, the data collecting module 202 including the data receiving module 203 of the computing system 10 collecting the data 82 entered through the one or more NC productivity applications when the data receiving module 203 receives the data 82 via one or more communication networks 20 (e.g., WLAN, WMAN, WiMAX, PTSN, cellular network, Client/Server Network, virtual private network, and so forth).

In the same or different implementations, operation 502 may include an operation 506 for collecting the data entered through the one or more NC productivity applications by receiving the data via the Internet as depicted in FIG. 5a. For instance the data collecting module 202 including the data receiving module 203 of the computing system 10 collecting the data 82 entered through the one or more NC productivity applications by having the data receiving module 203 receive the data 82 via the Internet.

In the same or different implementations, operation 502 may include an operation 507 for detecting the one or more occurrences of the one or more specific patterns of usage of the one or more NC productivity applications by the one or more end users by at least determining whether the collected data indicate that the one or more end users has entered through the one or more NC productivity applications data representing one or more specific words or terms as depicted in FIG. 5a. For instance, the specific usage pattern detecting module 102 including the specific word/term determining module 204 (see FIG. 2a) of the computing system 10 detecting the one or more occurrences of the one or more specific patterns of usage of the one or more NC productivity applications by the one or more end users 40*(e.g., end users 40e and 40g in the example illustrated in FIGS. 1a and 1b) by having the specific word/term determining module 204 at least determine whether the collected data 82 indicate that the one or more end users 40* has entered through the one or more NC productivity applications (e.g., interfaces of the one or more NC productivity applications) data 82 representing one or more specific words or terms.

In various implementations, operation 507, in turn, may further include an operation 508 for determining whether the collected data indicate that the one or more end users has entered through the one or more NC productivity applications data representing one or more specific words or terms that are relevant to the content of the one or more particular messages as depicted in FIG. 5a. For instance, the specific word/term determining module 204 of the computing system 10 determining whether the collected data 82 indicate that the one or more end users 40*(e.g., end users 40e and 40g in the example illustrated in FIGS. 1a and 1b) has entered through the one or more NC productivity applications data 82 (e.g., electronic or digital data) representing one or more specific words or terms that are relevant (e.g., related) to the content of the one or more particular messages 64*. For example, if the one or more particular messages 64* include content that is related to plasma televisions, than words such as "television," "screen," Toshiba, high-definition, and so forth, that may be indicated by the collected data 82 may be determined to be relevant to the content of the one or more particular messages 64*.

In the same or different implementations, operation 507 may include an operation 509 for determining whether the collected data indicate that the one or more end users has entered through the one or more NC productivity applications data representing one or more specific combinations of words or terms as depicted in FIG. 5a. For instance, the specific word/term determining module 204 of the computing system 10 determining whether the collected data 82 indicate that the one or more end users 40* (e.g., end users 40e and 40g in the example illustrated in FIGS. 1a and 1b) has entered through the one or more NC productivity applications data 82 (e.g., electronic or digital data) that represents one or more specific combinations of words or terms (e.g., a specific sequential combination of words such as a phrase or a sentence).

In some implementations, operation 502 may include an operation 510 for detecting the one or more occurrences of the one or more specific patterns of usage of the one or more NC productivity applications by the one or more end users by at least determining whether the collected data indicate that the one or more end users has entered through the one or more NC productivity applications data representing one or more specific symbols or icons as depicted in FIG. 5b. For instance, the specific usage pattern detecting module 102 including the specific symbol/icon determining module 206 (see FIG. 2a) of the computing system 10 detecting the one or more occurrences of the one or more specific patterns of usage of the one or more NC productivity applications by the one or more end users 40*(e.g., end users 40e and 40g in the example illustrated in FIGS. 1a and 1b) by having the specific symbol/icon determining module 206 determine whether the collected data 82 indicate that the one or more end users 40* has entered through the one or more NC productivity applications (e.g., entered through interfaces of the one or more NC productivity applications) data 82 that represents one or more specific symbols or icons (e.g., signs, character, figure, mark, emoticon, and so forth).

In some cases, operation 510 may further include an operation 511 for determining whether the collected data indicate that the one or more end users has entered through the one or more NC productivity applications data representing one or more specific symbols or icons that are relevant to the content of the one or more particular messages as further depicted in FIG. 5b. For instance, the specific symbol/icon determining module 206 (see FIG. 2a) of the computing system 10 determining whether the collected data 82 indicate that the one or more end users 40* has entered through the one or more NC productivity applications data 82 (e.g., electronic or digital data) that represents one or more specific symbols or icons that are relevant (e.g., related) to the content of the one or more particular messages 64*.

In some implementations, operation 502 may include an operation 512 for detecting the one or more occurrences of the one or more specific patterns of usage of the one or more NC productivity applications by the one or more end users by at least determining whether the collected data indicate that the one or more end users has entered through the one or more NC productivity applications data representing one or more specific numerical values as further depicted in FIG. 5b. For instance, the specific usage pattern detecting module 102 including the specific numerical value determining module 208 (see FIG. 2a) of the computing system 10 detecting the one or more occurrences of the one or more specific patterns of usage of the one or more NC productivity applications by the one or more end users 40*(e.g., end users 40e and 40g in the example illustrated in FIGS. 1a and 1b) by having the specific numerical value determining module 208 at least determine whether the collected data 82 indicate that the one or more end users 40* has entered through the one or more NC productivity applications (e.g., entered through interfaces of the one or more NC productivity applications) data 82 that represents one or more specific numerical values (e.g., specific dates and/or time, specific dollar figure, physical dimensions, model number of a device, and so forth).

In some cases, operation 512 may further include an operation 513 for determining whether the collected data indicate that the one or more end users has entered through the one or more NC productivity applications data representing one or more specific numerical values that are relevant to the content of the one or more particular messages as depicted in FIG. 5b. For instance, the specific numerical value determining module 208 of the computing system 10 determining whether the collected data 82 indicate that the one or more end users 40*(e.g., end users 40e and 40g in the example illustrated in FIGS. 1a and 1b) has entered through the one or more NC productivity applications data 82 (e.g., electronic or digital data) that represents one or more specific numerical values that are relevant to the content of the one or more particular messages 64*. For example, if the one or more particular messages 64* are related to a particular plasma television model, then data 82 entered by the one or more end users 40* that represents a number that is indicative of the plasma television model number of interest may be deemed relevant.

In some implementations, operation 502 may include an operation 514 for detecting the one or more occurrences of the one or more specific patterns of usage of the one or more NC productivity applications by the one or more end users by at least determining whether the collected data indicate that the one or more end users has entered through the one or more NC productivity applications data representing one or more specific words and one or more specific symbols as further depicted in FIG. 5b. For instance, the specific usage pattern detecting module 102 including the specific word/term determining module 204 and the specific symbol/icon determining module 206 of the computing system 10 detecting the one or more occurrences of the one or more specific patterns of usage of the one or more NC productivity applications by the one or more end users 40*(e.g., end users 40e and 40g in the example illustrated in FIGS. 1a and 1b) by having the specific word/term determining module 204 and the specific symbol/icon determining module 206 at least determine whether the collected data 82 indicate that the one or more end users 40* has entered through the one or more NC productivity applications (e.g., entered through interfaces of the one or more NC productivity applications) data 82 that represents one or more specific words and one or more specific symbols.

In some cases, operation 514 may further include an operation 515 for determining whether the collected data indicate that the one or more end users has entered through the one or more NC productivity applications data representing one or more specific combinations of one or more specific words and one or more specific symbols as further depicted in FIG. 5b. For instance, the specific combination determining module 210 of the computing system 10 determining whether the collected data 82 indicate that the one or more end users 40*(e.g., end users 40e and 40g in the example illustrated in FIGS. 1a and 1b) has entered through the one or more NC productivity applications data 82 that represents one or more specific combinations (e.g., specific sequential combinations) of one or more specific words and one or more specific symbols.

In some implementations, operation 502 may include an operation 516 for detecting the one or more occurrences of the one or more specific patterns of usage of the one or more NC productivity applications by the one or more end users by at least determining whether the collected data indicate that the one or more end users has entered through the one or more NC productivity applications data representing one or more specific words and one or more specific numerical values as further depicted in FIG. 5b. For instance, the specific usage pattern detecting module 102 including the specific word/term determining module 204 and the specific numerical value determining module 208 of the computing system 10 detecting the one or more occurrences of the one or more specific patterns of usage of the one or more NC productivity applications by the one or more end users 40*(e.g., end users 40e and 40g in the example illustrated in FIGS. 1a and 1b) by at least determining whether the collected data 82 indicate that the one or more end users 40* has entered through the one or more NC productivity applications (e.g., entered through interfaces of the one or more NC productivity applications such as an interface for a word processing or spreadsheet application) data 82 that represents one or more specific words and one or more specific numerical values.

In some cases, operation 516 may further include an operation 517 for determining whether the collected data indicate that the one or more end users has entered through the one or more NC productivity applications data representing one or more specific combinations of one or more specific words and one or more specific numerical values as further depicted in FIG. 5b. For instance, the specific combination determining module 210 of the computing system 10 determining whether the collected data 82 indicate that the one or more end users 40*(e.g., end users 40e and 40g in the example illustrated in FIGS. 1a and 1b) has entered through the one or more NC productivity applications data 82 (such as electronic or digital data) that represents one or more specific combinations (e.g., sequential order) of one or more specific words and one or more specific numerical values.

Figure 5C:
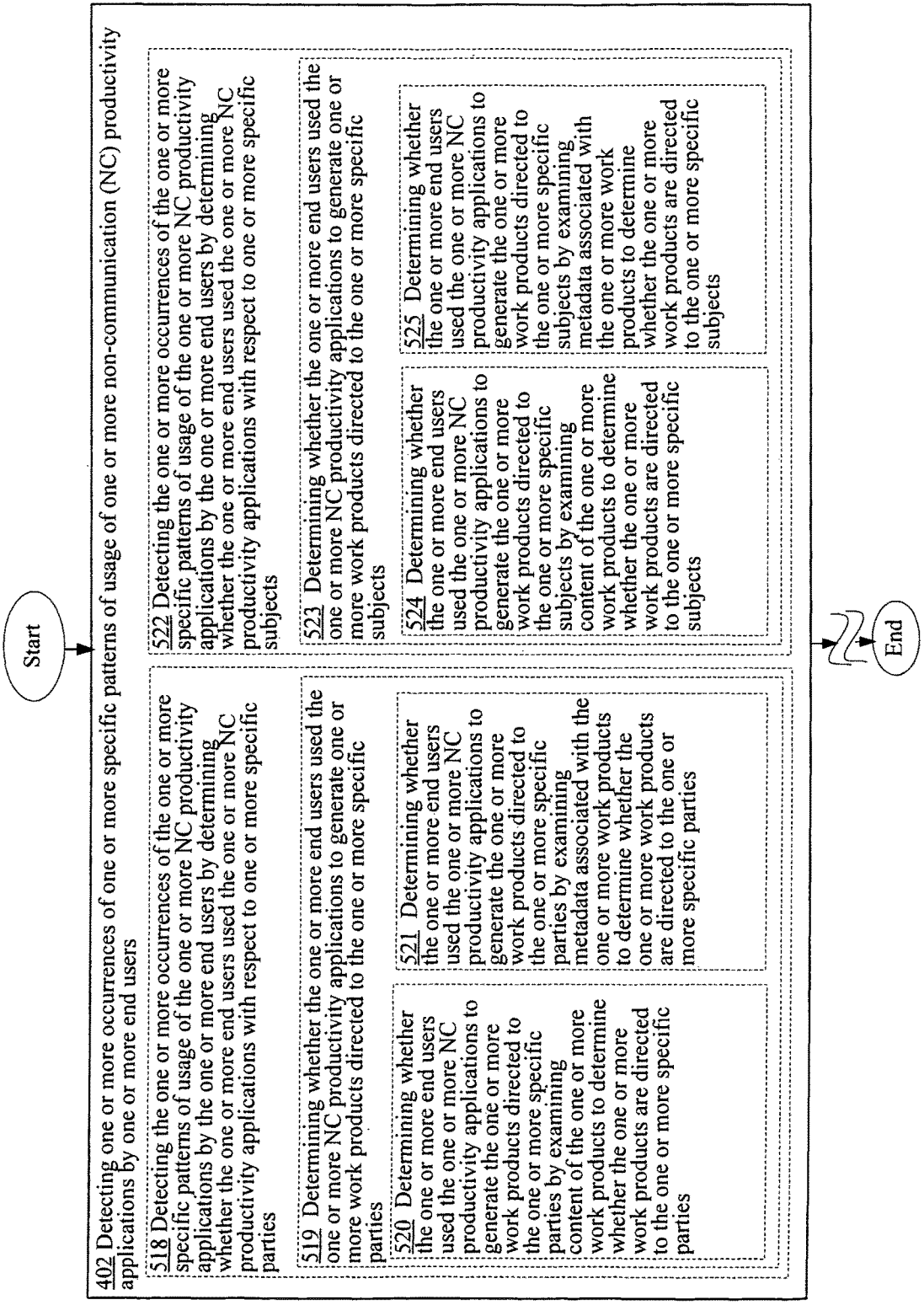
FIG. 5c is a high-level logic flowchart of a process depicting alternate implementations of the specific usage pattern detecting operation 402 of FIG. 4.

In some implementations, the specific usage pattern detecting operation 402 of FIG. 4 may include an operation 518 for detecting the one or more occurrences of the one or more specific patterns of usage of the one or more NC productivity applications by the one or more end users by determining whether the one or more end users used the one or more NC productivity applications with respect to one or more specific parties as depicted in FIG. 5c. For instance, the specific usage pattern detecting module 102 including the specific party use determining module 212 (see FIG. 2a) of the computing system 10 detecting the one or more occurrences of the one or more specific patterns of usage of the one or more NC productivity applications by the one or more end users 40*(e.g., end users 40e and 40g in the example illustrated in FIGS. 1a and 1b) by having the specific party use determining module 212 determine whether the one or more end users 40* used the one or more NC productivity applications with respect to one or more specific parties (e.g., third parties 70 who are independent or unrelated to the one or more end users 40*). For example the specific party use determining module 212 determining whether the one or more end users 40* used the one or more NC productivity applications such as a document management application to manage documents associated with a particular client or vendor.

As further illustrated in FIG. 5c, operation 518 may further include one or more additional operations in various alternative implementations. For example, in some implementations, operation 518 may include an operation 519 for determining whether the one or more end users used the one or more NC productivity applications to generate one or more work products directed to the one or more specific parties as further depicted in FIG. 5c. For instance, the specific party use determining module 212 of the computing system 10 determining whether the one or more end users 40*(e.g., end users 40e and 40g in the example illustrated in FIGS. 1a and 1b) used the one or more NC productivity applications to generate one or more work products 84 (e.g., a word processing document or a spreadsheet document) directed to the one or more specific parties. For example the specific party use determining module 212 determining whether the one or more end users 40* used one or more NC productivity applications such as a spreadsheet application or a presentation application to generate work products 84 for a particular client or vendor.

In some cases, operation 519 may, in turn include an operation 520 for determining whether the one or more end users used the one or more NC productivity applications to generate the one or more work products directed to the one or more specific parties by examining content of the one or more work products to determine whether the one or more work products are directed to the one or more specific parties as depicted in FIG. 5c. For instance, the specific party use determining module 212 including the work product content examining module 214 (see FIG. 2a) of the computing system 10 determining whether the one or more end users 40*(e.g., end users 40e and 40g in the example illustrated in FIGS. 1a and 1b) used the one or more NC productivity applications to generate the one or more work products 84 directed to the one or more specific parties by having the work product content examining module 214 examine content of the one or more work products 84 to determine whether the one or more work products 84 are directed to the one or more specific parties. For example, examining the content of work products generated using the one or more NC productivity applications to determine whether the work products references or identifies the one or more specific parties.

In the same or different implementations, operation 519 may include an operation 521 for determining whether the one or more end users used the one or more NC productivity applications to generate the one or more work products directed to the one or more specific parties by examining metadata associated with the one or more work products to determine whether the one or more work products are directed to the one or more specific parties as depicted in FIG. 5c. For instance, the specific party use determining module 212 including the metadata examining module 216 (see FIG. 2a) of the computing system 10 determining whether the one or more end users 40*(e.g., end users 40e and 40g in the example illustrated in FIGS. 1a and 1b) used the one or more NC productivity applications to generate the one or more work products 84 directed to the one or more specific parties by having the metadata examining module 216 examine metadata associated with the one or more work products 84 to determine whether the one or more work products 84 are directed to the one or more specific parties (e.g., one or more third parties 70 who are independent or unassociated with the one or more end users 40*).

As further illustrated in FIG. 5c, in various implementations, the specific usage pattern detecting operation 402 of FIG. 4 may include an operation 522 for detecting the one or more occurrences of the one or more specific patterns of usage of the one or more NC productivity applications by the one or more end users by determining whether the one or more end users used the one or more NC productivity applications with respect to one or more specific subjects as depicted in FIG. 5c. For instance, the specific usage pattern detecting module 102 including the specific subject use determining module 218 (see FIG. 2a) of the computing system 10 detecting one or more occurrences of the one or more specific patterns of usage of the one or more NC productivity applications by the one or more end users 40*(e.g., end users 40e and 40g in the example illustrated in FIGS. 1a and 1b) by having the specific subject use determining module 218 determine whether the one or more end users 40* used the one or more NC productivity applications with respect to one or more specific subjects. For example, the specific subject use determining module 218 determining whether the one or more end users 40* used the one or more NC productivity applications to develop investment strategies for dealing with an economic recession.

As further illustrated in FIG. 5c, operation 522 may further include one or more additional operations in various alternative implementations. For example, in some cases, operation 522 may include an operation 523 for determining whether the one or more end users used the one or more NC productivity applications to generate one or more work products directed to the one or more specific subjects as depicted in FIG. 5c. For instance, the specific subject use determining module 218 of the computing system 10 determining whether the one or more end users 40*(e.g., end users 40e and 40g in the example illustrated in FIGS. 1a and 1b) used the one or more NC productivity applications to generate one or more work products 84 (e.g., spreadsheet documents) directed to the one or more specific subjects (e.g., investment strategies for dealing with an economic recession).

In some implementations, operation 523 may further include an operation 524 for determining whether the one or more end users used the one or more NC productivity applications to generate the one or more work products directed to the one or more specific subjects by examining content of the one or more work products to determine whether the one or more work products are directed to the one or more specific subjects as depicted in FIG. 5c. For instance, the specific subject use determining module 218 including the work product content examining module 220 (see FIG. 2b) of the computing system 10 determining whether the one or more end users 40*(e.g., end users 40e and 40g in the example illustrated in FIGS. 1a and 1b) used the one or more NC productivity applications to generate the one or more work products 84 directed to the one or more specific subjects by having the work product content examining module 220 examine content of the one or more work products 84 to determine whether the one or more work products 84 are directed to the one or more specific subjects (e.g., topics). For example, the work product content examining module 220 may examine the content of a word processing document (e.g., a work product generated using an NC productivity application) to look for specific words, phrases, and/or symbols used in the document that may be relevant or related to the one or more specific subjects of interest.

In the same or different implementations, operation 523 may include an operation 525 for determining whether the one or more end users used the one or more NC productivity applications to generate the one or more work products directed to the one or more specific subjects by examining metadata associated with the one or more work products to determine whether the one or more work products are directed to the one or more specific subjects as depicted in FIG. 5c. For instance, the specific subject use determining module 218 including the metadata examining module 222 (see FIG. 2b) of the computing system 10 determining whether the one or more end users 40*(e.g., end users 40e and 40g in the example illustrated in FIGS. 1a and 1b) used the one or more NC productivity applications to generate the one or more work products 84 directed to the one or more specific subjects by having the metadata examining module 222 examine metadata associated with the one or more work products 84 to determine whether the one or more work products 84 are directed to the one or more specific subjects.

Figure 5D:
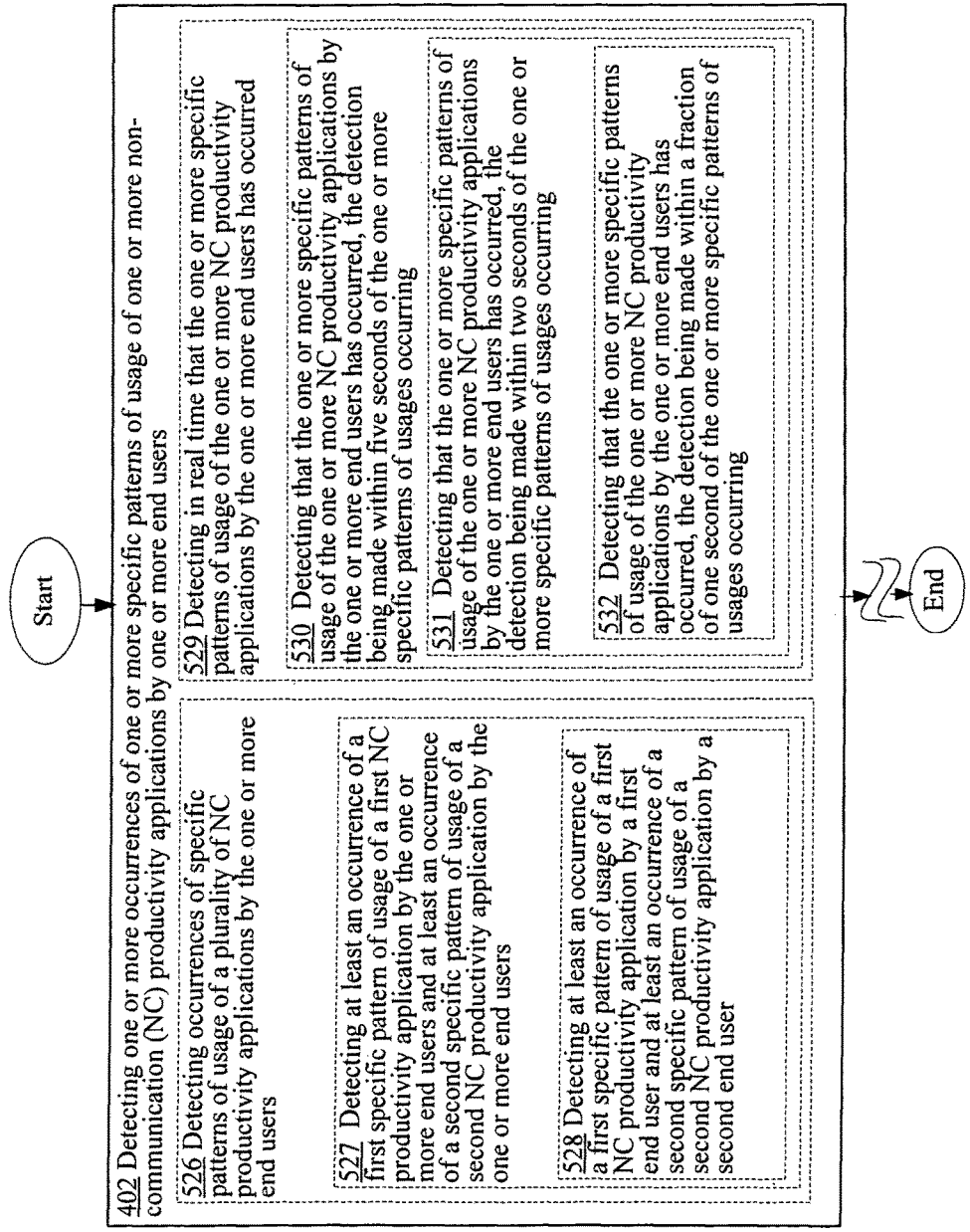
FIG. 5d is a high-level logic flowchart of a process depicting alternate implementations of the specific usage pattern detecting operation 402 of FIG. 4.

In various implementations, the specific usage pattern detecting operation 402 of FIG. 4 may include an operation 526 for detecting occurrences of specific patterns of usage of a plurality of NC productivity applications by the one or more end users as depicted in FIG. 5d. For instance, the specific usage pattern detecting module 102 of the computing system 10 detecting occurrences of specific patterns of usage of a plurality of NC productivity applications (e.g., a word processing application and a spreadsheet application) by the one or more end users 40*(e.g., end users 40e and 40g in the example illustrated in FIGS. 1a and 1b).

In some cases, operation 526 may further include an operation 527 for detecting at least an occurrence of a first specific pattern of usage of a first NC productivity application by the one or more end users and at least an occurrence of a second specific pattern of usage of a second NC productivity application by the one or more end users as depicted in FIG. 5d. For instance, the specific usage pattern detecting module 102 of the computing system 10 detecting at least an occurrence of a first specific pattern of usage of a first NC productivity application (e.g., a word processing application) by the one or more end users 40* and at least an occurrence of a second specific pattern of usage of a second NC productivity application (e.g., an engineering or design application) by the one or more end users 40*.

Operation 527, in turn, may further include in various implementations an operation 528 for detecting at least an occurrence of a first specific pattern of usage of a first NC productivity application by a first end user and at least an occurrence of a second specific pattern of usage of a second NC productivity application by a second end user as further depicted in FIG. 5d. For instance, the specific usage pattern detecting module 102 of the computing system 10 detecting at least an occurrence of a first specific pattern of usage of a first NC productivity application (e.g., spreadsheet application) by a first end user, such as end user 40e of FIG. 1a, and at least an occurrence of a second specific pattern of usage of a second NC productivity application (e.g., diagramming application) by a second end user, such as end user 40g of FIG. 1b.

In the same or different implementations, the specific usage pattern detecting operation 402 of FIG. 4 may include an operation 529 for detecting in real-time that the one or more specific patterns of usage of the one or more NC productivity applications by the one or more end users has occurred as further depicted in FIG. 5d. For instance, the specific usage pattern detecting module 102 of the computing system 10 detecting in real-time that the one or more specific patterns of usage of the one or more NC productivity applications by the one or more end users 40*(e.g., end users 40e and 40g in the example illustrated in FIGS. 1a and 1b) has occurred.

In various implementations, operation 529 may further include one or more additional operations. For example, in some implementations, operation 529 may further include an operation 530 for detecting that the one or more specific patterns of usage of the one or more NC productivity applications by the one or more end users has occurred, the detection being made within five seconds of the one or more specific patterns of usages occurring as depicted in FIG. 5d. For instance, the specific usage pattern detecting module 102 of the computing system 10 detecting that the one or more specific patterns of usage of the one or more NC productivity applications by the one or more end users 40* has occurred, the detection being made within five seconds of the one or more specific patterns of usages occurring (e.g., determining within five seconds of particular data being inputted through the one or more NC productivity applications or determining within five seconds of the one or more NC productivity applications being used for a particular purpose or for a particular third party).

In some implementations, operation 530 may, in turn, further include an operation 531 for detecting that the one or more specific patterns of usage of the one or more NC productivity applications by the one or more end users has occurred, the detection being made within two seconds of the one or more specific patterns of usages occurring as further depicted in FIG. 5d. For instance, the specific usage pattern detecting module 102 of the computing system 10 detecting that the one or more specific patterns of usage of the one or more NC productivity applications by the one or more end users 40* has occurred, the detection being made within two seconds of the one or more specific patterns of usages occurring.

In some implementations, operation 531 may further include an operation 532 for detecting that the one or more specific patterns of usage of the one or more NC productivity applications by the one or more end users has occurred, the detection being made within a fraction of one second of the one or more specific patterns of usages occurring as depicted in FIG. 5d. For instance, the specific usage pattern detecting module 102 of the computing system 10 detecting that the one or more specific patterns of usage of the one or more NC productivity applications by the one or more end users 40* has occurred, the detection being made within a fraction of one second of the one or more specific patterns of usages occurring.

Referring back to FIG. 4, the message access providing operation 404 of FIG. 4 may include one or more additional operations in various alternative implementations. In particular, there are a number ways that the one or more particular messages of the message access providing operation 404 may be accessed through the one or more channels of the one or more NC productivity application interfaces. One way that such an operation 404 may be implemented is to at least initially provide to the one or more end users 40*(e.g., end users 40e and 40g in the example illustrated in FIGS. 1a and 1b) the one or more NC productivity application interfaces 86 with the one or more channels so that the one or more end users 40* may access the one or more particular messages.

Figure 6A:
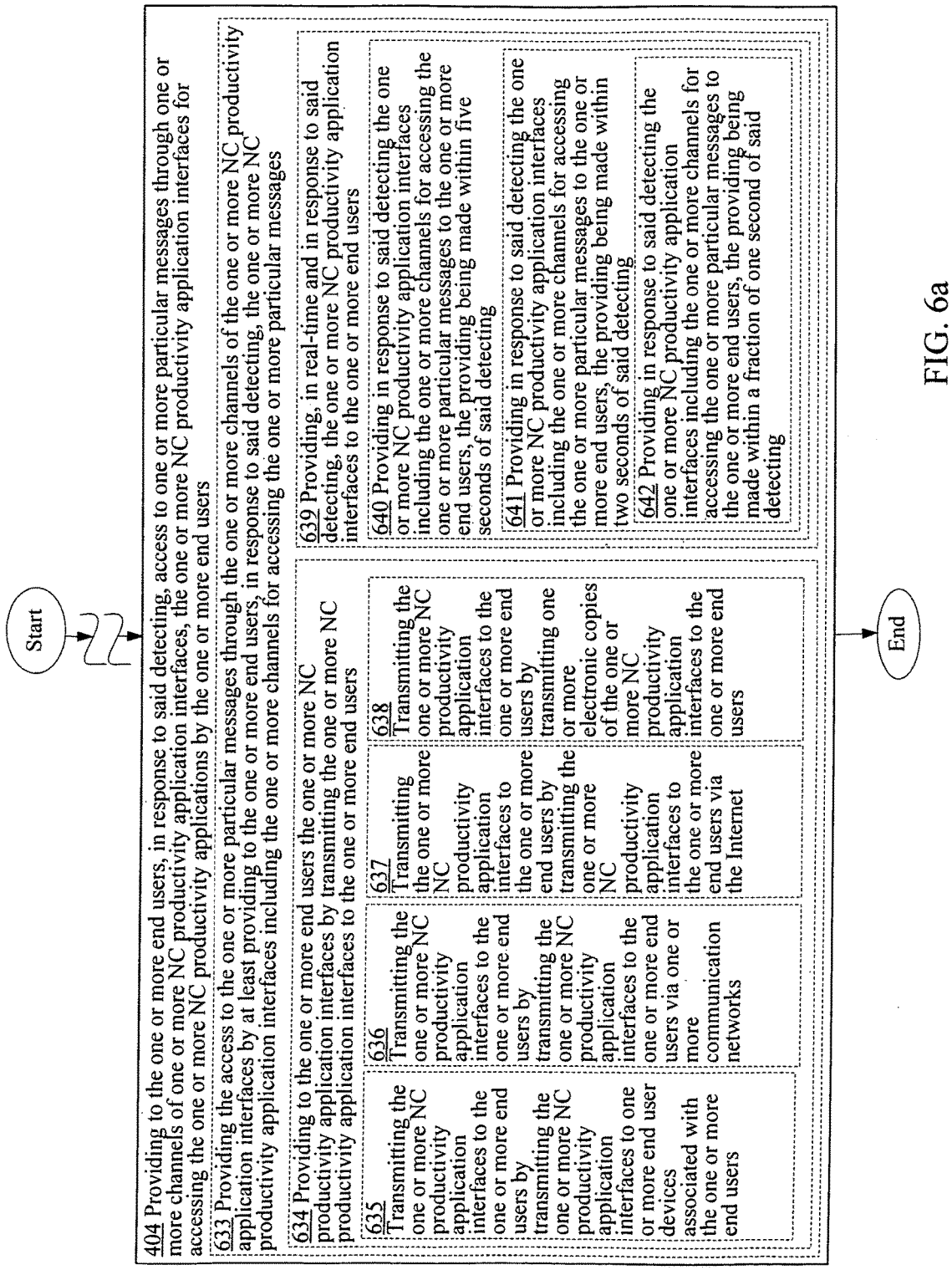
FIG. 6a is a high-level logic flowchart of a process depicting alternate implementations of the message access providing operation 404 of FIG. 4.

For example, in some implementations, the message access providing operation 404 may include an operation 633 for providing the access to the one or more particular messages through the one or more channels of the one or more NC productivity application interfaces by at least providing to the one or more end users, in response to said detecting, the one or more NC productivity application interfaces including the one or more channels for accessing the one or more particular messages as depicted in FIG. 6a. For instance, the message access providing module 104 including the NC productivity application interface providing module 224 (see FIG. 2b) of the computing system 10 providing the access to the one or more particular messages 64* through the one or more channels of the one or more NC productivity application interfaces 86 by at least providing to the one or more end users 40*(e.g., end users 40e and 40g in the example illustrated in FIGS. 1a and 1b), in response to said detecting, the one or more NC productivity application interfaces 86 including the one or more channels for accessing the one or more particular messages 64*.

As further illustrated in FIG. 6a, operation 633 may further include one or more additional operations in various alternative implementations. For example, in some implementations, operation 633 may include an operation 634 for providing to the one or more end users the one or more NC productivity application interfaces by transmitting the one or more NC productivity application interfaces to the one or more end users as further depicted in FIG. 6a. For instance, the NC productivity application interface providing module 224 including the NC productivity application interface transmitting module 230 (see FIG. 2b) of the computing system 10 providing to the one or more end users 40* the one or more NC productivity application interfaces 86 by having the NC productivity application interface transmitting module 230 transmit the one or more NC productivity application interfaces 86 to the one or more end users 40*(e.g., end users 40e and 40g in the example illustrated in FIGS. 1a and 1b). As will be further described, the NC productivity application interface transmitting Module 230 may transmit the one or more NC productivity application interfaces 86 in a variety of different ways in various alternative implementations.

For example, in some implementations, operation 634 may further include an operation 635 for transmitting the one or more NC productivity application interfaces to the one or more end users by transmitting the one or more NC productivity application interfaces to one or more end user devices associated with the one or more end users as further depicted in FIG. 6a. For instance, the NC productivity application interface transmitting module 230 of the computing system 10 transmitting the one or more NC productivity application interfaces 86 (e.g., transmitting electronic copies of the one or more NC productivity application interfaces 86) to the one or more end users 40*(e.g., end users 40e and 40g in the example illustrated in FIGS. 1a and 1b) by transmitting the one or more NC productivity application interfaces 86 to one or more end user devices 50* associated with the one or more end users 40*.

In the same or different implementations, operation 634 may include an operation 636 for transmitting the one or more NC productivity application interfaces to the one or more end users by transmitting the one or more NC productivity application interfaces to the one or more end users via one or more communication networks as depicted in FIG. 6a. For instance, the NC productivity application interface transmitting module 230 including the network transmitting module 232 (see FIG. 2b) of the computing system 10 transmitting the one or more NC productivity application interfaces 86 to the one or more end users 40* by having the network transmitting module 232 transmit the one or more NC productivity application interfaces 86 to the one or more end users 40* via one or more communication networks 20 (e.g., LAN, WLAN, WiMAX, WMAN, PTSN, cellular network, and so forth).

In the same or different implementations, operation 634 may include an operation 637 for transmitting the one or more NC productivity application interfaces to the one or more end users by transmitting the one or more NC productivity application interfaces to the one or more end users via the Internet as depicted in FIG. 6a. For instance, the NC productivity application interface transmitting module 230 including the Internet transmitting module 234 (see FIG. 2b) of the computing system 10 transmitting the one or more NC productivity application interfaces 86 to the one or more end users 40* by having the Internet transmitting module 234 transmit the one or more NC productivity application interfaces 86 to the one or more end users 40* via the Internet.

In the same or different implementations, operation 634 may include an operation 638 for transmitting the one or more NC productivity application interfaces to the one or more end users by transmitting one or more electronic copies of the one or more NC productivity application interfaces to the one or more end users as depicted in FIG. 6a. For instance, the NC productivity application interface transmitting module 230 of the computing system 10 transmitting the one or more NC productivity application interfaces 86 to the one or more end users 40*(e.g., end users 40e and 40g in the example illustrated in FIGS. 1a and 1b) by transmitting one or more electronic copies of the one or more NC productivity application interfaces 86 to the one or more end users 40*.

In various implementations, operation 633 of FIG. 6a may include an operation 639 for providing, in real-time and in response to said detecting, the one or more NC productivity application interfaces to the one or more end users as further depicted in FIG. 6a. For instance, the NC productivity application interface providing module 224 of the computing system 10 providing, in real-time and in response to said detecting, the one or more NC productivity application interfaces 86 to the one or more end users 40*(e.g., end users 40e and 40g in the example illustrated in FIGS. 1a and 1b).

In some cases, operation 639 may further include an operation 640 for providing in response to said detecting the one or more NC productivity application interfaces including the one or more channels for accessing the one or more particular messages to the one or more end users, the providing being made within five seconds of said detecting as further depicted in FIG. 6a. For instance, the NC productivity application interface providing module 224 of the computing system 10 providing, in response to said detecting, the one or more NC productivity application interfaces 86 including the one or more channels for accessing the one or more particular messages 64* to the one or more end users 40*(e.g., end users 40e and 40g in the example illustrated in FIGS. 1a and 1b), the providing being made within five seconds of said detecting of the one or more occurrences of the one or more specific patterns of usage of the one or more NC productivity applications by the one or more end users 40*.

In various implementations, operation 640 may, in turn, further include an operation 641 for providing in response to said detecting the one or more NC productivity application interfaces including the one or more channels for accessing the one or more particular messages to the one or more end users, the providing being made within two seconds of said detecting as further depicted in FIG. 6a. For instance, the NC productivity application interface providing module 224 of the computing system 10 providing in response to said detecting the one or more NC productivity application interfaces 86 including the one or more channels for accessing the one or more particular messages 64* to the one or more end users 40*(e.g., end users 40e and 40g in the example illustrated in FIGS. 1a and 1b), the providing being made within two seconds of said detecting of the one or more occurrences of the one or more specific patterns of usage of the one or more NC productivity applications by the one or more end users 40*.

In some cases, operation 641 may yet further include an operation 642 for providing in response to said detecting the one or more NC productivity application interfaces including the one or more channels for accessing the one or more particular messages to the one or more end users, the providing being made within a fraction of one second of said detecting as further depicted in FIG. 6a. For instance, the NC productivity application interface providing module 224 of the computing system 10 providing, in response to said detecting, the one or more NC productivity application interfaces 86 including the one or more channels for accessing the one or more particular messages 64* to the one or more end users 40*(e.g., end users 40e and 40g in the example illustrated in FIGS. 1a and 1b), the providing being made within a fraction of one second of said detecting.

Figure 6B:
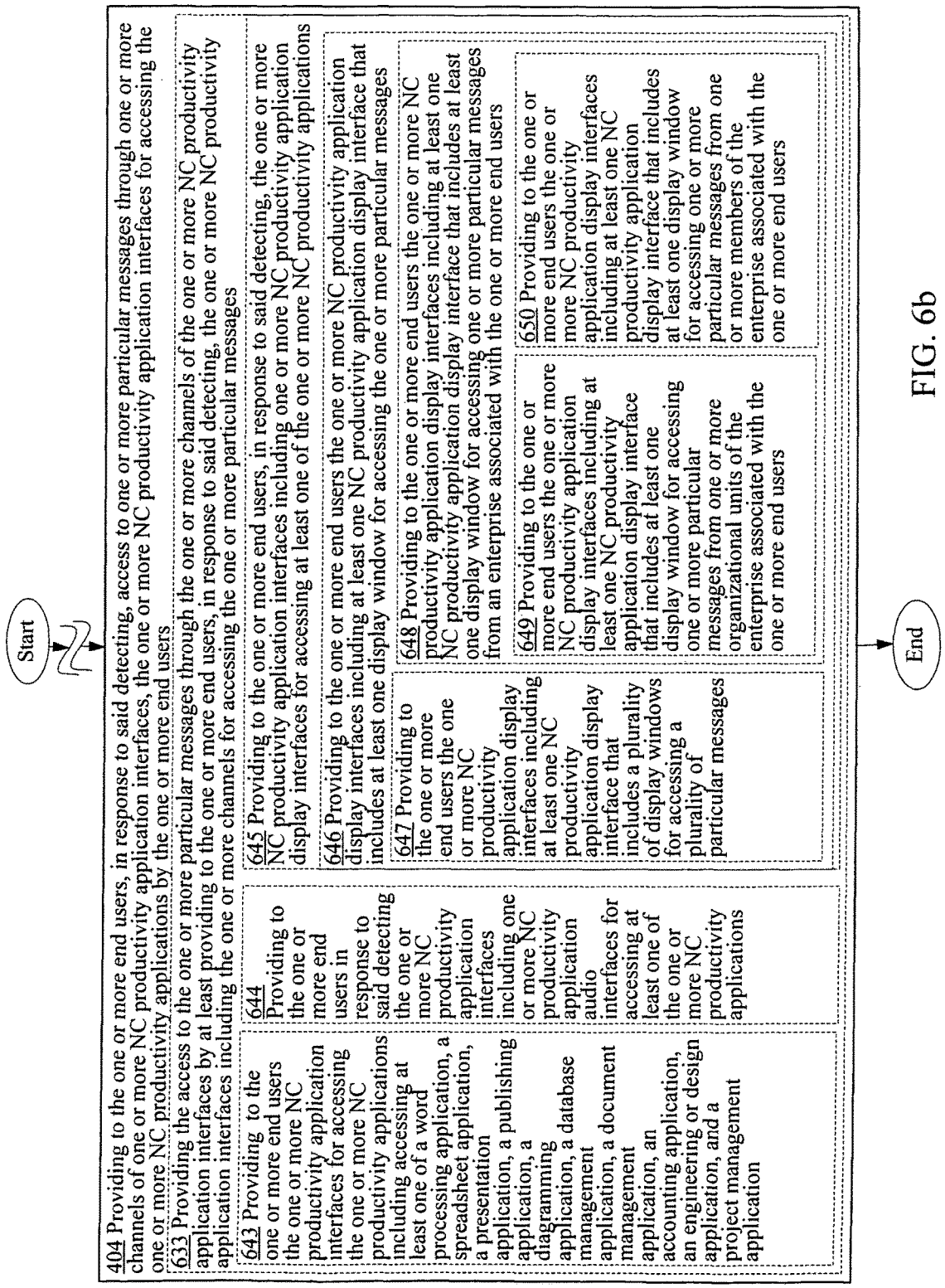
FIG. 6b is a high-level logic flowchart of a process depicting alternate implementations of the message access providing operation 404 of FIG. 4.

In various implementations, the operation 633 of FIG. 6a for providing the access to the one or more particular messages 86 by providing to the one or more end users 40* the one or more NC productivity application interfaces 86 including the one or more channels for accessing the one or more particular messages 64* may include an operation 643 for providing to the one or more end users the one or more NC productivity application interfaces for accessing the one or more NC productivity applications including accessing at least one of a word processing application, a spreadsheet application, a presentation application, a publishing application, a diagramming application, a database management application, a document management application, an accounting application, an engineering or design application, and a project management application as depicted in FIG. 6b. For instance, the NC productivity application interface providing module 224 of the computing system 10 providing to the one or more end users 40*(e.g., providing to the one or more end user devices 50* associated with the one or more end users 40*) the one or more NC productivity application interfaces 86 for accessing the one or more NC productivity applications including accessing at least one of a word processing application, a spreadsheet application, a presentation application, a publishing application, a diagramming application, a database management application, a document management application, an accounting application, an engineering or design application, and a project management application.

In the same or different implementations, operation 633 may include an operation 644 for providing to the one or more end users in response to said detecting the one or more NC productivity application interfaces including one or more NC productivity application audio interfaces for accessing at least one of the one or more NC productivity applications as depicted in FIG. 6b. For instance, the NC productivity application interface providing module 224 including the NC productivity application audio interface providing module 236 (see FIG. 2b) of the computing system 10 providing to the one or more end users 40*(e.g., end users 40e and 40g in the example illustrated in FIGS. 1a and 1b), in response to said detecting, the one or more NC productivity application interfaces 86 including having the NC productivity application audio interface providing module 236 provide one or more NC productivity application audio interfaces for accessing at least one of the one or more NC productivity applications.

In the same or different implementations, operation 633 may include an operation 645 for providing to the one or more end users, in response to said detecting, the one or more NC productivity application interfaces including one or more NC productivity application display interfaces for accessing at least one of the one or more NC productivity applications as further depicted in FIG. 6b. For instance, the NC productivity application interface providing module 224 including the NC productivity application display interface providing module 238 (see FIG. 2b) of the computing system 10 providing to the one or more end users 40*(e.g., end users 40e and 40g in the example illustrated in FIGS. 1a and 1b), in response to said detecting, the one or more NC productivity application interfaces 86 including having the NC productivity application display interface providing module 238 provide one or more NC productivity application display interfaces (e.g., display interface 302* of FIGS. 3b to 3m) for accessing at least one of the one or more NC productivity applications.

As further illustrated in FIG. 6b, operation 645 may further include one or more additional operations in various alternative implementations. For example, in some implementations, operation 645 may further include an operation 646 for providing to the one or more end users the one or more NC productivity application display interfaces including at least one NC productivity application display interface that includes at least one display window for accessing the one or more particular messages as further depicted in FIG. 6b. For instance, the NC productivity application display interface providing module 238 of the computing system 10 providing to the one or more end users 40*(e.g., end users 40e and 40g in the example illustrated in FIGS. 1a and 1b) the one or more NC productivity application display interfaces including at least one NC productivity application display interface (e.g., display interface 302* of FIGS. 3b to 3m) that includes at least one display window 307* for accessing the one or more particular messages 64* (e.g., display message 308* in FIGS. 3b to 3m).

In some implementations, operation 646 may further include an operation 647 for providing to the one or more end users the one or more NC productivity application display interfaces including at least one NC productivity application display interface that includes a plurality of display windows for accessing a plurality of particular messages as further depicted in FIG. 6b. For instance, the NC productivity application display interface providing module 238 of the computing system 10 providing to the one or more end users 40*(e.g., end users 40e and 40g in the example illustrated in FIGS. 1a and 1b) the one or more NC productivity application display interfaces including at least one NC productivity application display interface (e.g., display interface 302d of FIG. 3d) that includes a plurality of display windows (e.g., display windows 307d' and 307d" of FIG. 3d) for accessing a plurality of particular messages 64* (e.g., display messages 308b and 308c in FIG. 3d).

In the same or different implementations, operation 646 may include an operation 648 for providing to the one or more end users the one or more NC productivity application display interfaces including at least one NC productivity application display interface that includes at least one display window for accessing one or more particular messages from an enterprise associated with the one or more end users as further depicted in FIG. 6b. For instance, the NC productivity application display interface providing module 238 of the computing system 10 providing to the one or more end users 40*(e.g., end users 40e and 40g in the example illustrated in FIGS. 1a and 1b) the one or more NC productivity application display interfaces including at least one NC productivity application display interface (e.g., display interface 302e of FIG. 3e) that includes at least one display window (e.g., display window 307e of FIG. 3e) for accessing one or more particular messages 64a (e.g. display message 308e of FIG. 3e) from an enterprise associated with the one or more end users 40*.

In some implementations, operation 648 may further include an operation 649 for providing to the one or more end users the one or more NC productivity application display interfaces including at least one NC productivity application display interface that includes at least one display window for accessing one or more particular messages from one or more organizational units of the enterprise associated with the one or more end users as further depicted in FIG. 6b. For instance, the NC productivity application display interface providing module 238 of the computing system 10 providing to the one or more end users 40*(e.g., end users 40e and 40g in the example illustrated in FIGS. 1a and 1b) the one or more NC productivity application display interfaces including at least one NC productivity application display interface (e.g. display interface 302h of FIG. 3h) that includes at least one display window (e.g., display window 307h) for accessing one or more particular messages 64a (e.g., display message 308h of FIG. 3h) from one or more organizational units of the enterprise 30 associated with the one or more end users 40*.

In the same or different implementations, operation 648 may include an operation 650 for providing to the one or more end users the one or more NC productivity application display interfaces including at least one NC productivity application display interface that includes at least one display window for accessing one or more particular messages from one or more members of the enterprise associated with the one or more end users as further depicted in FIG. 6b. For instance, the NC productivity application display interface providing module 238 of the computing system 10 providing to the one or more end users 40*(e.g., end users 40e and 40g in the example illustrated in FIGS. 1a and 1b) the one or more NC productivity application display interfaces including at least one NC productivity application display interface (e.g. display interface 302k of FIG. 3k) that includes at least one display window (e.g., display window 307k of FIG. 3k) for accessing one or more particular messages 64a (e.g., display message 308k of FIG. 3k) from one or more members of the enterprise 30 associated with the one or more end users 40*.

Figure 6C:
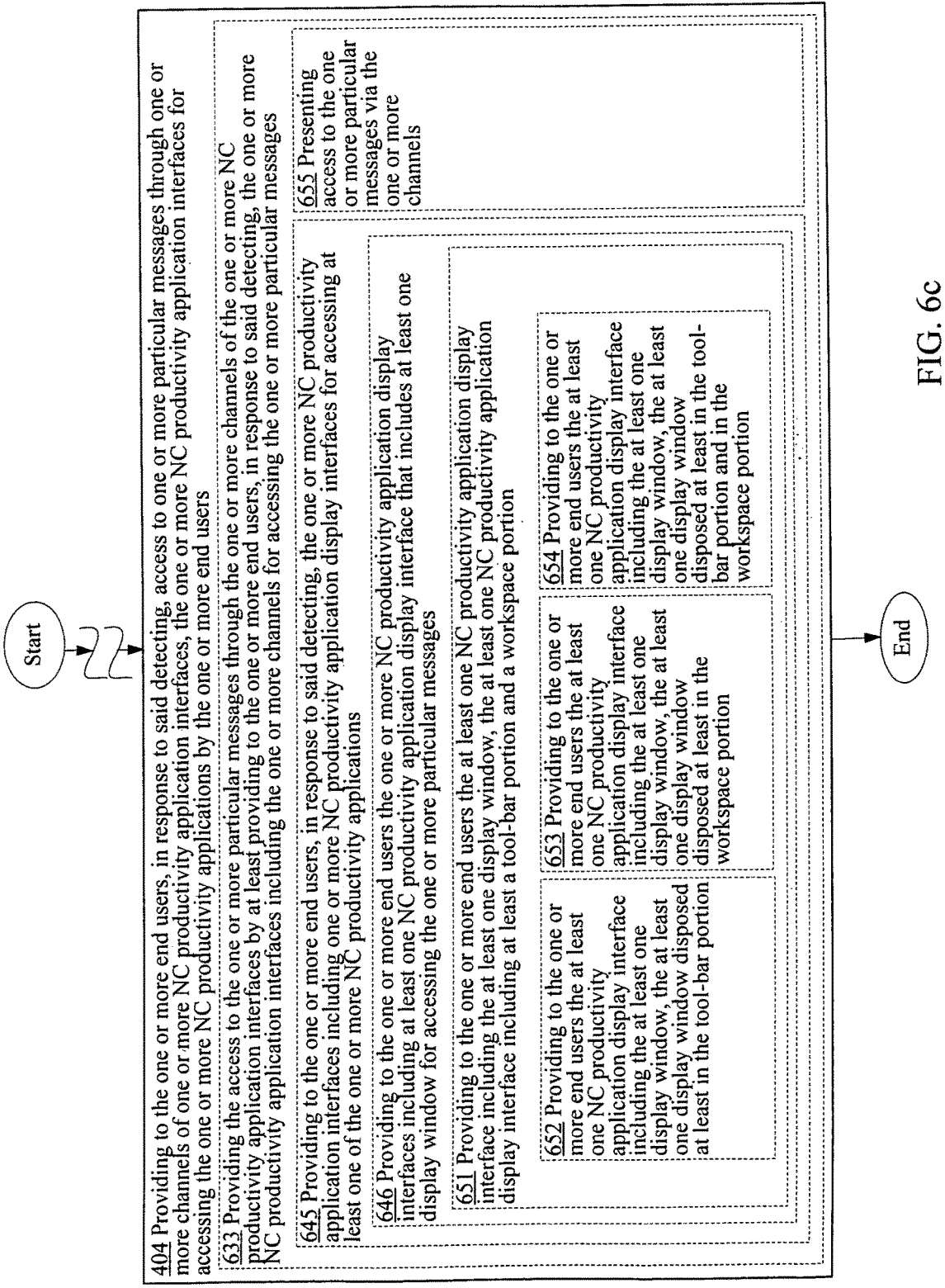
FIG. 6c is a high-level logic flowchart of a process depicting alternate implementations of the message access providing operation 404 of FIG. 4.

In the same or different implementations, operation 646 of FIG. 6b may include an operation 651 for providing to the one or more end users the at least one NC productivity application display interface including the at least one display window, the at least one NC productivity application display interface including at least a tool-bar portion and a workspace portion as further depicted in FIG. 6c. For instance, the NC productivity application display interface providing module 238 of the computing system 10 providing to the one or more end users 40*(e.g., end users 40e and 40g in the example illustrated in FIGS. 1a and 1b) the at least one NC productivity application display interface including the at least one display window 307*, the at least one NC productivity application display interface including at least a tool-bar portion 304 and a workspace portion 306.

In some implementations, operation 651 may further include an operation 652 for providing to the one or more end users the at least one NC productivity application display interface including the at least one display window, the at least one display window disposed at least in the tool-bar portion as depicted in FIG. 6c. For instance, the NC productivity application display interface providing module 238 of the computing system 10 providing to the one or more end users 40*(e.g., end users 40e and 40g in the example illustrated in FIGS. 1a and 1b) the at least one NC productivity application display interface (e.g., display interface 302*) including the at least one display window 307*, the at least one display window 307* disposed at least in the tool-bar portion 304 as illustrated, for example, in FIGS. 3b, 3c, 3d, 3e, 3f, 3g, 3h, 3i, and 3j.

In the same or different implementations, operation 651 may include an operation 653 of providing to the one or more end users the at least one NC productivity application display interface including the at least one display window, the at least one display window disposed at least in the workspace portion as further depicted in FIG. 6c. For instance, the NC productivity application display interface providing module 238 of the computing system 10 providing to the one or more end users 40*(e.g., end users 40e and 40g in the example illustrated in FIGS. 1a and 1b) the at least one NC productivity application display interface 302* including the at least one display window 307*, the at least one display window 307* disposed at least in the workspace portion 306 as illustrated in, for example, FIGS. 3h, 3i, 3j, 3k, 3l, and 3m.

In the same or different implementations, operation 651 may include an operation 654 for providing to the one or more end users the at least one NC productivity application display interface including the at least one display window, the at least one display window disposed at least in the tool-bar portion and in the workspace portion as depicted in FIG. 6c. For instance, the NC productivity application display interface providing module 238 of the computing system 10 providing to the one or more end users 40*(e.g., end users 40e and 40g in the example illustrated in FIGS. 1a and 1b) the at least one NC productivity application display interface 302* including the at least one display window 307*, the at least one display window 307* disposed at least in the tool-bar portion 304 and in the workspace portion 306 as illustrated in, for example, FIGS. 3h, 3i, and 3j.

In some implementations, operation 633 of FIG. 6a may include an operation 655 for presenting access to the one or more particular messages via the one or more channels as depicted in FIG. 6c. For instance, the message presenting module 226 (see FIG. 2b) of the computing system 10 presenting (e.g., transmitting via one or more communication networks 20) access to the one or more particular messages 64* via the one or more channels (e.g., display windows 307*) of the one or more NC productivity application interface 302* of FIGS. 3b, 3c, 3d, 3e, 3f, 3g, 3h, 3i, 3j, 3k, 3l, and 3m. For example, displaying the one or more messages 64*(e.g. display messages 308* of FIGS. 3b to 3m) or displaying a link, such as a hyperlink, to the one or more messages 64* through the one or more channels (e.g., display windows 307*).

Referring back to the message access providing operation 404 of FIG. 4, in various implementations the message access providing operation 404, may not include an operation to provide to the end users 40*(e.g., end users 40e and 40g in the example illustrated in FIGS. 1a and 1b) the one or more NC productivity application interfaces 86 (e.g., display interfaces 302* with channels such as display windows 307* for accessing messages as illustrated in, for example, FIGS. 3b to 3m) in order to provide access to the one or more particular messages 64*. This may be the case, for example, when one or more NC productivity application interfaces 86 with one or more channels for accessing messages are already available to the one or more end users 40*. Under such circumstances, the message access providing operation 404 may merely include operations for providing access (e.g., display or provide a link) to the one or more particular messages 64*.

Figure 6D:
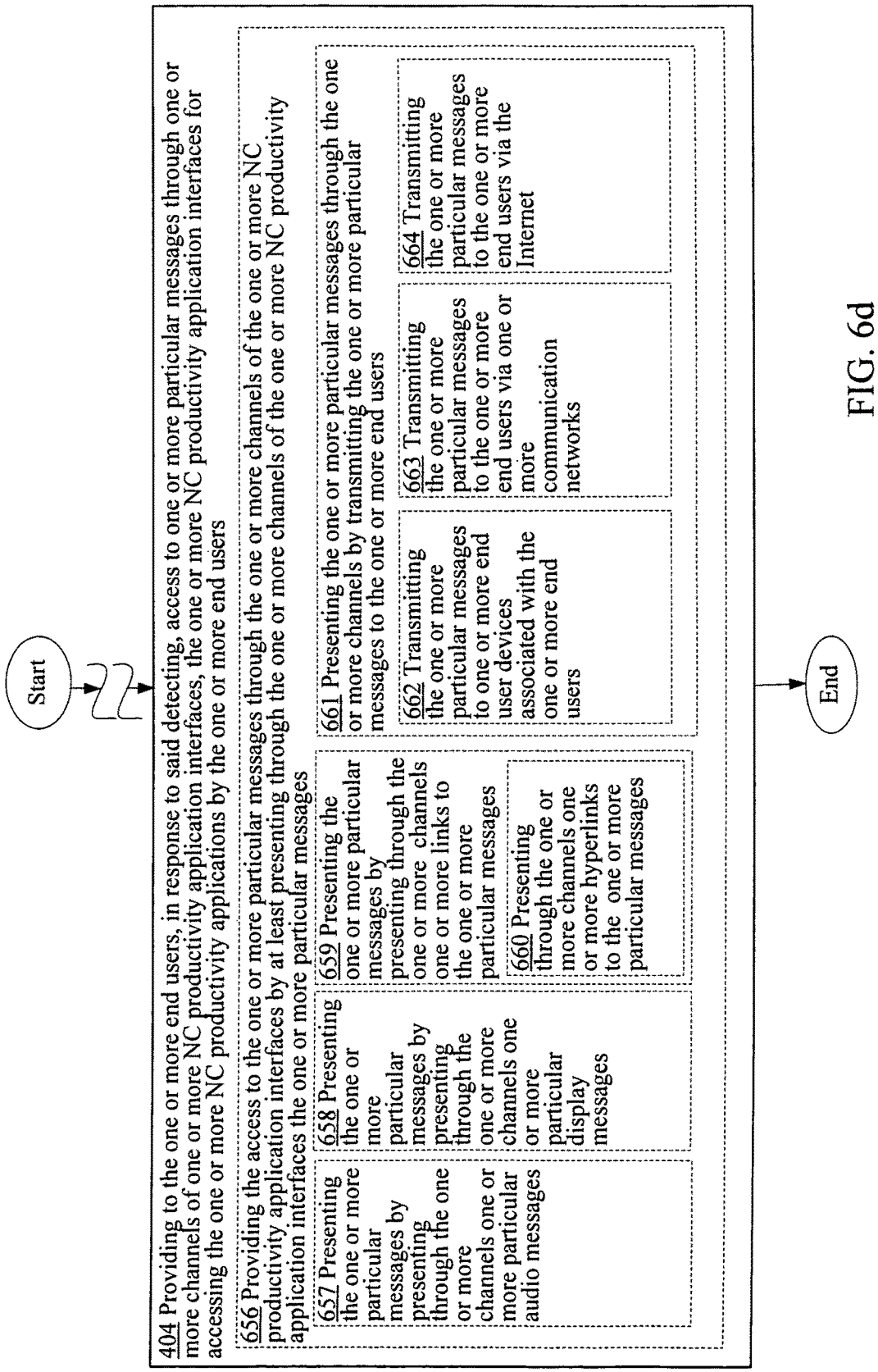
FIG. 6d is a high-level logic flowchart of a process depicting alternate implementations of the message access providing operation 404 of FIG. 4.

For example, in some implementations, the message access providing operation may further include an operation 656 for providing the access to the one or more particular messages through the one or more channels of the one or more NC productivity application interfaces by at least presenting through the one or more channels of the one or more NC productivity application interfaces the one or more particular messages as depicted in FIG. 6d. For instance, the message access providing module 104 including the message presenting module 226 (see FIG. 2b) of the computing system 10 providing the access to the one or more particular messages 64* through the one or more channels of the one or more NC productivity application interfaces 86 by having the message presenting module 226 at least present through the one or more channels of the one or more NC productivity application interfaces 86 the one or more particular messages 64*.

As further illustrated in FIGS. 6d to 6h, operation 656 may further include one or more additional operations in various alternative implementations. For example, in some implementations, operation 656 may include an operation 657 for presenting the one or more particular messages by presenting through the one or more channels one or more particular audio messages as depicted in FIG. 6d. For instance, the audio message presenting module 240 (see FIG. 2b) of the computing system presenting the one or more particular messages 64* by presenting through the one or more channels one or more particular audio messages that may be indicated via, for example, an audio system.

In the same or different implementations, operation 656 may include an operation 658 for presenting the one or more particular messages by presenting through the one or more channels one or more particular display messages as further depicted in FIG. 6d. For instance, the display message presenting module 242 (see FIG. 2b) of the computing system 10 presenting the one or more particular messages 64* by presenting through the one or more channels one or more particular display messages that may be indicated or displayed via, for example, a display monitor.

In the same or different implementations, operation 656 may include an operation 659 for presenting the one or more particular messages by presenting through the one or more channels one or more links to the one or more particular messages as depicted in FIG. 6d. For instance, the message presenting module 226 including the link presenting module 244 (see FIG. 2b) of the computing system 10 presenting the one or more particular messages by having the link presenting module 244 present through the one or more channels one or more links to the one or more particular messages 64*.

In some implementations, operation 659 may further include an operation 660 for presenting through the one or more channels one or more hyperlinks to the one or more particular messages as depicted in FIG. 6d. For instance, the message presenting module 226 including the link presenting module 244 of the computing system 10 presenting through the one or more channels one or more hyperlinks to the one or more particular messages 64*.

In some implementations, operation 656 may include an operation 661 for presenting the one or more particular messages through the one or more channels by transmitting the one or more particular messages to the one or more end users as further depicted in FIG. 6d. For instance, the message presenting module 226 including the message transmitting module 246 (see FIG. 2b) of the computing system 10 presenting the one or more particular messages 64* through the one or more channels by having the message transmitting module 246 transmit (e.g., transmit via one or more communication networks 20) the one or more particular messages 64* to the one or more end users 40* (e.g., end users 40e and 40g in the example illustrated in FIGS. 1a and 1b).

In various implementations, operation 661 may further include an operation 662 for transmitting the one or more particular messages to one or more end user devices associated with the one or more end users as depicted in FIG. 6d. For instance, the message transmitting module 246 of the computing system 10 transmitting the one or more particular messages 64* to one or more end user devices 50* associated with the one or more end users 40* (e.g., end users 40e and 40g in the example illustrated in FIGS. 1a and 1b).

In the same or different implementations, operation 661 may include an operation 663 for transmitting the one or more particular messages to the one or more end users via one or more communication networks as further depicted in FIG. 6d. For instance, the message transmitting module 246 of the computing system 10 transmitting the one or more particular messages 64* to the one or more end users 40* (e.g., end users 40e and 40g in the example illustrated in FIGS. 1a and 1b) via one or more communication networks 20.

In the same or different implementations, operation 661 may include an operation 664 for transmitting the one or more particular messages to the one or more end users via the Internet as further depicted in FIG. 6d. For instance, the message transmitting module 246 of the computing system 10 transmitting the one or more particular messages 64* to the one or more end users 40* (e.g., end users 40e and 40g in the example illustrated in FIGS. 1a and 1b) via the Internet.

Figure 6E:
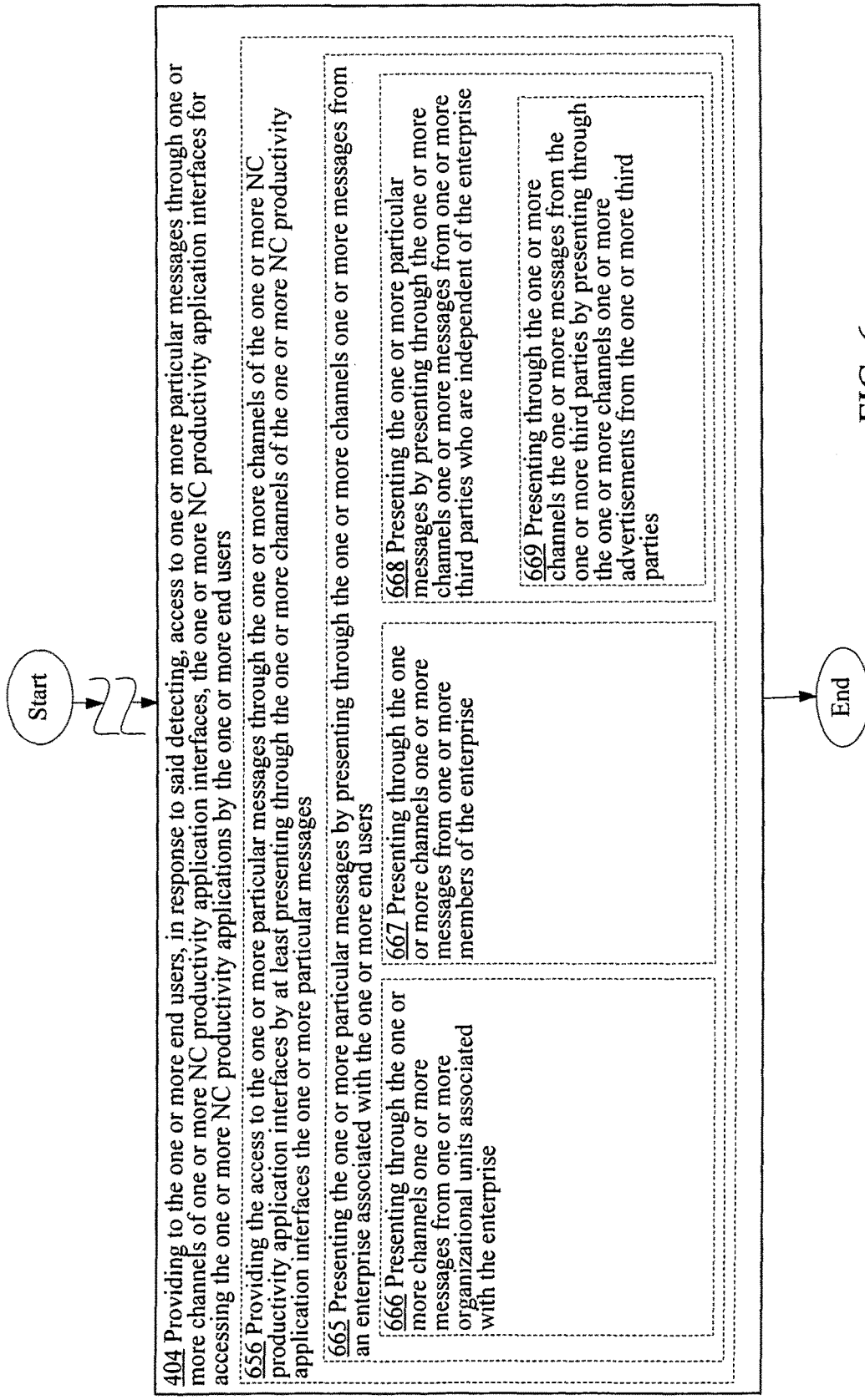
FIG. 6e is a high-level logic flowchart of a process depicting alternate implementations of the message access providing operation 404 of FIG. 4.

In some implementations, operation 656 may include an operation 665 for presenting the one or more particular messages by presenting through the one or more channels one or more messages from an enterprise associated with the one or more end users as further depicted in FIG. 6e. For instance, the message presenting module 226 of the computing system 10 presenting (e.g., transmitting or providing) the one or more particular messages 64* by presenting through the one or more channels one or more messages 64* from an enterprise 30 associated with the one or more end users 40* (e.g., end users 40e and 40g in the example illustrated in FIGS. 1a and 1b).

In various implementations, operation 665 may further include one or more additional operations. For example, in some implementations, operation 665 may include an operation 666 for presenting through the one or more channels one or more messages from one or more organizational units associated with the enterprise as further depicted in FIG. 6e. For instance, the message presenting module 226 of the computing system 10 presenting through the one or more channels one or more messages 64* from one or more organizational units associated with the enterprise 30.

In some implementations, operation 665 may include an operation 667 for presenting through the one or more channels one or more messages from one or more members of the enterprise as further depicted in FIG. 6e. For instance, the message presenting module 226 of the computing system 10 presenting through the one or more channels one or more messages 64* from one or more members of the enterprise 30 (e.g., one or more end users 40* who are associated with the enterprise 30).

In some implementations, operation 665 may include an operation 668 for presenting the one or more particular messages by presenting through the one or more channels one or more messages from one or more third parties who are independent of the enterprise as depicted in FIG. 6e. For instance, the message presenting module 226 of the computing system 10 presenting the one or more particular messages 64* by presenting through the one or more channels one or more messages 64* from one or more third parties 70 who are independent of (e.g., not associated or linked to) the enterprise 30.

In some implementations, operation 668 may further include an operation 669 for presenting through the one or more channels the one or more messages from the one or more third parties by presenting through the one or more channels one or more advertisements from the one or more third parties as depicted in FIG. 6e. For instance, the message presenting module 226 of the computing system 10 presenting through the one or more channels the one or more messages 64* from the one or more third parties 70 by presenting through the one or more channels one or more advertisements from the one or more third parties 70.

Figure 6F:
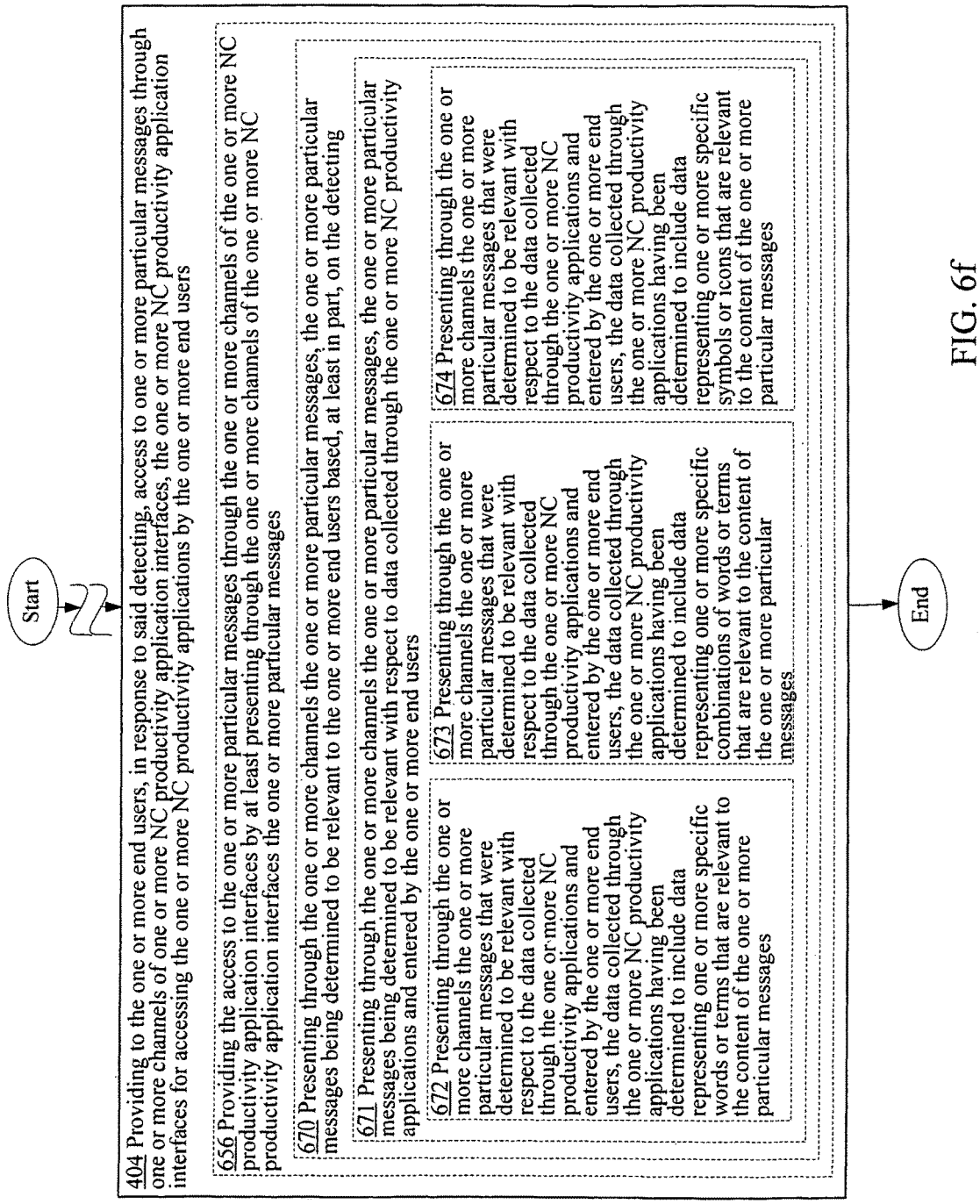
FIG. 6f is a high-level logic flowchart of a process depicting alternate implementations of the message access providing operation 404 of FIG. 4.

In the same or different implementations, operation 656 of FIGS. 6d and 6e may include an operation 670 for presenting through the one or more channels the one or more particular messages, the one or more particular messages being determined to be relevant to the one or more end users based, at least in part, on the detecting as further depicted in FIG. 6f. For instance, the message presenting module 226 including the relevant message determining module 248 of the computing system 10 presenting through the one or more channels the one or more particular messages 64*, the one or more particular messages 64* being determined by the relevant message determining module 248 to be relevant to the one or more end users 40*(e.g., end users 40e and 40g in the example illustrated in FIGS. 1a and 1b) based, at least in part, on the detecting (e.g., detecting function of the detecting operation 402 of FIG. 4).

In various implementations, operation 670 may, in turn, further include an operation 671 for presenting through the one or more channels the one or more particular messages, the one or more particular messages being determined to be relevant with respect to data collected through the one or more NC productivity applications and entered by the one or more end users as further depicted in FIG. 6f. For instance, the message presenting module 226 including the relevant message determining module 248 of the computing system 10 presenting through the one or more channels the one or more particular messages 64*, the one or more particular messages 64* being determined by the relevant message determining module 248 to be relevant with respect to data 82 collected through the one or more NC productivity applications and entered by the one or more end users 40*.

As further illustrated in FIG. 6f, operation 671 may further include one or more additional operation in various alternative implementations. For example, in some implementations, operation 671 may include an operation 672 for presenting through the one or more channels the one or more particular messages that were determined to be relevant with respect to the data collected through the one or more NC productivity applications and entered by the one or more end users, the data collected through the one or more NC productivity applications having been determined to include data representing one or more specific words or terms that are relevant to the content of the one or more particular messages as further depicted in FIG. 6f. For instance, the message presenting module 226 including the relevant message determining module 248 of the computing system 10 presenting through the one or more channels the one or more particular messages 64* that were determined by the relevant message determining module 248 to be relevant with respect to the data 82 collected through the one or more NC productivity applications and entered by the one or more end users 40*, the data 82 collected through the one or more NC productivity applications having been determined by the relevant message determining module 248 to include data 82 representing one or more specific words or terms that are relevant to the content of the one or more particular messages 64*.

In the same or different implementations, operation 671 include an operation 673 for presenting through the one or more channels the one or more particular messages that were determined to be relevant with respect to the data collected through the one or more NC productivity applications and entered by the one or more end users, the data collected through the one or more NC productivity applications having been determined to include data representing one or more specific combinations of words or terms that are relevant to the content of the one or more particular messages as further depicted in FIG. 6f. For instance, the message presenting module 226 including the relevant message determining module 248 of the computing system 10 presenting through the one or more channels the one or more particular messages 64* that were determined by the relevant message determining module 248 to be relevant with respect to the data 82 collected through the one or more NC productivity applications and entered by the one or more end users 40*(e.g., end users 40e and 40g in the example illustrated in FIGS. 1a and 1b), the data 82 collected through the one or more NC productivity applications having been determined by the relevant message determining module 248 to include data 82 representing one or more specific combinations (e.g., sequential or spatial combinations) of words or terms that are relevant to the content of the one or more particular messages 64*.

In the same or different implementations, operation 671 include an operation 674 for presenting through the one or more channels the one or more particular messages that were determined to be relevant with respect to the data collected through the one or more NC productivity applications and entered by the one or more end users, the data collected through the one or more NC productivity applications having been determined to include data representing one or more specific symbols or icons that are relevant to the content of the one or more particular messages as further depicted in FIG. 6f. For instance, the message presenting module 226 including the relevant message determining module 248 of the computing system 10 presenting through the one or more channels the one or more particular messages 64* that were determined by the relevant message determining module 248 to be relevant with respect to the data 82 collected through the one or more NC productivity applications and entered by the one or more end users 40*(e.g., end users 40e and 40g in the example illustrated in FIGS. 1a and 1b), the data 82 collected through the one or more NC productivity applications having been determined by the relevant message determining module 248 to include data 82 representing one or more specific symbols or icons that are relevant to the content of the one or more particular messages 64*.

Figure 6G:
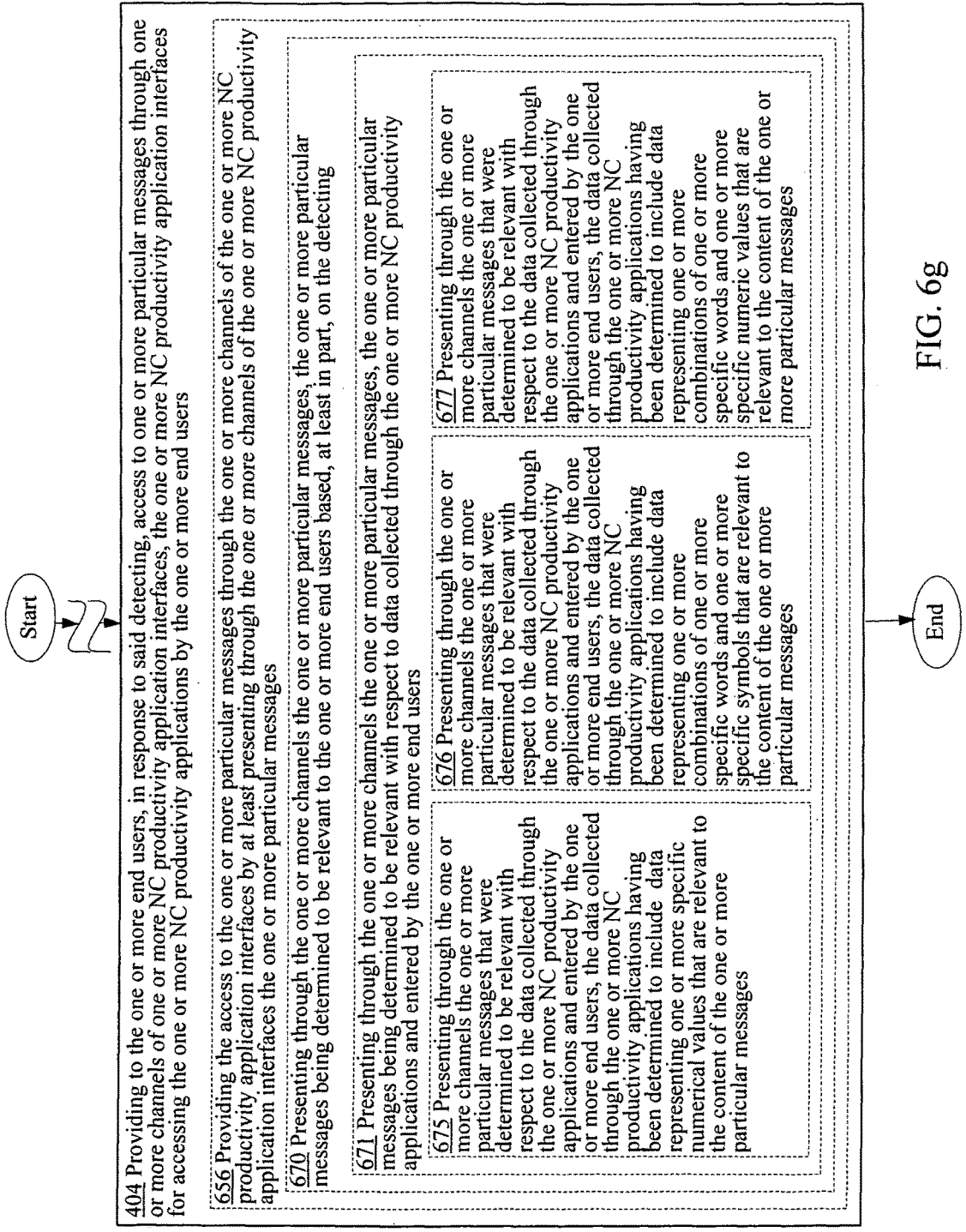
FIG. 6g is a high-level logic flowchart of a process depicting alternate implementations of the message access providing operation 404 of FIG. 4.

In the same or different implementations, operation 671 may include an operation 675 for presenting through the one or more channels the one or more particular messages that were determined to be relevant with respect to the data collected through the one or more NC productivity applications and entered by the one or more end users, the data collected through the one or more NC productivity applications having been determined to include data representing one or more specific numerical values that are relevant to the content of the one or more particular messages as depicted in FIG. 6g. For instance, the message presenting module 226 including the relevant message determining module 248 of the computing system 10 presenting through the one or more channels the one or more particular messages 64* that were determined by the relevant message determining module 248 to be relevant with respect to the data 82 collected through the one or more NC productivity applications and entered by the one or more end users 40* (e.g., end users 40e and 40g in the example illustrated in FIGS. 1a and 1b), the data 82 collected through the one or more NC productivity applications having been determined to include data 82 representing one or more specific numerical values that are relevant to the content of the one or more particular messages 64*.

In the same or different implementations, operation 671 may include an operation 676 for presenting through the one or more channels the one or more particular messages that were determined to be relevant with respect to the data collected through the one or more NC productivity applications and entered by the one or more end users, the data collected through the one or more NC productivity applications having been determined to include data representing one or more combinations of one or more specific words and one or more specific symbols that are relevant to the content of the one or more particular messages as further depicted in FIG. 6g. For instance, the message presenting module 226 including the relevant message determining module 248 of the computing system 10 presenting through the one or more channels the one or more particular messages 64* that were determined by the relevant message determining module 248 to be relevant with respect to the data 82 collected through the one or more NC productivity applications and entered by the one or more end users 40*(e.g., end users 40e and 40g in the example illustrated in FIGS. 1a and 1b), the data 82 collected through the one or more NC productivity applications having been determined to include data 82 representing one or more combinations (e.g., sequential or spatial combinations) of one or more specific words and one or more specific symbols that are relevant to the content of the one or more particular messages 64*.

In the same or different implementations, operation 671 may include an operation 677 for presenting through the one or more channels the one or more particular messages that were determined to be relevant with respect to the data collected through the one or more NC productivity applications and entered by the one or more end users, the data collected through the one or more NC productivity applications having been determined to include data representing one or more combinations of one or more specific words and one or more specific numeric values that are relevant to the content of the one or more particular messages as depicted in FIG. 6g. For instance, the message presenting module 226 including the relevant message determining module 248 of the computing system 10 presenting through the one or more channels the one or more particular messages 64* that were determined by the relevant message determining module 248 to be relevant with respect to the data 82 collected through the one or more NC productivity applications and entered by the one or more end users 40*(e.g., end users 40e and 40g in the example illustrated in FIGS. 1a and 1b), the data collected through the one or more NC productivity applications having been determined by the relevant message determining module 248 to include data representing one or more combinations (e.g., sequential or spatial combinations) of one or more specific words and one or more specific numeric values that are relevant to the content of the one or more particular messages 64*.

Figure 6H:
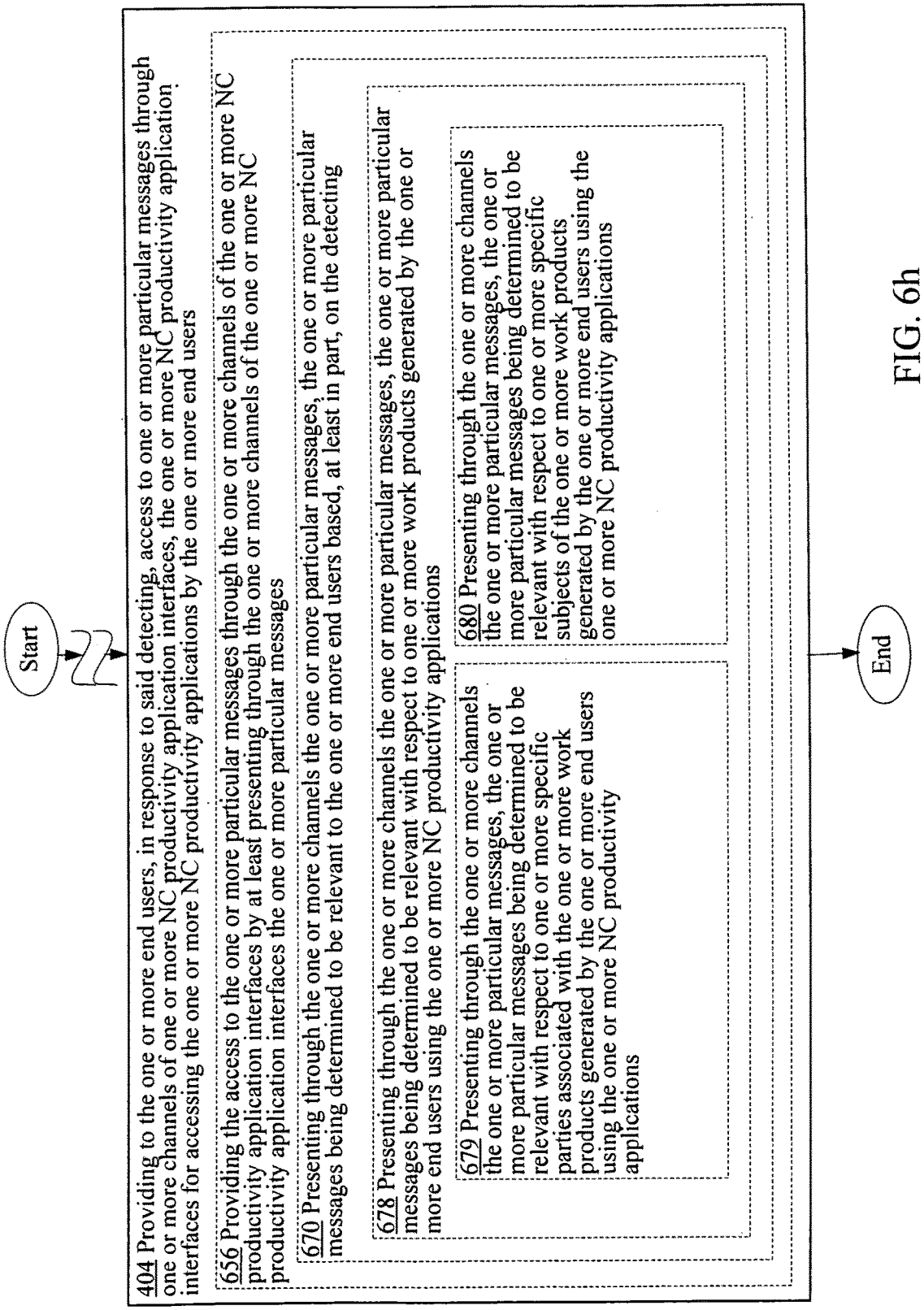
FIG. 6h is a high-level logic flowchart of a process depicting alternate implementations of the message access providing operation 404 of FIG. 4.

Referring back to operation 670 of FIGS. 6f and 6g, in various implementations, operation 670 may include an operation 678 for presenting through the one or more channels the one or more particular messages, the one or more particular messages being determined to be relevant with respect to one or more work products generated by the one or more end users using the one or more NC productivity applications as illustrated in FIG. 6h. For instance, the message presenting module 226 including the relevant message determining module 248 of the computing system 10 presenting through the one or more channels the one or more particular messages 64*, the one or more particular messages 64* being determined by the relevant message determining module 248 to be relevant with respect to one or more work products 84 generated by the one or more end users 40*(e.g., end users 40e and 40g in the example illustrated in FIGS. 1a and 1b) using the one or more NC productivity applications.

In some implementations, operation 678 may further include an operation 679 for presenting through the one or more channels the one or more particular messages, the one or more particular messages being determined to be relevant with respect to one or more specific parties associated with the one or more work products generated by the one or more end users using the one or more NC productivity applications as further depicted in FIG. 6h. For instance, the message presenting module 226 including the relevant message determining module 248 of the computing system 10 presenting through the one or more channels the one or more particular messages 64*, the one or more particular messages 64* being determined by the relevant message determining module 248 to be relevant with respect to one or more specific parties (e.g., one or more third parties 70) associated with the one or more work products 84 generated by the one or more end users 40*(e.g., end users 40e and 40g in the example illustrated in FIGS. 1a and 1b) using the one or more NC productivity applications.

In the same or different implementations, operation 678 may include an operation 680 for presenting through the one or more channels the one or more particular messages, the one or more particular messages being determined to be relevant with respect to one or more specific subjects of the one or more work products generated by the one or more end users using the one or more NC productivity applications as further depicted in FIG. 6h. For instance, the message presenting module 226 including the relevant message determining module 248 of the computing system 10 presenting through the one or more channels the one or more particular messages 64*, the one or more particular messages 64* being determined by the relevant message determining module 248 to be relevant with respect to one or more specific subjects of the one or more work products 84 generated by the one or more end users 40*(e.g., end users 40e and 40g in the example illustrated in FIGS. 1a and 1b) using the one or more NC productivity applications.

Figure 7:
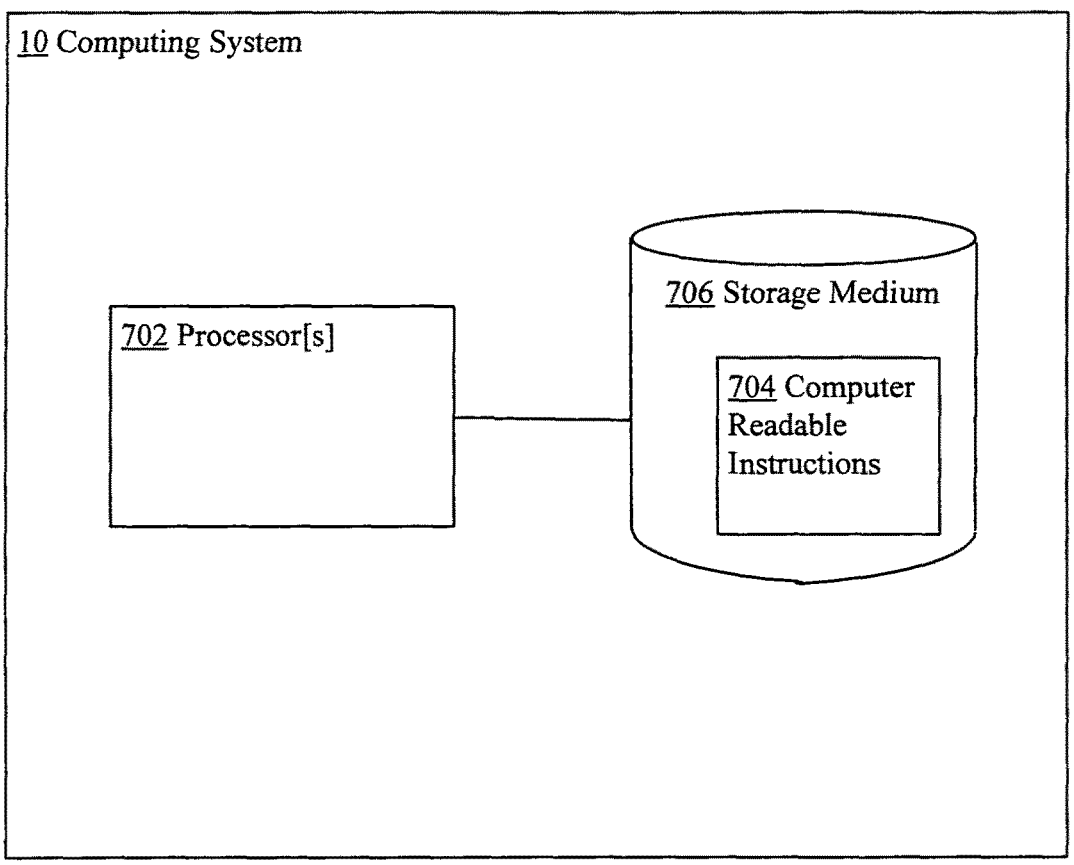
FIG. 7 is another high-level block diagram showing one implementation of the computing system 10 of FIG. 1b.

Turning now to FIG. 7, which is a high-level block diagram illustrating a particular implementation of the computing system 10 of FIG. 1b. As illustrated, the computing system 10, which in some cases may comprise of one or more network devices such as one or more servers, may include one or more processors 702 (e.g., one or more microprocessors, one or more controllers, and so forth) linked to storage medium 706 (e.g., volatile and/or non-volatile memory). The storage medium 706 may store computer readable instructions 704 (e.g., computer program product). The processor 702, in various implementations, may execute the computer readable instructions 704 in order to execute one or more operations described above and as illustrated in FIGS. 4, 5a, 5b, 5c, 5d, 6a, 6b, 6c, 6d, 6e, 6f, 6g, and 6h.

For example, the processor 702 may execute the computer readable instructions 704 in order to detect one or more occurrences of one or more specific patterns of usage of one or more non-communication (NC) productivity applications by one or more end users 40*, and to provide to the one or more end users 40*, in response to said detecting, access to one or more particular messages through one or more channels of one or more NC productivity application interfaces, the one or more NC productivity application interfaces for accessing the one or more NC productivity applications by the one or more end users 40* as illustrated by the operational flow 400 of FIG. 4.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and of firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:

(a) a specific usage pattern determining module configured to determine that one or more occurrences of one or more specific patterns of usage by one or more end users of one or more non-communication (NC) productivity applications have occurred, the specific usage pattern determining module being configured to determine that the one or more occurrences of the one or more specific patterns of usage have occurred by a process that includes collecting and monitoring textual data acquired at least partly via the one or more NC productivity applications, at least in part via one or more first NC productivity application interfaces, wherein the specific usage pattern determining module includes at least a data collecting module configured to at least collect the textual data acquired at least partly via the one or more NC productivity applications; and (b) a message access providing module configured to provide access to one or more particular messages to the one or more end users, the access through one or more channels of one or more second NC productivity application interfaces that are designed to provide access to the one or more NC productivity applications by the one or more end users, the message access providing module configured to be responsive at least in part to the specific usage pattern determining module, the message access providing module including at least:

(1) an NC productivity application interface providing module configured to provide to the one or more end users, at least partly in response to said determining, the one or more second NC productivity application interfaces including the one or more channels for accessing the one or more particular messages, wherein the provided one or more second NC productivity application interfaces are not the same interfaces as the one or more first NC productivity application interfaces, which do not include the one or more channels for accessing the one or more particular messages, the NC productivity application interface providing module including at least:

(A) a NC productivity application interface providing module configured to provide to at least a first user of the one or more end users at least one interface of the one or more second NC productivity application interfaces, the at least one interface of the one or more second NC productivity application interfaces configured for presenting to at least the first user at least one particular message, of the one or more particular messages, directed at least partly to at least the first user from at least a second user of the one or more end users regarding at least a work product associated with at least one particular subject, wherein the NC productivity application interface providing module is configured to provide to at least the first user the at least one interface for receiving messages from at least the second user regarding at least a work product associated with the at least one particular subject based at least in part on a selection of at least the first user based at least partly on collected textual data indicating that at least the first user has used at least one of the one or more NC productivity applications regarding a work product associated with the at least one particular subject; and wherein at least one of the specific usage pattern determining module or the message access providing module is implemented, at least in part, with at least one of a processing device or a memory device.

2. The system of claim 1, wherein said data collecting module comprises:
a data collecting module configured to collect textual data entered through at least one of a word processing application, a spreadsheet application, a presentation application, a publishing application, a diagramming application, a database management application, a document management application, an accounting application, an engineering or design application, or a project management application.

3. The system of claim 1, wherein said data collecting module comprises:
a data receiving module configured to receive the textual data entered through the one or more NC productivity applications via one or more communication networks.

4. The system of claim 1, wherein said data collecting module comprises:
a specific word/term determining module configured to determine whether the collected textual data indicate that the one or more end users has entered through the one or more NC productivity applications data representing one or more specific words or terms.

5. The system of claim 4, wherein said specific word/term determining module comprises:
a specific word/term determining module configured to determine whether the collected textual data indicate that the one or more end users has entered through the one or more NC productivity applications data representing at least one of one or more specific words or one or more specific terms that are relevant to subject matter of the one or more particular messages.

6. The system of claim 4, wherein said specific word/term determining module comprises:
a specific word/term determining module configured to determine whether the collected textual data indicate that the one or more end users has entered through the one or more NC productivity applications data representing one or more specific combinations of words or terms.

7. The system of claim 1, wherein said data collecting module comprises:
a specific symbol/icon determining module configured to determine whether the collected textual data indicate that the one or more end users has entered through the one or more NC productivity applications data representing one or more specific symbols or icons.

8. The system of claim 7 wherein said specific symbol/icon determining module comprises:
a specific symbol/icon determining module configured to determine whether the collected textual data indicate that the one or more end users has entered through the one or more NC productivity applications data representing one or more specific symbols or icons that are relevant to content of the one or more particular messages.

9. The system of claim 1, wherein said data collecting module comprises:
a specific numerical value determining module configured to determine whether the collected textual data indicate that the one or more end users has entered through the one or more NC productivity applications data representing one or more specific numerical values.

10. The system of claim 9, wherein said specific numerical value determining module comprises:
a specific numerical value determining module configured to determine whether the collected textual data indicate that the one or more end users has entered through the one or more NC productivity applications data representing one or more specific numerical values that are relevant to content of the one or more particular messages.

11. The system of claim 1, wherein said data collecting module comprises:
a specific word/term determining module and a specific symbol/icon determining module configured to determine whether the collected textual data indicate that the one or more end users has entered through the one or more NC productivity applications data representing at least one of one or more specific words or one or more specific symbols.

12. The system of claim 1, wherein said data collecting module comprises:
a specific word/term determining module and a specific numerical value determining module configured to determine whether the collected textual data indicate that the one or more end users has entered through the one or more NC productivity applications data representing at least one of one or more specific words or one or more specific numerical values.

13. The system of claim 1, wherein said specific usage pattern determining module comprises:
a specific party use determining module configured to determine whether the one or more end users used the one or more NC productivity applications with respect to one or more specific parties.

14. The system of claim 13, wherein said specific party use determining module comprises:
a specific party use determining module configured to determine whether the one or more end users used the one or more NC productivity applications to generate one or more work products on behalf of the one or more specific parties.

15. The system of claim 1, wherein said specific usage pattern determining module comprises:
a specific subject use determining module configured to determine whether the one or more end users used the one or more NC productivity applications with respect to one or more specific subjects.

16. The system of claim 15, wherein said specific subject use determining module comprises:
a metadata examining module configured to examine metadata associated with the one or more work products generated by the one or more end users with at least one of a word processing application or a spreadsheet application to determine whether the one or more work products are directed to the one or more specific subjects.

17. The system of claim 15, wherein said specific subject use determining module comprises:
a work product content examining module configured to examine content of the one or more work products to determine whether the one or more work products are directed to the one or more specific subjects.

18. The system of claim 1, wherein said specific usage pattern determining module comprises:
a specific usage pattern determining module configured to determine occurrences of specific patterns of usage of a plurality of NC productivity applications by the one or more end users.

19. The system of claim 18, wherein said specific usage pattern determining module comprises:
   a specific usage pattern determining module configured to determine that at least an occurrence of a first specific pattern of usage of a first NC productivity application by the one or more end users and at least an occurrence of a second specific pattern of usage of a second NC productivity application by the one or more end users have occurred.

20. The system of claim 19, wherein said specific usage pattern determining module comprises:
   a specific usage pattern determining module configured to determine that at least an occurrence of a first specific pattern of usage of a first NC productivity application by a the first end user and at least an occurrence of a second specific pattern of usage of a second NC productivity application by the second end user have occurred.

21. The system of claim 1, wherein said NC productivity application interface providing module configured to provide to the one or more end users, at least partly in response to said determining, the one or more second NC productivity application interfaces including the one or more channels for accessing the one or more particular messages, wherein the provided one or more second NC productivity application interfaces are not the same interfaces as the one or more first NC productivity application interfaces, which do not include the one or more channels for accessing the one or more particular messages, comprises:
   an NC productivity application interface providing module configured to provide, in real-time and at least partly in response to said determining, the one or more second NC productivity application interfaces to the one or more end users.

22. The system of claim 21, wherein said NC productivity application interface providing module comprises:
   an NC productivity application interface providing module configured to provide, in response to said determining, the one or more second NC productivity application interfaces including the one or more channels for accessing the one or more particular messages to the one or more end users, the providing being made within five seconds of said determining.

23. The system of claim 1, wherein said NC productivity application interface providing module configured to provide to the one or more end users, at least partly in response to said determining, the one or more second NC productivity application interfaces including the one or more channels for accessing the one or more particular messages, wherein the provided one or more second NC productivity application interfaces are not the same interfaces as the one or more first NC productivity application interfaces, which do not include the one or more channels for accessing the one or more particular messages, comprises:
   an NC productivity application interface providing module configured to provide to the one or more end users the one or more second NC productivity application interfaces for accessing the one or more NC productivity applications including accessing at least one of a word processing application, a spreadsheet application, a presentation application, a publishing application, a diagramming application, a database management application, a document management application, an accounting application, an engineering or design application, or a project management application.

24. The system of claim 1, wherein said NC productivity application interface providing module configured to provide to the one or more end users, at least partly in response to said determining, the one or more second NC productivity application interfaces including the one or more channels for accessing the one or more particular messages, wherein the provided one or more second NC productivity application interfaces are not the same interfaces as the one or more first NC productivity application interfaces, which do not include the one or more channels for accessing the one or more particular messages, comprises:
   an NC productivity application audio interface providing module configured to provide to the one or more end users, at least partly in response to said determining, one or more NC productivity application audio interfaces for accessing at least one of the one or more NC productivity applications.

25. The system of claim 1, wherein said NC productivity application interface providing module configured to provide to the one or more end users, at least partly in response to said determining, the one or more second NC productivity application interfaces including the one or more channels for accessing the one or more particular messages, wherein the provided one or more second NC productivity application interfaces are not the same interfaces as the one or more first NC productivity application interfaces, which do not include the one or more channels for accessing the one or more particular messages, comprises:
   an NC productivity application display interface providing module configured to provide to the one or more end users, at least partly in response to said determining, one or more NC productivity application display interfaces for accessing at least one of the one or more NC productivity applications.

26. The system of claim 25, wherein said NC productivity application display interface providing module comprises:
   an NC productivity application display interface providing module configured to provide to the one or more end users at least one NC productivity application display interface that includes at least one display window for accessing the one or more particular messages.

27. The system of claim 26, wherein said NC productivity application display interface providing module comprises:
   an NC productivity application display interface providing module configured to provide to the one or more end users at least one NC productivity application display interface that includes a plurality of display windows for accessing a plurality of particular messages.

28. The system of claim 26, wherein said NC productivity application display interface providing module comprises:
   an NC productivity application display interface providing module configured to provide to the one or more end users the at least one NC productivity application display interface including the at least one display window, the at least one NC productivity application display interface including at least a tool-bar portion and a workspace portion.

29. The system of claim 28, wherein said NC productivity application display interface providing module comprises:
   an NC productivity application display interface providing module configured to provide to the one or more end users the at least one NC productivity application display interface including the at least one display window, the at least one display window disposed at least in the tool-bar portion.

30. The system of claim 28, wherein said NC productivity application display interface providing module comprises:
an NC productivity application display interface providing module configured to provide to the one or more end users the at least one NC productivity application display interface including the at least one display window, the at least one display window disposed at least in the workspace portion.

31. The system of claim 28, wherein said NC productivity application display interface providing module comprises:
an NC productivity application display interface providing module configured to provide to the one or more end users the at least one NC productivity application display interface including the at least one display window, the at least one display window disposed at least in the tool-bar portion and in the workspace portion.

32. The system of claim 1, wherein said message access providing module comprises:
a message presenting module configured to present access to the one or more particular messages via the one or more channels.

33. The system of claim 1, wherein said message access providing module comprises:
a message presenting module configured to at least present through the one or more channels of the one or more second NC productivity application interfaces the one or more particular messages.

34. The system of claim 33, wherein said message presenting module comprises:
an audio message presenting module configured to present through the one or more channels one or more particular audio messages.

35. The system of claim 33, wherein said message presenting module comprises:
a display message presenting module configured to present through the one or more channels one or more particular display messages.

36. The system of claim 33, wherein said message presenting module comprises:
a link presenting module configured to present through the one or more channels one or more links to the one or more particular messages.

37. The system of claim 33, wherein said message presenting module comprises:
a message transmitting module configured to transmit the one or more particular messages to the one or more end users.

38. The system of claim 33, wherein said message presenting module comprises:
a message presenting module configured to present through the one or more channels one or more messages from an enterprise associated with the one or more end users.

39. The system of claim 33, wherein said message presenting module comprises:
a message presenting module including a relevant message determining module configured to present through the one or more channels the one or more particular messages, the one or more particular messages being determined by the relevant message determining module to be relevant to the one or more end users responsive, at least in part, to the specific usage pattern determining module.

40. The system of claim 39, wherein said message presenting module comprises:
a message presenting module including a relevant message determining module configured to present through the one or more channels the one or more particular messages, the one or more particular messages being determined by the relevant message determining module to be relevant with respect to textual data collected through the one or more NC productivity applications.

41. The system of claim 40, wherein said message presenting module comprises:
a message presenting module including a relevant message determining module configured to present through the one or more channels the one or more particular messages that were determined by the relevant message determining module to be relevant with respect to the textual data collected through the one or more NC productivity applications, the textual data collected through the one or more NC productivity applications having been determined to include data representing one or more specific words or terms that are relevant to the content of the one or more particular messages.

42. The system of claim 40, wherein said message presenting module comprises:
a message presenting module including a relevant message determining module configured to present through the one or more channels the one or more particular messages that were determined by the relevant message determining module to be relevant with respect to the textual data collected through the one or more NC productivity applications, the textual data collected through the one or more NC productivity applications having been determined to include data representing one or more specific symbols or icons that are relevant to the content of the one or more particular messages.

43. The system of claim 39, wherein said message presenting module comprises:
a message presenting module including a relevant message determining module configured to present through the one or more channels the one or more particular messages, the one or more particular messages being determined by the relevant message determining module to be relevant with respect to one or more end user work products.

44. The system of claim 1, wherein said NC productivity application interface providing module configured to provide to the one or more end users, at least partly in response to said determining, the one or more second NC productivity application interfaces including the one or more channels for accessing the one or more particular messages, wherein the provided one or more second NC productivity application interfaces are not the same interfaces as the one or more first NC productivity application interfaces, which do not include the one or more channels for accessing the one or more particular messages comprises:
an NC productivity application interface transmitting module configured to transmit to one or more end user devices associated with the one or more end users, at least partly in response to said determining, one or more electronic copies of the one or more second NC productivity application interfaces including the one or more channels for accessing the one or more particular messages.

45. The system of claim 44, wherein said NC productivity application interface transmitting module configured to transmit to one or more end user devices associated with the one or more end users, at least partly in response to said determining, one or more electronic copies of the one or more second NC productivity application interfaces including the one or more channels for accessing the one or more particular messages comprises:

a network transmitting module configured to transmit to the one or more end user devices associated with the one or more end users the one or more electronic copies of the one or more second NC productivity application interfaces at least in part via one or more communication networks.

46. The system of claim 44, wherein said NC productivity application interface transmitting module configured to transmit to one or more end user devices associated with the one or more end users, at least partly in response to said determining, one or more electronic copies of the one or more second NC productivity application interfaces including the one or more channels for accessing the one or more particular messages comprises:

an Internet transmitting module configured to transmit to the one or more end user devices associated with the one or more end users the one or more electronic copies of the one or more second NC productivity application interfaces at least in part via the Internet.

47. The system of claim 1 wherein the specific usage pattern module configured to determine that one or more occurrences of one or more specific patterns of usage by one or more end users of one or more non-communication (NC) productivity applications, that do not include an email client, have occurred, the specific usage pattern module being configured to determine that the one or more occurrences of the one or more specific patterns of usage have occurred by a process that includes collecting and monitoring textual data entered by the one or more end users through the one or more NC productivity applications, at least in part via one or more first NC productivity application interfaces, wherein the specific usage pattern module includes at least a data collecting module configured to at least collect the textual data entered by the one or more end users through the one or more NC productivity applications comprises:

a specific usage pattern module configured to determine, at one or more servers based on collected data received at the one or more servers at least in part via the Internet from one or more end user devices that are associated with the one or more end users, that the one or more occurrences of one or more specific patterns of usage by one or more end users have occurred.

48. A system, comprising:
(a) circuitry for determining that one or more occurrences of one or more specific patterns of usage by one or more end users of one or more non-communication (NC) productivity applications have occurred, the circuitry for determining being configured to determine that the one or more occurrences of the one or more specific patterns of usage have occurred by a process that includes collecting and monitoring textual data acquired at least in part via one or more first NC productivity application interfaces of the one or more NC productivity applications; and
(b) circuitry for providing access to one or more particular messages to the one or more end users via one or more channels of one or more second NC productivity application interfaces that are configured to provide access to the one or more NC productivity applications by the one or more end users, the circuitry for providing configured to be responsive at least in part to the circuitry for determining, including at least:
(1) circuitry for providing to the one or more end users, responsive at least in part to the circuitry for determining, the one or more second NC productivity application interfaces including the one or more channels, wherein the provided one or more second NC productivity application interfaces are not the same interfaces as the one or more first NC productivity application interfaces, which do not include the one or more channels for accessing the one or more particular messages, including at least:
(A) circuitry for providing to at least a first user of the one or more end users at least one interface of the one or more second NC productivity application interfaces, the at least one interface of the one or more second NC productivity application interfaces configured for presenting to at least the first user at least one particular message, of the one or more particular messages, directed at least partly to at least the first user from at least a second user of the one or more end users regarding at least a work product associated with at least one particular subject, wherein the circuitry for providing to at least a first user is configured to provide to at least the first user the at least one interface for receiving messages from at least the second user regarding at least a work product associated with the at least one particular subject based at least in part on a selection of at least the first user based at least partly on collected textual data indicating that at least the first user has used at least one of the one or more NC productivity applications regarding a work product associated with the at least one particular subject.

49. A method comprising:
(a) determining that one or more occurrences of one or more specific patterns of usage by one or more end users of one or more non-communication (NC) productivity applications have occurred, the determining performed at least in part by determining that one or more occurrences of the one or more specific patterns of usage have occurred by a process that includes collecting and monitoring textual data acquired at least in part via one or more first NC productivity application interfaces; and
(b) providing access to one or more particular messages, at least partly in response to said determining, to the one or more end users via one or more channels of one or more second NC productivity application interfaces that are configured to provide access to the one or more NC productivity applications by the one or more end users, including at least:
(1) providing to the one or more end users, at least partly in response to said determining, the one or more second NC productivity application interfaces including the one or more channels for accessing the one or more particular messages, wherein the provided one or more second NC productivity application interfaces are not the same interfaces as the one or more first NC productivity application interfaces, which do not include the one or more channels for accessing the one or more particular messages, including at least:
(A) providing to at least a first user of the one or more end users at least one interface of the one or more second NC productivity application interfaces, the at least one interface of the one or more second NC productivity application interfaces configured for presenting to at least the first user at least one particular message, of the one or more particular messages, directed at least partly to the first user from at least a second user of the one or more end users regarding at least a work product associated with at least one particular subject, wherein the providing to at least a first user includes performing the providing based at least in part on a selection of at least the first user based at least partly on collected textual data indicating that at least the first user has used at least one of the one or more NC productivity applications regarding a work product associated with the at least one particular subject; and wherein at least one of the determining or the providing access to one or more particular messages is performed at least in part with one or more processing devices.

50. The system of claim 1 wherein the NC productivity application interface providing module configured to provide to at least a first user of the one or more end users at least one interface of the one or more second NC productivity application interfaces, the at least one interface of the one or more second NC productivity application interfaces configured for presenting to at least the first user at least one particular message, of the one or more particular messages, directed at least partly to the first user from at least a second user of the one or more end users regarding at least a work product associated with at least one particular subject comprises:

an NC productivity application interface providing module configured to provide to at least the first user who is a member of an organization the at least one interface that is configured for receiving the at least one particular message from at least the second user who is also a member of the organization.

51. The system of claim 1 wherein the NC productivity application interface providing module configured to provide to at least a first user of the one or more end users at least one interface of the one or more second NC productivity application interfaces, the at least one interface of the one or more second NC productivity application interfaces configured for presenting to at least the first user at least one particular message, of the one or more particular messages, directed at least partly to the first user from at least a second user of the one or more end users regarding at least a work product associated with at least one particular subject comprises:

an NC productivity application interface providing module configured to provide the at least one interface to at least the first user responsive at least partly to input from a specific usage pattern determining module configured to determine that a specific pattern of usage of at least one of a word processing application or a spreadsheet application by the first user has occurred.

52. The system of claim 51 wherein the NC productivity application interface providing module configured to provide the at least one interface to at least the first user responsive at least partly to input from a specific usage pattern determining module configured to determine that a specific pattern of usage of at least one of a word processing application or a spreadsheet application by the first user has occurred comprises:

an NC productivity application interface providing module configured to provide the at least one interface to at least the first user responsive to input from the specific usage pattern determining module including a specific party use determining module configured to determine that one of more uses by first user of the at least one of a word processing application or a spreadsheet application with respect to the second user has occurred.

53. The system of claim 51 wherein the NC productivity application interface providing module configured to provide the at least one interface to at least the first user responsive at least partly to input from a specific usage pattern determining module configured to determine that a specific pattern of usage of at least one of a word processing application or a spreadsheet application by the first user has occurred comprises:

an NC productivity application interface providing module configured to provide the at least one interface to at least the first user responsive to input from a specific usage pattern determining module including a specific subject use determining module configured to determine that one or more uses by the first user of the at least one of a word processing application or a spreadsheet application with respect to one or more specific subjects associated with the second user has occurred.

* * * * *